US008610971B2

(12) United States Patent
Omori et al.

(10) Patent No.: US 8,610,971 B2
(45) Date of Patent: Dec. 17, 2013

(54) IMAGE FORMING APPARATUS

(75) Inventors: Atsufumi Omori, Kanagawa (JP);
Masaaki Ishida, Kanagawa (JP);
Yasuhiro Nihei, Kanagawa (JP);
Muneaki Iwata, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 128 days.

(21) Appl. No.: 13/275,794

(22) Filed: Oct. 18, 2011

(65) Prior Publication Data

US 2012/0099165 A1 Apr. 26, 2012

(30) Foreign Application Priority Data

Oct. 20, 2010 (JP) .................................. 2010-235042
Oct. 20, 2010 (JP) .................................. 2010-235058
Mar. 4, 2011 (JP) .................................. 2011-047171

(51) Int. Cl.
*H04N 1/04* (2006.01)

(52) U.S. Cl.
USPC ........... 358/475; 358/474; 358/509; 347/234; 347/239; 399/220

(58) Field of Classification Search
USPC ........ 358/474, 475, 509, 1.15, 1.9, 452, 1.12; 347/234, 247, 248, 239, 250, 235; 399/220, 254, 20, 49
See application file for complete search history.

(56) References Cited

U.S. PATENT DOCUMENTS

| | | | | |
|---|---|---|---|---|
| 5,200,783 A * | 4/1993 | Maeda et al. | .................... | 399/39 |
| 5,481,340 A * | 1/1996 | Nagao et al. | .................... | 399/72 |
| 6,229,969 B1 * | 5/2001 | Ohki | ................................ | 399/49 |
| 7,382,387 B2 * | 6/2008 | Ichikawa et al. | ............... | 347/131 |
| 7,385,737 B2 * | 6/2008 | Zaima | ........................... | 358/504 |
| 7,395,002 B2 * | 7/2008 | Funayama et al. | ............... | 399/49 |
| 7,701,480 B2 | 4/2010 | Omori et al. | | |
| 7,760,223 B2 | 7/2010 | Suzuki et al. | | |
| 7,821,526 B2 * | 10/2010 | Nagata et al. | .................. | 347/131 |
| 7,843,601 B2 * | 11/2010 | Yamada | ......................... | 358/1.9 |
| 7,936,367 B2 | 5/2011 | Ishida et al. | | |
| 8,154,767 B2 * | 4/2012 | Muramatsu | .................. | 358/3.06 |
| 8,248,640 B2 * | 8/2012 | Tanaka et al. | ................. | 358/1.15 |
| 8,339,637 B2 * | 12/2012 | Nakazato et al. | ............ | 358/1.15 |
| 2005/0030562 A1 * | 2/2005 | Hama et al. | ...................... | 358/1.9 |
| 2007/0127937 A1 * | 6/2007 | Ichikawa et al. | ................ | 399/49 |
| 2007/0242127 A1 | 10/2007 | Omori et al. | | |

(Continued)

FOREIGN PATENT DOCUMENTS

| | | |
|---|---|---|
| JP | 2003-127454 | 5/2003 |
| JP | 2004-289368 | 10/2004 |

(Continued)

*Primary Examiner* — Negussie Worku
(74) *Attorney, Agent, or Firm* — Oblon, Spivak, McClelland, Maier & Neustadt, L.L.P.

(57) ABSTRACT

An image forming apparatus that forms an image includes: a photosensitive element; an optical scanning device that includes a light source, and scans a surface of the photosensitive element in a main scanning direction with light emitted from the light source to form a latent image; a developing unit that develops the latent image; a photosensitive element period detecting sensor that detects a rotation period of the photosensitive element; a density sensor that detects a density variation of an image developed by the developing unit, in a sub scanning direction; and a processing device that corrects a driving signal of the light source according to the image information, based on an output signal of the density sensor and an output signal of the photosensitive element period detecting sensor.

19 Claims, 60 Drawing Sheets

(56) References Cited

U.S. PATENT DOCUMENTS

| | | |
|---|---|---|
| 2008/0291259 A1 | 11/2008 | Nihei et al. |
| 2008/0298842 A1 | 12/2008 | Ishida et al. |
| 2009/0195635 A1 | 8/2009 | Ishida et al. |
| 2010/0045767 A1 | 2/2010 | Nihei et al. |
| 2010/0119262 A1 | 5/2010 | Omori et al. |
| 2010/0214637 A1 | 8/2010 | Nihei et al. |
| 2011/0170152 A1 | 7/2011 | Nihei |
| 2011/0199657 A1 | 8/2011 | Ishida et al. |
| 2011/0228037 A1 | 9/2011 | Omori et al. |

FOREIGN PATENT DOCUMENTS

| | | |
|---|---|---|
| JP | 2005-313355 | 11/2005 |
| JP | 2007-135100 | 5/2007 |
| JP | 2008-65270 | 3/2008 |
| JP | 2009-262344 | 11/2009 |

* cited by examiner

IMAGE FORMING APPARATUS

CROSS-REFERENCE TO RELATED APPLICATIONS

The present application claims priority to and incorporates by reference the entire contents of Japanese Patent Application No. 2010-235042 filed in Japan on Oct. 20, 2010, Japanese Patent Application No. 2010-235058 filed in Japan on Oct. 20, 2010, and Japanese Patent Application No. 2011-047171 filed in Japan on Mar. 4, 2011.

BACKGROUND OF THE INVENTION

1. Field of the Invention

The present invention relates to an image forming apparatus, and more particularly, to an image forming apparatus using laser light.

2. Description of the Related Art

In an image forming apparatus such as a laser printer, a digital copying machine, or a facsimile, it is general that light flux scans a scanning target surface while irradiating the scanning target surface so that a latent image is formed on the scanned surface.

The image forming apparatus includes a photosensitive element being photosensitive and serving as a scanned surface, a light source that emits laser light, a polygon mirror that deflects the laser light emitted from the light source, a scanning optical system that guides the laser light deflected by the polygon mirror to the surface of the photosensitive element, and the like.

An optical spot on the surface of the photosensitive element moves in an axial direction with the rotation of the polygon mirror, so that scanning corresponding to one line is performed. When scanning of one line is finished, the photosensitive element rotates to start the scanning of the following line. The axial direction of the photosensitive element is referred to as a "main scanning direction", and the rotation direction of the photosensitive element is referred to as a "sub scanning direction". The position of the optical spot on the surface of the photosensitive element in the main scanning direction is called an "image height".

The scanning optical system is configured to include optical elements such as a lens, a glass plate, and a mirror. In scanning optical systems, however, light use efficiency (reflectance or transmittance) varies depending on the incident angle of light. Further, the thickness of the lens varies depending on the incident position of light.

The laser light deflected by the polygon mirror is incident to the scanning optical system at an incident angle depending on a deflection angle of the polygon mirror; and the incident position changes depending on the image height. Thus, the intensity of laser light on the surface of the photosensitive element becomes stronger or weaker according to the image height.

The dynamics in the laser light intensity according to the image height is called a "shading characteristic" and is one of factors that cause a density variation of an output image, thereby degrading the image quality. In this regard, there has been suggested various methods of correcting the shading characteristic (for example, see Japanese Patent Application Laid-open No. 2007-135100 and Japanese Patent Application Laid-open No. 2009-262344).

Further, an image forming apparatus that controls a light exposure amount according to a variation in sensitivity of the photosensitive element is disclosed in Japanese Patent Application Laid-open No. 2008-065270.

Meanwhile, when the photosensitive element is eccentric or has a cross section that is not a true circle, a gap between the photosensitive element and the developing roller varies as the photosensitive element rotates. A variation in the gap leads to a variation in development, causing an unnecessary density variation in an image (also referred to as "output image") output from the image forming apparatus.

In recent years, there are demands for the high image quality, and conventional methods are difficult to suppress the density variation of the output image, caused by eccentricity or a shape error of the photosensitive element, down to a requested level.

SUMMARY OF THE INVENTION

It is an object of the present invention to at least partially solve the problems in the conventional technology.

According to an aspect of the present invention, there is provided an image forming apparatus that forms an image based on image information, including: a photosensitive element; an optical scanning device that includes a light source, and scans a surface of the photosensitive element in a main scanning direction with light emitted from the light source to form a latent image on the surface of the photosensitive element; a developing unit that develops the latent image; a photosensitive element period detecting sensor that detects a rotation period of the photosensitive element; a density sensor that detects a density variation of an image, which is developed by the developing unit, in a sub scanning direction orthogonal to the main scanning direction; and a processing device that corrects a driving signal of the light source according to the image information, based on an output signal of the density sensor and an output signal of the photosensitive element period detecting sensor.

According to another aspect of the present invention, there is provided an image forming apparatus that forms an image based on image information, including: a photosensitive element; an optical scanning device that includes a light source, scans a surface of the photosensitive element in a main scanning direction with light from the light source, and forms a latent image on the surface of the photosensitive element; a developing unit that develops the latent image; a photosensitive element period detecting sensor that detects a rotation period of the photosensitive element; a plurality of density sensors that are arranged at different positions in the main scanning direction, each density sensor detecting a density variation of an image, which is developed by the developing unit, in a sub scanning direction orthogonal to the main scanning direction; and a processing device that corrects a driving signal of the light source according to the image information, based on output signals of the plurality of density sensors and an output signal of the photosensitive element period detecting sensor.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 37 is a diagram for explaining a second light quantity correction signal corresponding to the light-emitting power correction straight line of FIG. 54;

DETAILED DESCRIPTION OF THE PREFERRED EMBODIMENTS

Hereinafter, exemplary embodiments of the present invention will be described.

First Embodiment

First Embodiment (1)

Figure 1:
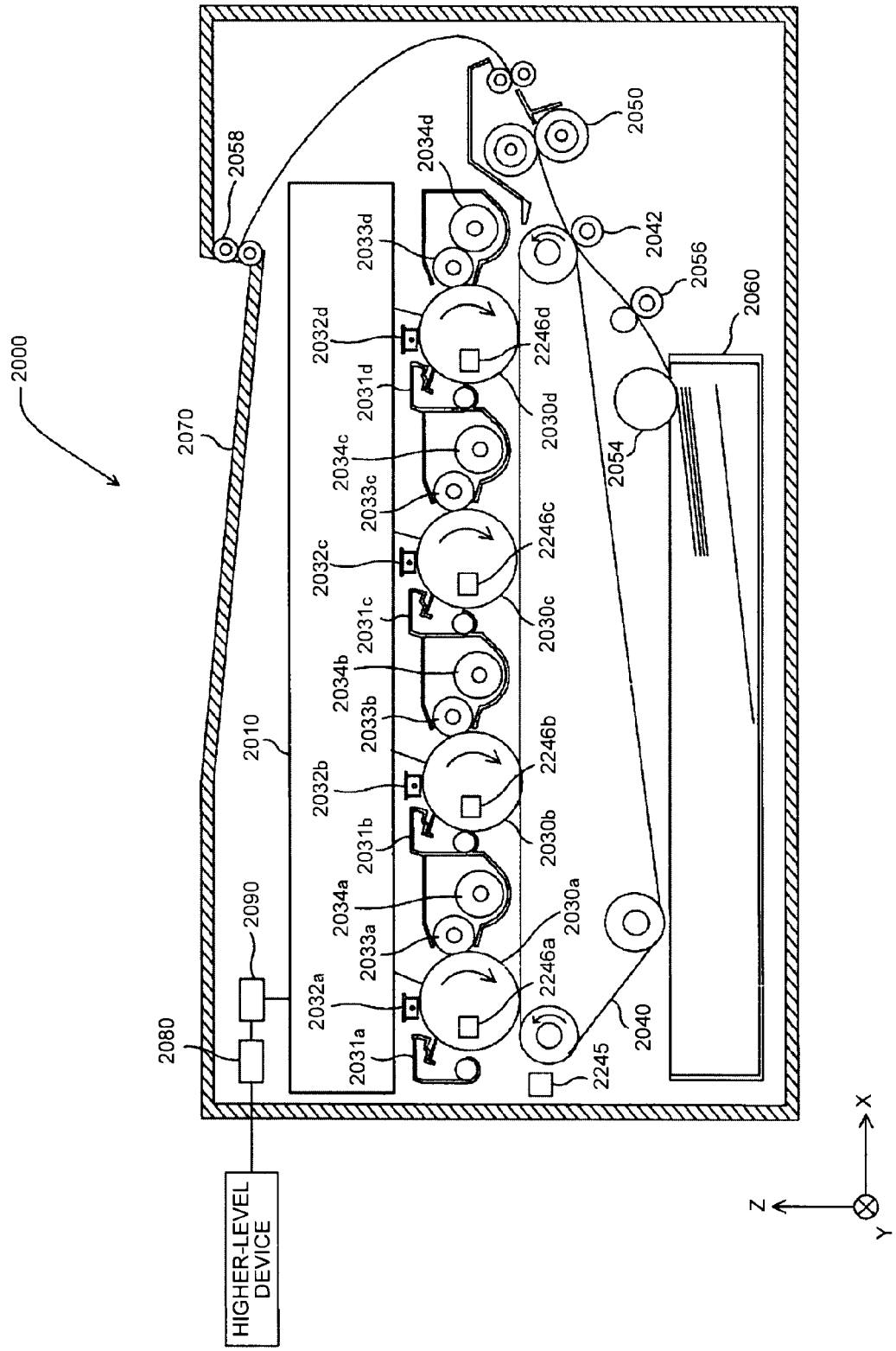
FIG. 1 is a diagram illustrating a schematic configuration of a color printer according to a first embodiment (1)

A first embodiment (1) will be described below with reference to FIGS. 1 to 24. FIG. 1 illustrates a schematic configuration of a color printer 2000 as an image forming apparatus according to the first embodiment (1).

The color printer 2000 is a tandem type multi-color printer that forms a full-color image by superimposing four colors (black, cyan, magenta, and yellow). The color printer 2000 includes an optical scanning device 2010, four photosensitive elements 2030a, 2030b, 2030c, and 2030d, four cleaning units 2031a, 2031b, 2031c, and 2031d, four charging units 2032a, 2032b, 2032c, and 2032d, four developing rollers 2033a, 2033b, 2033c, and 2033d, four toner cartridges 2034a, 2034b, 2034c, and 2034d, a transfer belt 2040, a transfer roller 2042, a fixing roller 2050, a paper feeding roller 2054, a pair of registration rollers 2056, a discharging roller 2058, a paper feed tray 2060, a discharge tray 2070, a communication control device 2080, a density detector 2245, four home position sensors 2246a, 2246b, 2246c, and 2246d, a printer control device 2090 that controls the above components in general, and the like.

The communication control device 2080 controls two-way communication with a higher-level device (for example a personal computer (PC)) via a network.

The printer control device 2090 includes a central processing unit (CPU), a read only memory (ROM) that stores a program described by codes readable by the CPU and a variety of data used at the time of execution of the program, a random access memory (RAM) which serves as a work memory, an analog-to-digital (AD) conversion circuit that converts analog data into digital data, and the like. The printer control device 2090 controls the above components in response to a request from the higher-level device and transmits image information from the higher-level device to the optical scanning device 2010.

The photosensitive element 2030a, the charging unit 2032a, the developing roller 2033a, the toner cartridge 2034a, and the cleaning unit 2031a are used as a set and constitute an image-forming station that forms a black image (hereinafter, for convenience sake, referred to as "K station").

The photosensitive element 2030b, the charging unit 2032b, the developing roller 2033b, the toner cartridge 2034b, and the cleaning unit 2031b are used as a set and constitute an image-forming station that forms a cyan image (hereinafter, for convenience sake, referred to as "C station").

The photosensitive element 2030c, the charging unit 2032c, the developing roller 2033c, the toner cartridge 2034c, and the cleaning unit 2031c are used as a set and constitute an image-forming station that forms a magenta image (hereinafter, for convenience sake, referred to as "M station").

The photosensitive element 2030d, the charging unit 2032d, the developing roller 2033d, the toner cartridge 2034d, and the cleaning unit 2031d are used as a set and constitute an image-forming station that forms a yellow image (hereinafter, for convenience sake, referred to as "Y station").

Each of the photosensitive elements has a photosensitive layer formed on the surface thereof. That is, the surface of each photosensitive element serves as a scanned surface. Each photosensitive element rotates in an arrow direction in a plane of FIG. 1 by a rotation mechanism (not shown).

Here, a description will be made under the assumption that in XYZ three-dimensional orthogonal coordinate system, a direction parallel to a longitudinal direction of each photosensitive element is a Y axis direction, and a direction parallel to an arrangement direction of the four photosensitive elements is an X axis direction.

Each of the charging units uniformly charges the surface of the corresponding photosensitive element.

The optical scanning device 2010 irradiates the charged surfaces of the respective photosensitive elements with light fluxes modulated for respective colors based on multi-color image information (black image information, cyan image information, magenta image information, and yellow image information) from the higher-level device. As a result, on the surfaces of the photosensitive elements, electrical charges are removed from areas, which have been irradiated with light, and latent images corresponding to the image information are formed on the surfaces of the photosensitive elements. The formed latent image moves in a direction towards the corresponding developing roller with the rotation of the photosensitive element. A configuration of the optical scanning device 2010 will be described later.

Here, an area of each photosensitive element on which image information is written is called as an "effective scanning area", an "image forming area", an "effective image area", or the like.

The toner cartridge 2034a stores black toner therein, and the black toner is supplied to the developing roller 2033a. The toner cartridge 2034b stores cyan toner therein, and the cyan toner is supplied to the developing roller 2033b. The toner cartridge 2034c stores magenta toner therein, and the magenta toner is supplied to the developing roller 2033c. The toner cartridge 2034d stores yellow toner therein, and the yellow toner is supplied to the developing roller 2033d.

As each developing roller rotates, the toner from the corresponding toner cartridge is applied thinly and evenly on the surface of each developing roller. When the toner on the surface of each developing roller contacts the surface of the corresponding photosensitive element, the toner is transferred and adhered only to the area, which has been irradiated with light, on the surface of the photosensitive element. In other words, the developing roller attaches the toner to the latent image formed on the surface of the corresponding photosensitive element, so that the latent image is visualized. The image with the adhered toner (toner image) moves in a direction towards the transfer belt 2040 along with the rotation of the photosensitive element.

The toner images in yellow, magenta, cyan, and black are sequentially transferred onto the transfer belt 2040 in a superimposed manner at predetermined timing, so that a color image is formed. Here, a movement direction of the toner image on the transfer belt 2040 is referred to as a "sub direction", and a direction orthogonal to the sub direction is referred to as a "main direction".

The paper feed tray 2060 stores recording sheets therein. The paper feeding roller 2054 is disposed near the paper feed tray 2060. The paper feeding roller 2054 takes out the recording sheet from the paper feed tray 2060 one by one and conveys the recording sheet to the pair of registration rollers 2056. The pair of registration rollers 2056 delivers the recording sheet towards a gap formed between the transfer belt 2040 and the transfer roller 2042 at predetermined timing. Then, the color image on the transfer belt 2040 is transferred onto the recording sheet. The recording sheet having the transferred color image thereon is delivered to the fixing roller 2050.

In the fixing roller 2050, heat and pressure are applied to the recording sheet, so that the toner is fixed onto the recording sheet. The recording sheeting to which the toner has been fixed is delivered to the discharge tray 2070 via the discharging roller 2058 and sequentially stacked on the discharge tray 2070.

Each of the cleaning units removes the toner (residual toner) remaining on the surface of the corresponding photosensitive element. The surface of the photosensitive element from which the residual toner has been removed returns to the position facing the corresponding charging unit.

Figure 2:
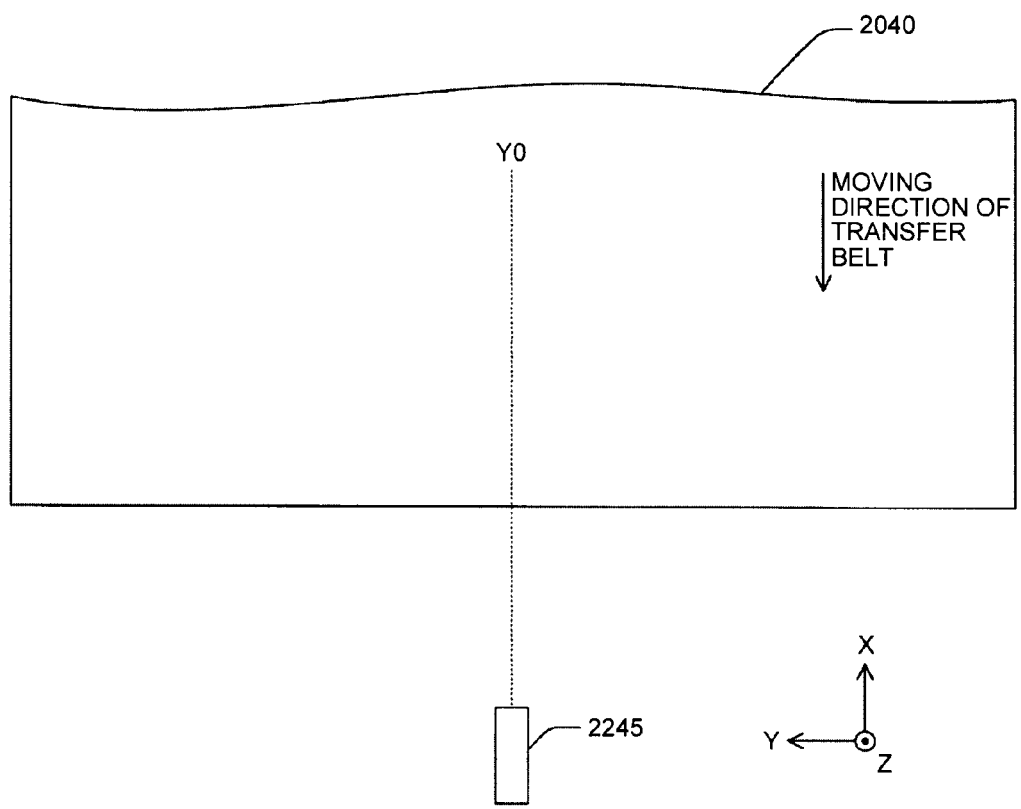
FIG. 2 is a diagram for explaining an arrangement position of a density detector of FIG. 1.

The density detector 2245 is disposed at a −X side of the transfer belt 2040, that is, at the position facing a central portion of the transfer belt 2040 in the X axis direction (see FIG. 2). Here, Y0 is defined as a center position of the density detector 2245 in the main direction (the Y axis direction).

Figure 3:
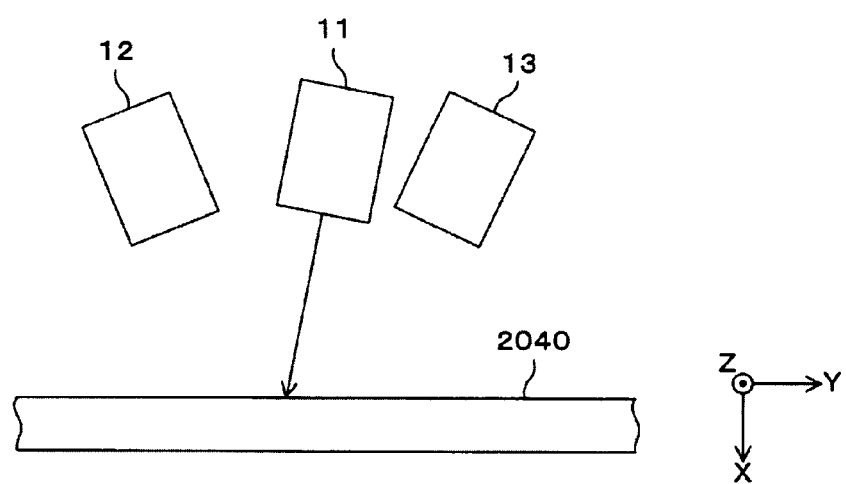
FIG. 3 is a diagram for explaining a configuration of a density detector.
Figure 4:
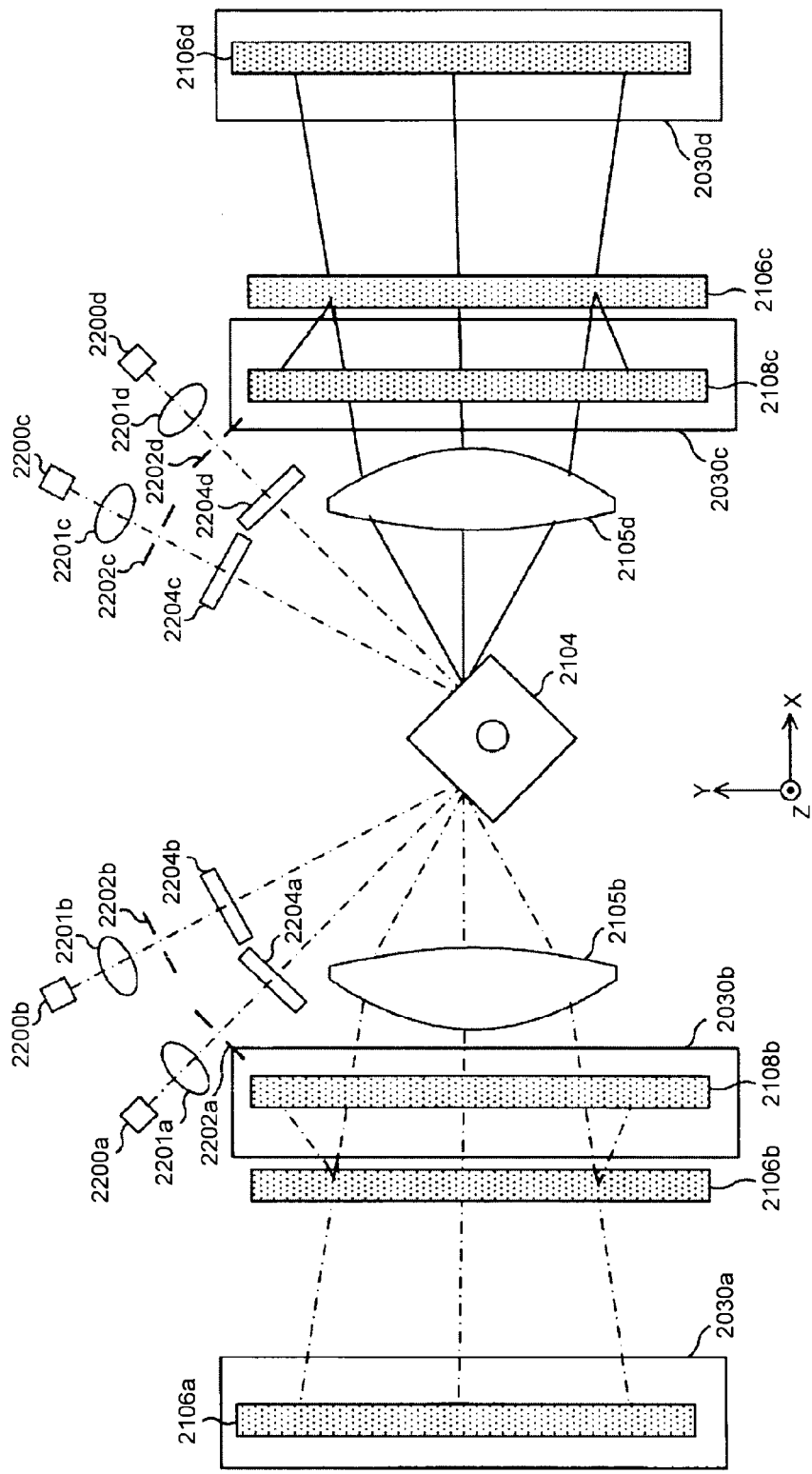
FIG. 4 is a diagram for explaining an optical scanning device of FIG. 1 (1 thereof)
Figure 5:
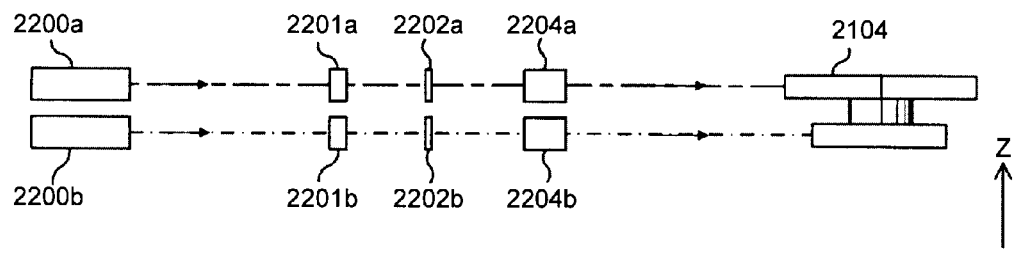
FIG. 5 is a diagram for explaining an optical scanning device of FIG. 1 (2 thereof)
Figure 6:
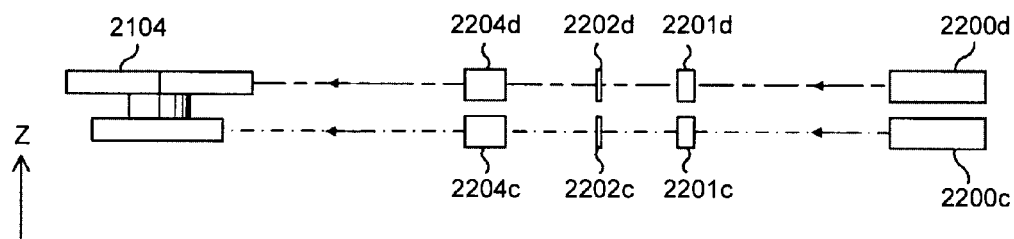
FIG. 6 is a diagram for explaining an optical scanning device of FIG. 1 (3 thereof)
Figure 7:
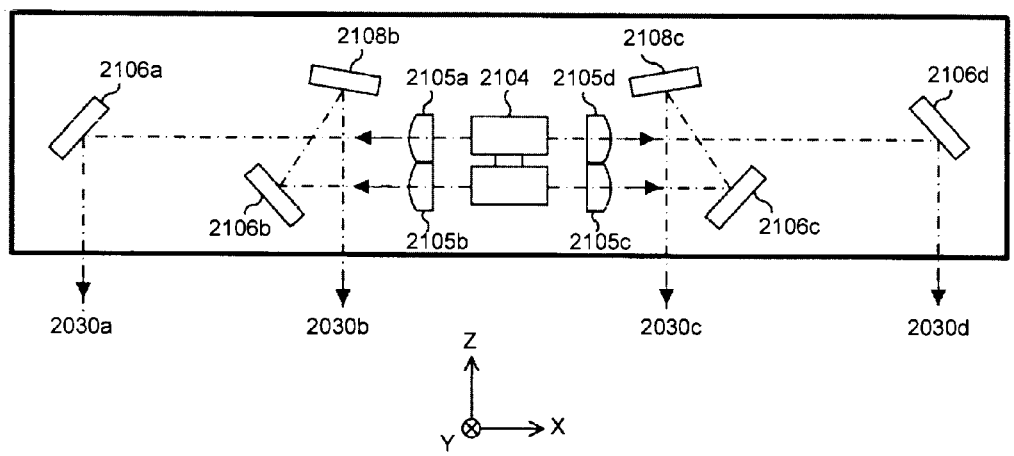
FIG. 7 is a diagram for explaining an optical scanning device of FIG. 1 (4 thereof)

The density detector 2245 includes a light emitting diode (LED) 11 that emits light (hereinafter, also referred to as "detection light") toward the transfer belt 2040, a specular reflected light receiving element 12 that receives specular reflected light from the transfer belt 2040 or a toner pad on the transfer belt 2040, and a diffuse reflected light receiving element 13 that receives diffuse reflected light from the transfer belt 2040 or the toner pad on the transfer belt 2040 as illustrated in FIG. 3 as an example. The light receiving elements output signals (photoelectric conversion signals) according to the amount of received light.

The home position sensor 2246a detects a home position of rotation in the photosensitive element 2030a.

The home position sensor 2246b detects a home position of rotation in the photosensitive element 2030b.

The home position sensor 2246c detects a home position of rotation in the photosensitive element 2030c.

The home position sensor 2246d detects a home position of rotation in the photosensitive element 2030d.

Next, a description will be made in connection with a configuration of the optical scanning device 2010.

The optical scanning device 2010 includes four light sources 2200a, 2200b, 2200c, and 2200d, four coupling lenses 2201a, 2201b, 2201c, and 2201d, four aperture plates 2202a, 2202b, 2202c, and 2202d, four cylindrical lenses 2204a, 2204b, 2204c, and 2204d, a polygon mirror 2104, four scanning lenses 2105a, 2105b, 2105c, and 2105d, six reflection mirrors 2106a, 2106b, 2106c, 2106d, 2108b, and 2108c, a scanning control device 3022 (not shown in FIGS. 4 to 7, see FIG. 8), and the like. These are mounted on an optical housing (not shown) at predetermined locations.

Each light source includes a surface-emitting laser array including a plurality of light-emitting units which are two-dimensionally arranged. The plurality of light-emitting units of the surface-emitting laser array are arranged so that light-emitting unit intervals can be regular intervals when all of the light emitting parts are orthogonally projected on imaginary lines extending in a direction corresponding to the sub scanning direction. In this specification, the "light-emitting unit interval" refers to as the distance between the centers of the two light-emitting units.

The coupling lens 2201a is disposed on an optical path of light flux emitted from the light source 2200a and converts the light flux into a substantially parallel light flux.

The coupling lens 2201b is disposed on an optical path of light flux emitted from the light source 2200b and converts the light flux into a substantially parallel light flux.

The coupling lens 2201c is disposed on an optical path of light flux emitted from the light source 2200c and converts the light flux into a substantially parallel light flux.

The coupling lens 2201d is disposed on an optical path of light flux emitted from the light source 2200d and converts the light flux into a substantially parallel light flux.

The aperture plate 2202a has an opening and shapes light flux having passed through the coupling lens 2201a.

The aperture plate 2202b has an opening and shapes light flux having passed through the coupling lens 2201b.

The aperture plate 2202c has an opening and shapes light flux having passed through the coupling lens 2201c.

The aperture plate 2202d has an opening and shapes the light flux having passed through the coupling lens 2201d.

The cylindrical lens 2204a focuses the light flux having passed through the opening of the aperture plate 2202a and forms an image near the deflecting reflective surface of the polygon mirror 2104 in the Z axis direction.

The cylindrical lens 2204b focuses the light flux having passed through the opening of the aperture plate 2202b and forms an image near the deflecting reflective surface of the polygon mirror 2104 in the Z axis direction.

The cylindrical lens 2204c focuses the light flux having passed through the opening of the aperture plate 2202c and forms an image near the deflecting reflective surface of the polygon mirror 2104 in the Z axis direction.

The cylindrical lens 2204d focuses the light flux having passed through the opening of the aperture plate 2202d and forms an image near the deflecting reflective surface of the polygon mirror 2104 in the Z axis direction.

An optical system configured with the coupling lens 2201a, the aperture plate 2202a, and the cylindrical lens 2204a is a pre-deflector optical system of the K station.

An optical system configured with the coupling lens 2201b, the aperture plate 2202b, and the cylindrical lens 2204b is a pre-deflector optical system of the C station.

An optical system configured with the coupling lens 2201c, the aperture plate 2202c, and the cylindrical lens 2204c is a pre-deflector optical system of the M station.

An optical system configured with the coupling lens 2201d, the aperture plate 2202d, and the cylindrical lens 2204d is a pre-deflector optical system of the Y station.

The polygon mirror 2104 has four-sided mirrors having a two-stage structure that rotate around an axis parallel to the Z axis, and each mirror serves as a deflecting reflective surface. The polygon mirror 2104 is arranged such that the light flux from the cylindrical lens 2204b and the light flux from the cylindrical lens 2204c are deflected by the four-sided mirror of a first stage (a lower stage), and the light flux from the cylindrical lens 2204a and the light flux from the cylindrical lens 2204d are deflected by the four-sided mirror of a second stage (an upper stage) and.

The light flux from the cylindrical lens 2204a and the light flux from the cylindrical lens 2204b are deflected toward the −X side of the polygon mirror 2104, and the light flux from the cylindrical lens 2204c and the light flux the cylindrical lens 2204d are deflected toward the +X side of the polygon mirror 2104.

Each of the scanning lenses has optical power for condensing the light flux to the vicinity of the corresponding photosensitive element and optical power for enabling the optical spot to move on the surface of the corresponding photosensitive element in the main scanning direction at the constant speed along with the rotation of the polygon mirror 2104.

The scanning lens 2105a and the scanning lens 2105b are disposed on the −X side of the polygon mirror 2104, and the scanning lens 2105c and the scanning lens 2105d are disposed on the +X side of the polygon mirror 2104.

Further, the scanning lens 2105a and the scanning lens 2105b are stacked in the Z axis direction. The scanning lens 2105b faces the four-sided mirror of the first stage, and the scanning lens 2105a faces the four-sided mirror of the second stage. The scanning lens 2105c and the scanning lens 2105d are stacked in the Z axis direction. The scanning lens 2105c faces the four-sided mirror of the first stage, and the scanning lens 2105d faces the four-sided mirror of the second stage.

The light flux from the cylindrical lens 2204a deflected by the polygon mirror 2104 is irradiated to the photosensitive element 2030a via the scanning lens 2105a and the reflection mirror 2106a, so that the optical spot is formed on the photosensitive element 2030a. The optical spot moves in the longitudinal direction of the photosensitive element 2030a along with the rotation of the polygon mirror 2104. In other words, the surface of the photosensitive element 2030a is scanned with the optical spot. At this time, the movement direction of the optical spot is the "main scanning direction" of the photosensitive element 2030a, and the rotational direction of the photosensitive element 2030a is the "sub scanning direction" of the photosensitive element 2030a.

Further, the light flux from the cylindrical lens 2204b deflected by the polygon mirror 2104 is irradiated to the photosensitive element 2030b via the scanning lens 2105b, the reflection mirror 2106b, and the reflection mirror 2108b, so that the optical spot is formed on the photosensitive element 2030b. The optical spot moves in the longitudinal direction of the photosensitive element 2030b along with the rotation of the polygon mirror 2104. In other words, the surface of the photosensitive element 2030b is scanned with the optical spot. At this time, the movement direction of the optical spot is the "main scanning direction" of the photosensitive element 2030b, and the rotational direction of the photosensitive element 2030b is the "sub scanning direction" of the photosensitive element 2030b.

Further, the light flux from the cylindrical lens 2204c deflected by the polygon mirror 2104 is irradiated to the photosensitive element 2030c via the scanning lens 2105c, the reflection mirror 2106c and the reflection mirror 2108c, so that the optical spot is formed on the photosensitive element 2030c. The optical spot moves in the longitudinal direction of the photosensitive element 2030c along with the rotation of the polygon mirror 2104. In other words, the surface of the photosensitive element 2030c is scanned with the optical spot. At this time, the movement direction of the optical spot is the "main scanning direction" of the photosensitive element 2030c, and the rotational direction of the photosensitive element 2030c is the "sub scanning direction" of the photosensitive element 2030c.

Further, the light flux from the cylindrical lens 2204d deflected by the polygon mirror 2104 is irradiated to the photosensitive element 2030d via the scanning lens 2105d and the reflection mirror 2106d, so that the optical spot is formed on the photosensitive element 2030d. The optical spot moves in the longitudinal direction of the photosensitive element 2030d along with the rotation of the polygon mirror 2104. In other words, the surface of the photosensitive element 2030d is scanned with the optical spot. At this time, the movement direction of the optical spot is the "main scanning direction" of the photosensitive element 2030d, and the rotational direction of the photosensitive element 2030d is the "sub scanning direction" of the photosensitive element 2030d.

The reflection mirrors are disposed so that light path lengths between the polygon mirror 2104 and the respective photosensitive elements can be the same as one another, and incident positions and incident angles of the light fluxes in the respective photosensitive elements can be the same as one another.

The optical system disposed in the optical path between the polygon mirror 2104 and each photosensitive element is also referred to as a "scanning optical system". Here, the scanning optical system for the K station is configured with the scanning lens 2105a and the reflection mirror 2106a. The scanning optical system for the C station is configured with the scanning lens 2105b and the two reflection mirrors 2106b and 2108b. The scanning optical system for the M station is configured with the scanning lens 2105c and the two reflection mirrors 2106c and 2108c. The scanning optical system for the Y station is configured with the scanning lens 2105d and the reflection mirror 2106d. In each scanning optical system, the scanning lens may be configured with a plurality of lenses.

Figure 8:
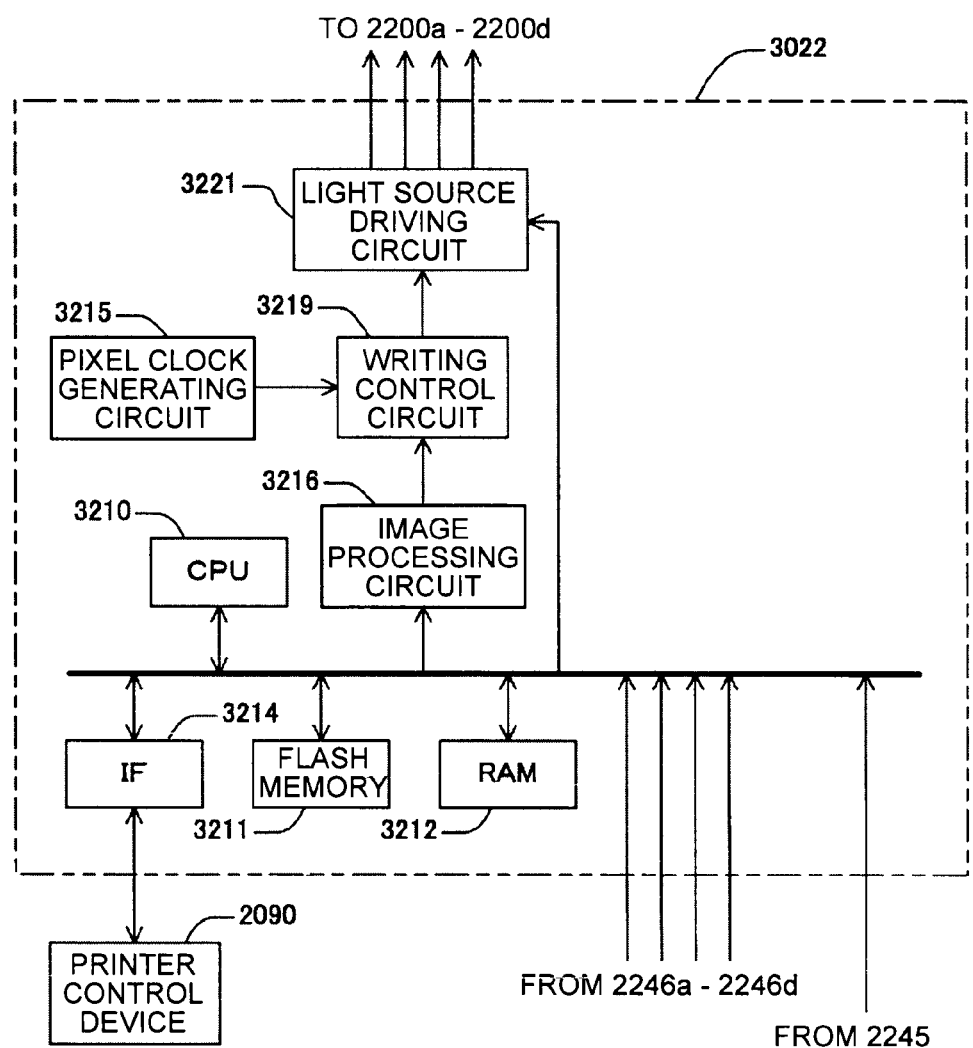
FIG. 8 is a block diagram for explaining a scanning control device.

The scanning control device 3022 includes a CPU 3210, a flash memory 3211, a RAM 3212, an interface (IF) 3214, a pixel clock generating circuit 3215, an image processing circuit 3216, a writing control circuit 3219, a light source driving circuit 3221, and the like as illustrated in FIG. 8 as an example. An arrow illustrated in FIG. 8 represents the flow of a representative signal or information but does not represent all of connection relations between blocks.

The IF 3214 refers to a communication interface for controlling two-way communication with the printer control device 2090. Image data from the higher-level device is supplied via the IF 3214.

The pixel clock generating circuit 3215 generates a pixel clock signal. The pixel clock signal can be phase-modulated with the resolution of ⅛ clock.

The image processing circuit 3216 performs, for example, a predetermined halftone process on image data which is raster-developed for each color by the CPU 3210 and then generates dot data of each light-emitting unit of each light source.

The writing control circuit 3219 acquires writing start timing based on an output signal of a synchronization detection sensor (not shown) for each image forming station. According to the writing start timing, the writing control circuit 3219 superimposes the dot data of each light-emitting unit on the pixel clock signal from the pixel clock generating circuit 3215 and generates independent modulation data for each light-emitting unit.

The light source driving circuit 3221 outputs a driving signal of each light-emitting unit to each light source in response to each modulation data from the writing control circuit 3219.

The flash memory 3211 stores a variety of programs described by codes readable by the CPU 3210 and a variety of data necessary for execution of the programs.

The RAM 3212 serves as a work memory.

The CPU 3210 operates according to the program stored in the flash memory 3211 and controls the overall optical scanning device 2010.

Meanwhile, as described above, when the photosensitive element is eccentric or has a shape error, an unnecessary density variation in the sub scanning direction occurs in the output image. Further, when the developing roller is eccentric or has a shape error, an unnecessary density variation in the sub scanning direction occurs in the output image (see FIGS. 9 and 10).

In this regard, the CPU 3210 acquires light quantity correction information, which is used for suppressing the density variation in the sub scanning direction caused by the eccentricity or the shape error of the photosensitive element or the density variation in the sub scanning direction caused by the eccentricity or the shape error of the developing roller, at predetermined timing. Hereinafter, a process for acquiring the light quantity correction information is roughly referred as "light quantity correction information acquiring process".

At the time of power activation, the light quantity correction information acquiring process is performed in the following cases as the predetermined timing: (1) when a suspension time of the photosensitive element is 6 hours or more; (2) when the temperature inside the device changes by 10° C. or more; or (3) when relative humidity inside the device changes by 50% or more. Further, at the time of printing, the light quantity correction information acquiring process is performed in the following cases as the predetermined timing: (4) when the number of print sheets reaches a predetermined number of sheets; (5) the number of rotation times of the developing roller reaches a predetermined number of times; or (6) a traveling distance of the transfer belt reaches a predetermined distance.

Figure 11:
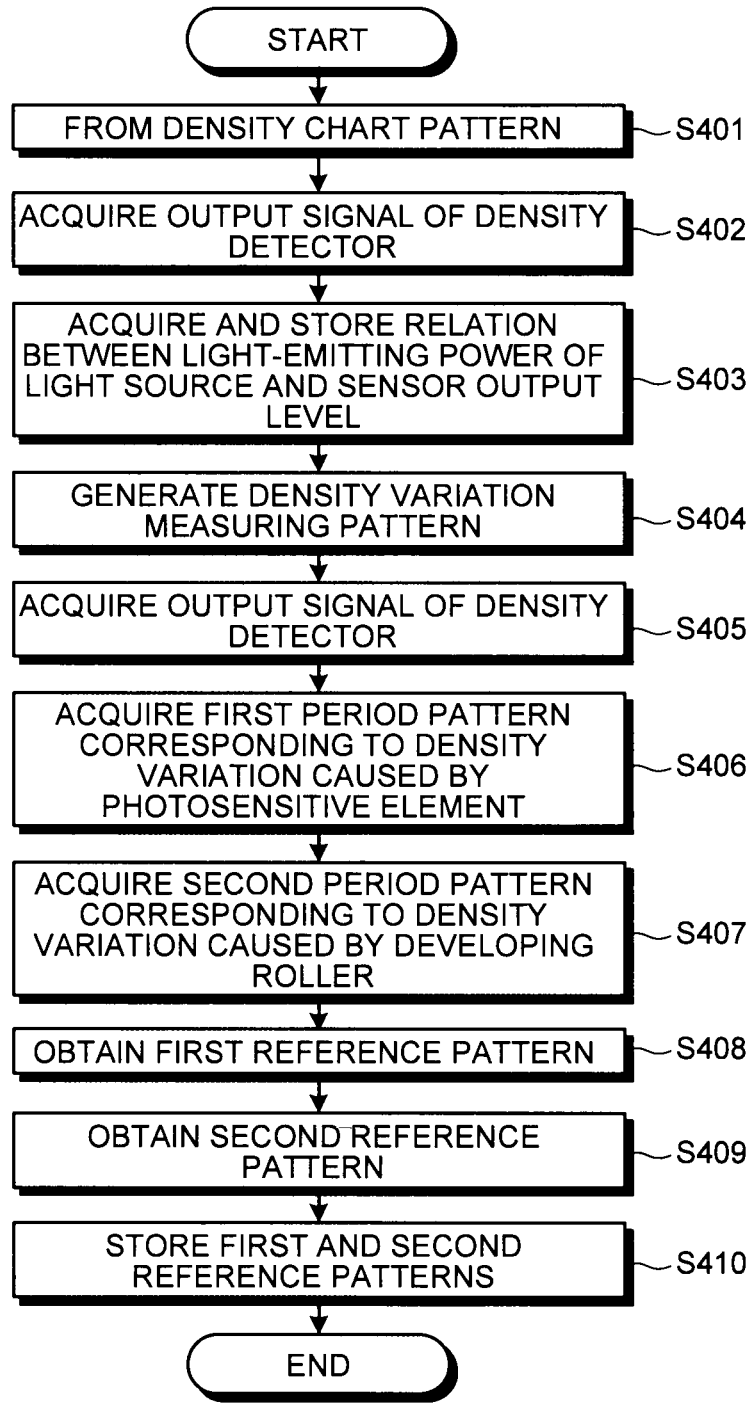
FIG. 11 is a flowchart for explaining a light quantity correction information acquiring process.

The light quantity correction information acquiring process will be described with reference to FIG. 11. A flowchart of FIG. 11 corresponds to an algorithm including a series of processes executed by the CPU 3210 at the time of the light quantity correction information acquiring process. The light quantity correction information acquiring process is performed for each station; but since it is performed in the same manner for each station, a description will be exemplarily made in connection the light quantity information acquiring process for the K station.

Figure 12:
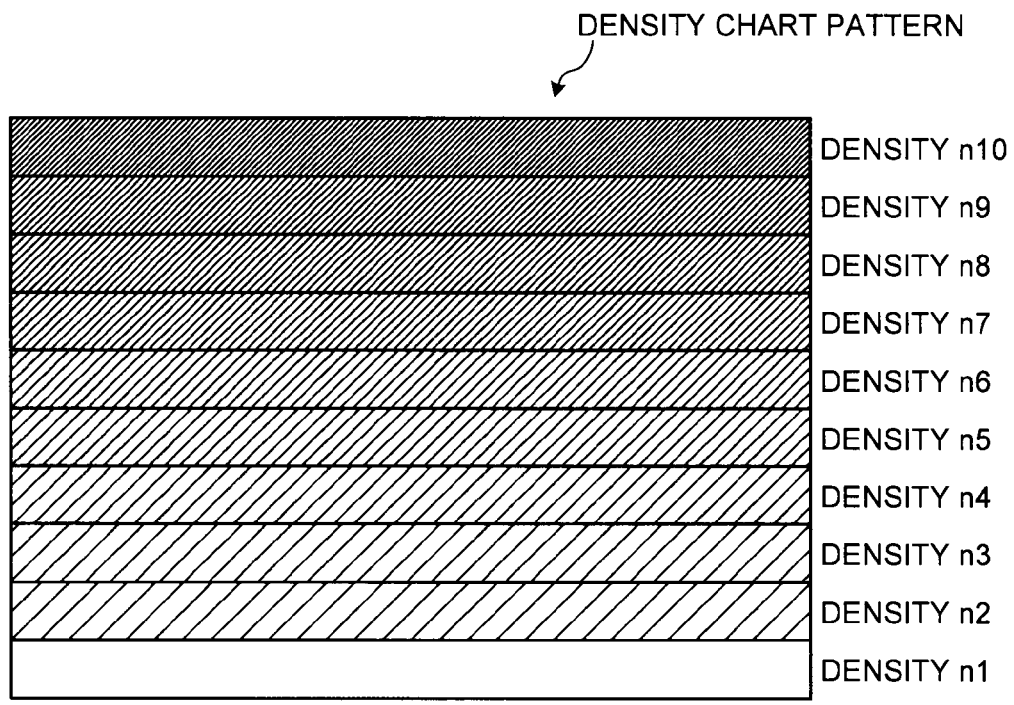
FIG. 12 is a diagram for explaining a density chart pattern.
Figure 13:
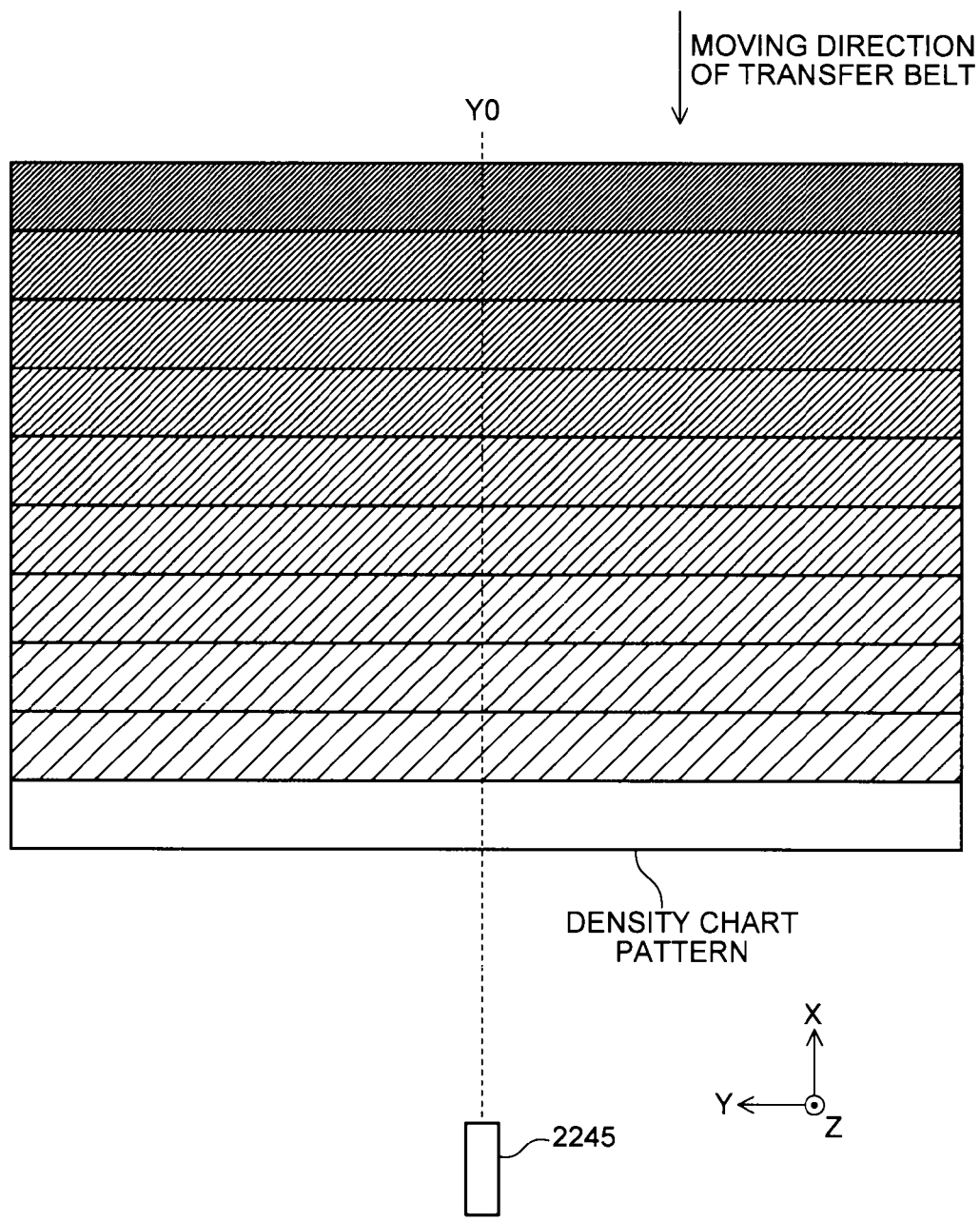
FIG. 13 is a diagram for explaining a positional relation between a density chart pattern and a density detector.
Figure 14:
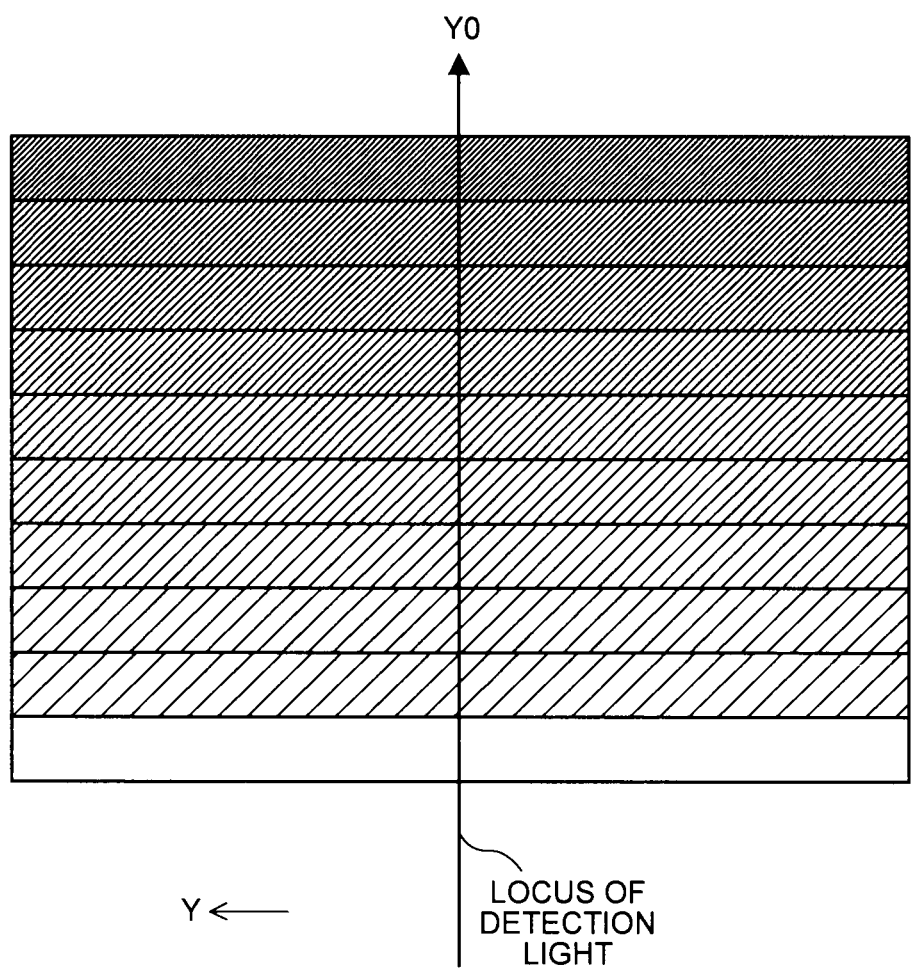
FIG. 14 is a diagram for explaining a locus of detection light emitted from a density detector in a light quantity correction information acquiring process.
Figure 15A:
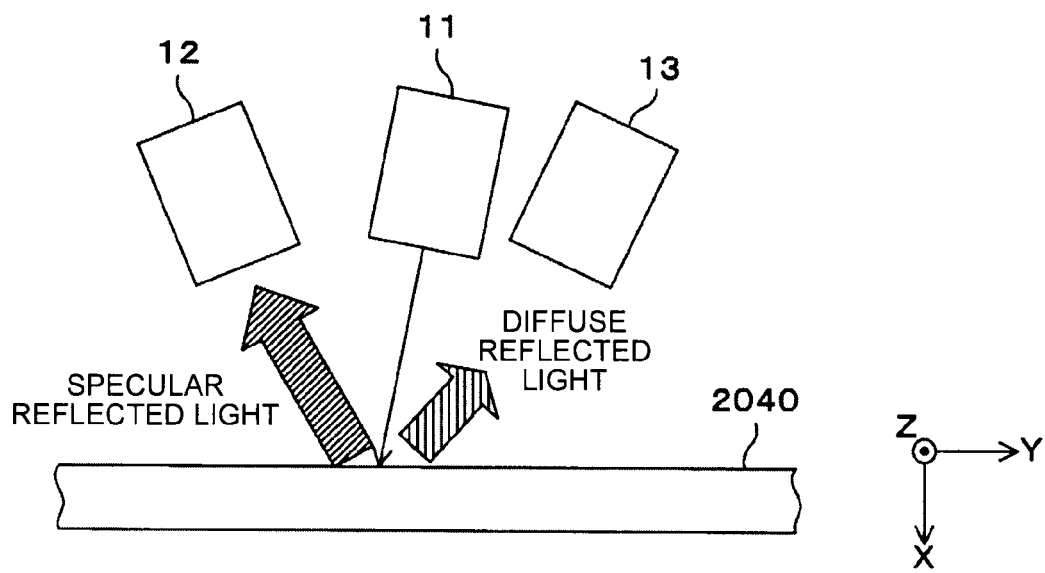
FIG. 15A is a diagram for explaining specular reflected light and diffuse reflected light when an illumination target of detection light is a transfer belt.
Figure 15B:
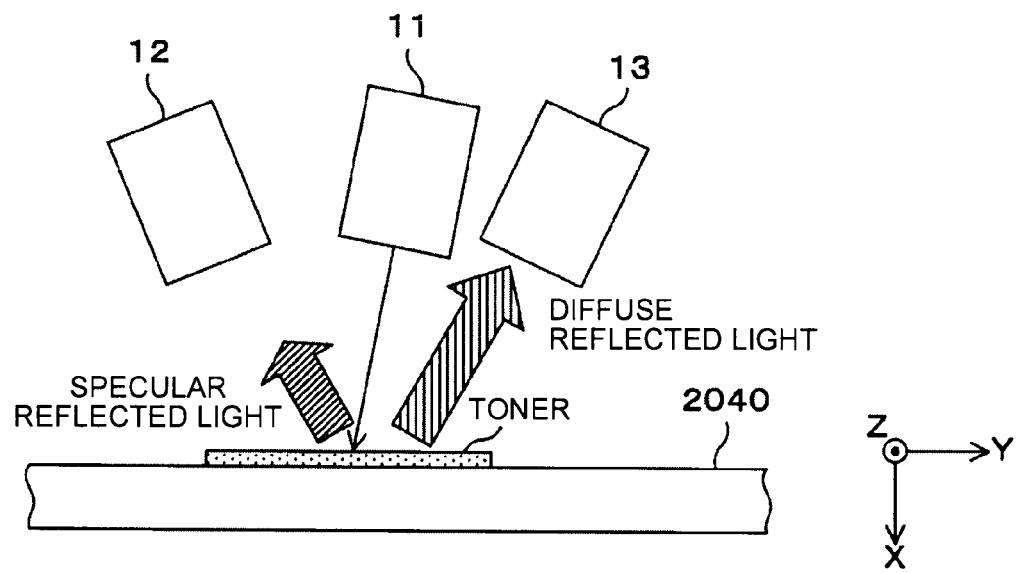
FIG. 15B is a diagram for explaining specular reflected light and diffuse reflected light when an illumination target of detection light is a toner pattern.

In step S401, a density chart pattern including a plurality of areas having different toner densities is formed for black as illustrated in FIG. 12 as an example so that the center position in the Y axis direction can be Y0 as illustrated in FIG. 13 as an example.

As an example, the density chart pattern includes areas of 10 types of densities n1 to n10. The density n1 is lowest in density, and the density n10 is highest in density. When the density chart pattern is formed, a lighting time of the light-emitting unit is constant regardless of the density, and light-emitting power changes according to the density. Here, p1 is defined as light-emitting power corresponding to the density n1; and p2 is defined as light-emitting power corresponding to the density n2. Further, in the same manner, p3 to p10 are defined as light-emitting power corresponding to the density n3 to n10, respectively.

In step S402, the LED 11 of the density detector 2245 is turned on. The area of the density n1 to the area of the density n10 in the density chart pattern are sequentially irradiated with light (referred to as "detection light") from the LED 11 as the transfer belt 2040 rotates, that is, as time elapses (see FIG. 14).

Then, output signals of the specular reflected light receiving element 12 and the diffuse reflected light receiving element 13 are acquired.

Meanwhile, when the toner does not remain attached to the transfer belt 2040, the detection light reflected by the transfer belt 2040 contains a large amount of the specular reflected light component compared to the diffuse reflected light component. Thus, a large amount of light is incident to the specular reflected light receiving element 12; but light is hardly incident to the diffuse reflected light receiving element 13 (see FIG. 15A).

However, when the toner remains attached to the transfer belt 2040, compared to when the toner does not remain attached to the transfer belt 2040, the specular reflected light component decreases, and the diffuse reflected light component increases. Thus, light incident to the specular reflected light receiving element 12 decreases, and light incident to the diffuse reflected light receiving element 13 increases (see FIG. 15B).

That is, it is possible to detect the density of the toner attached to the transfer belt 2040 based on the output levels of the specular reflected light receiving element 12 and the diffuse reflected light receiving element 13.

In step S403, the output level of the diffuse reflected light receiving element 13 is normalized using the following Equation (1) for each density in the density chart pattern. The normalized output level of the diffuse reflected light receiving element 13 is hereinafter referred to as "sensor output level" for convenience sake.

$$L = \text{(output level of diffuse reflected light receiving element 13)} / \{\text{(output level of specular reflected light receiving element 12)} + \text{(output level of diffuse reflected light receiving element 13)}\} \quad (1)$$

Figure 16:
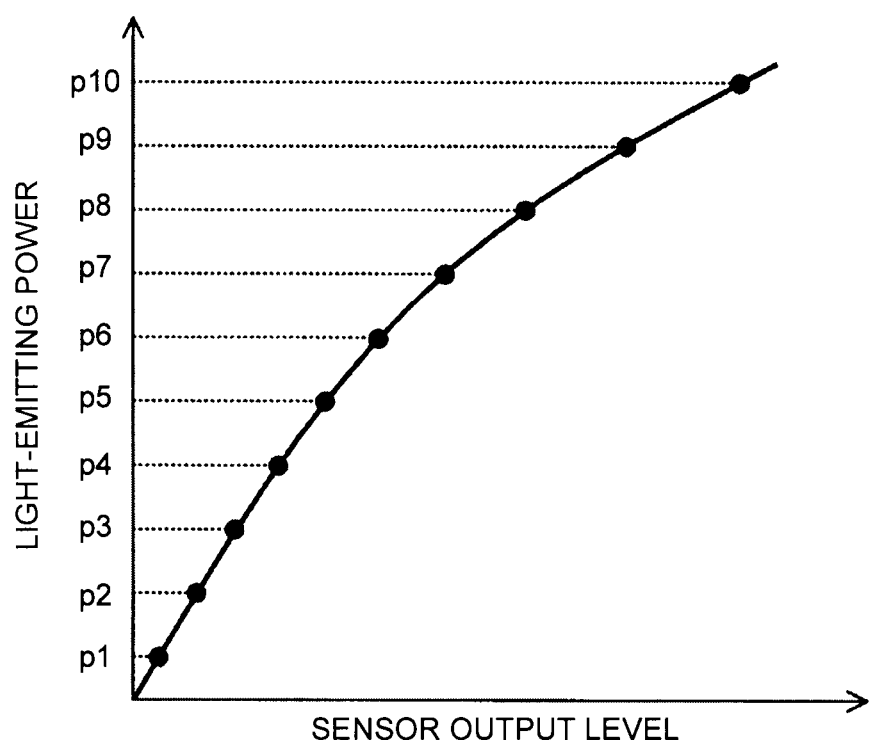
FIG. 16 is a diagram for explaining a relation between a light-emitting power and a sensor output level.
Figure 17:
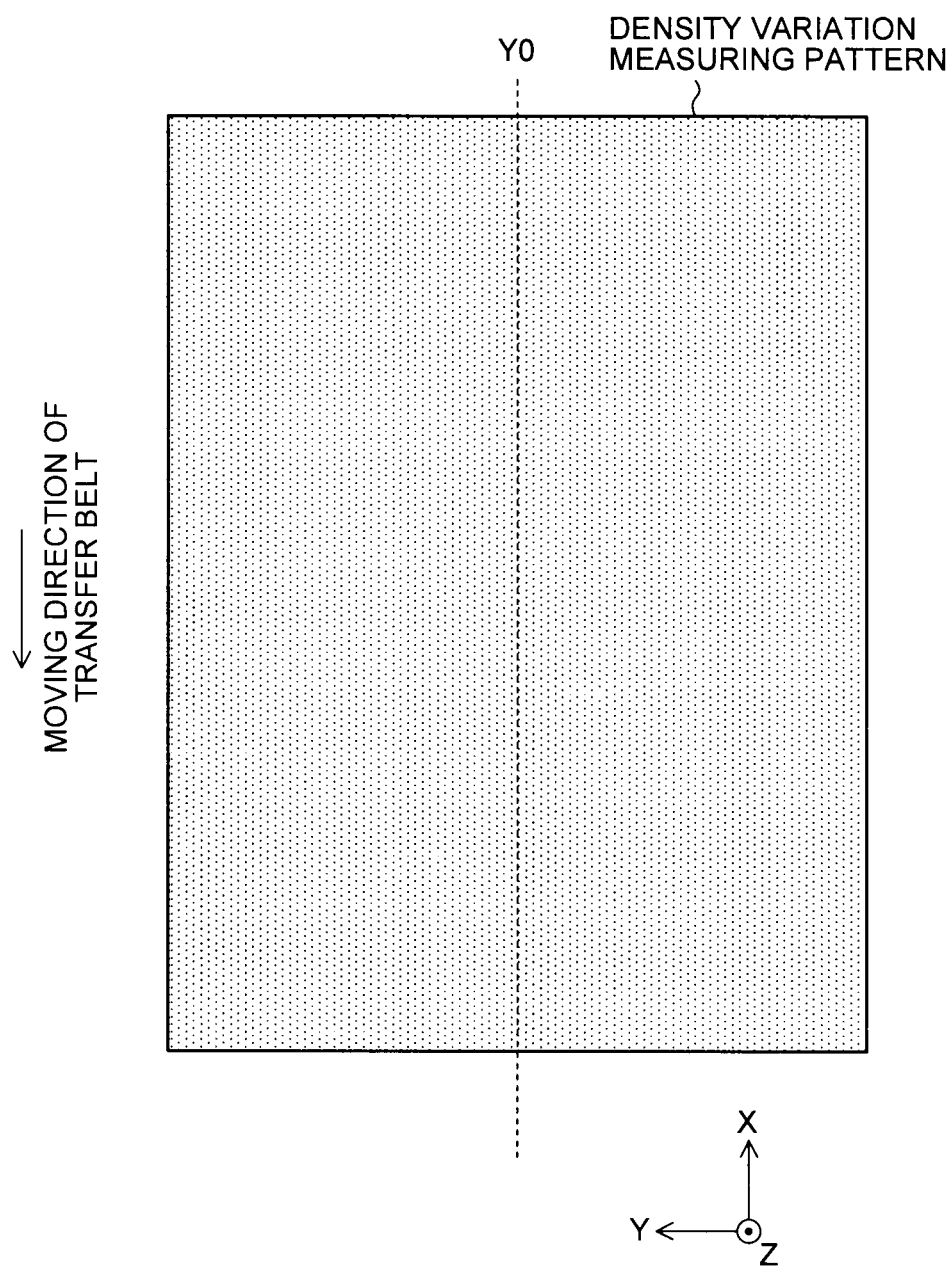
FIG. 17 is a diagram for explaining a density variation measuring pattern.
Figure 18:
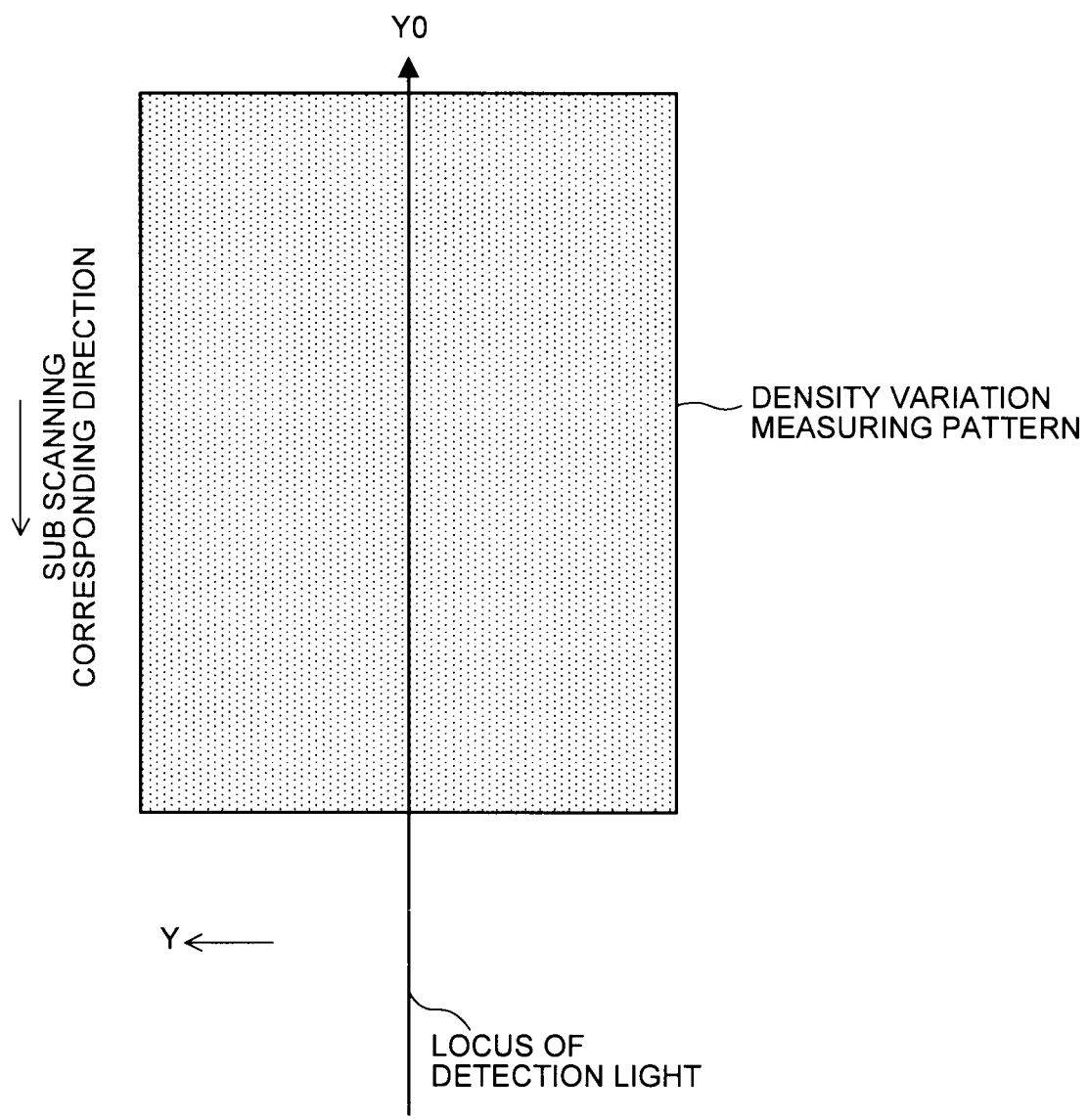
FIG. 18 is a diagram for explaining a locus of detection light emitted from a density detector on a density variation measuring pattern.

A correlation between the sensor output level and the light-emitting power is acquired (see FIG. 16). Here, the correlation is approximated by a polynomial equation, and the polynomial equation is stored in the flash memory 3211.

In step S404, a density variation measuring pattern is generated. Here, a black solid pattern is formed with an A3 vertical size as the density variation measuring pattern (see FIG. 17).

In step S405, the LED 11 of the density detector 2245 is turned on. The detection light from the LED 11 illuminates the density variation measuring pattern in a direction corresponding to the sub scanning direction as the transfer belt 2040 rotates, that is, as time elapses (see FIG. 18).

Figure 19:
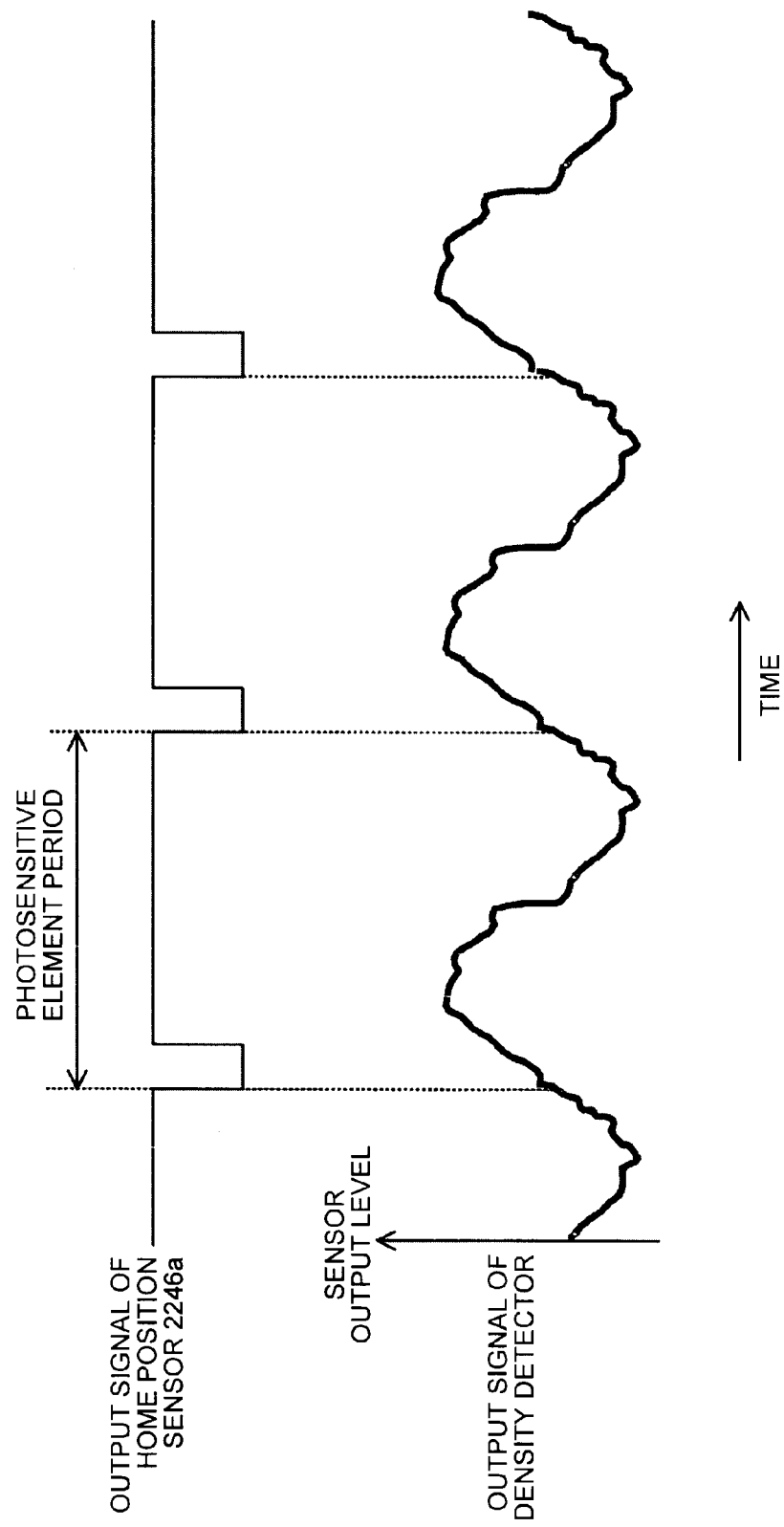
FIG. 19 is a timing chart for explaining a sensor output level of a density detector on a density variation measuring pattern.

The output signals of the specular reflected light receiving element 12 and the diffuse reflected light receiving element 13 are acquired at predetermined time intervals, and the sensor output level is calculated using Equation (1) (see FIG. 19). FIG. 19 also illustrates an output signal of the home position sensor 2246a.

As illustrated in FIG. 19, the sensor output level is not constant. A temporal variation in the sensor output level is hereinafter also referred to as "sensor output level waveform".

Figure 20:
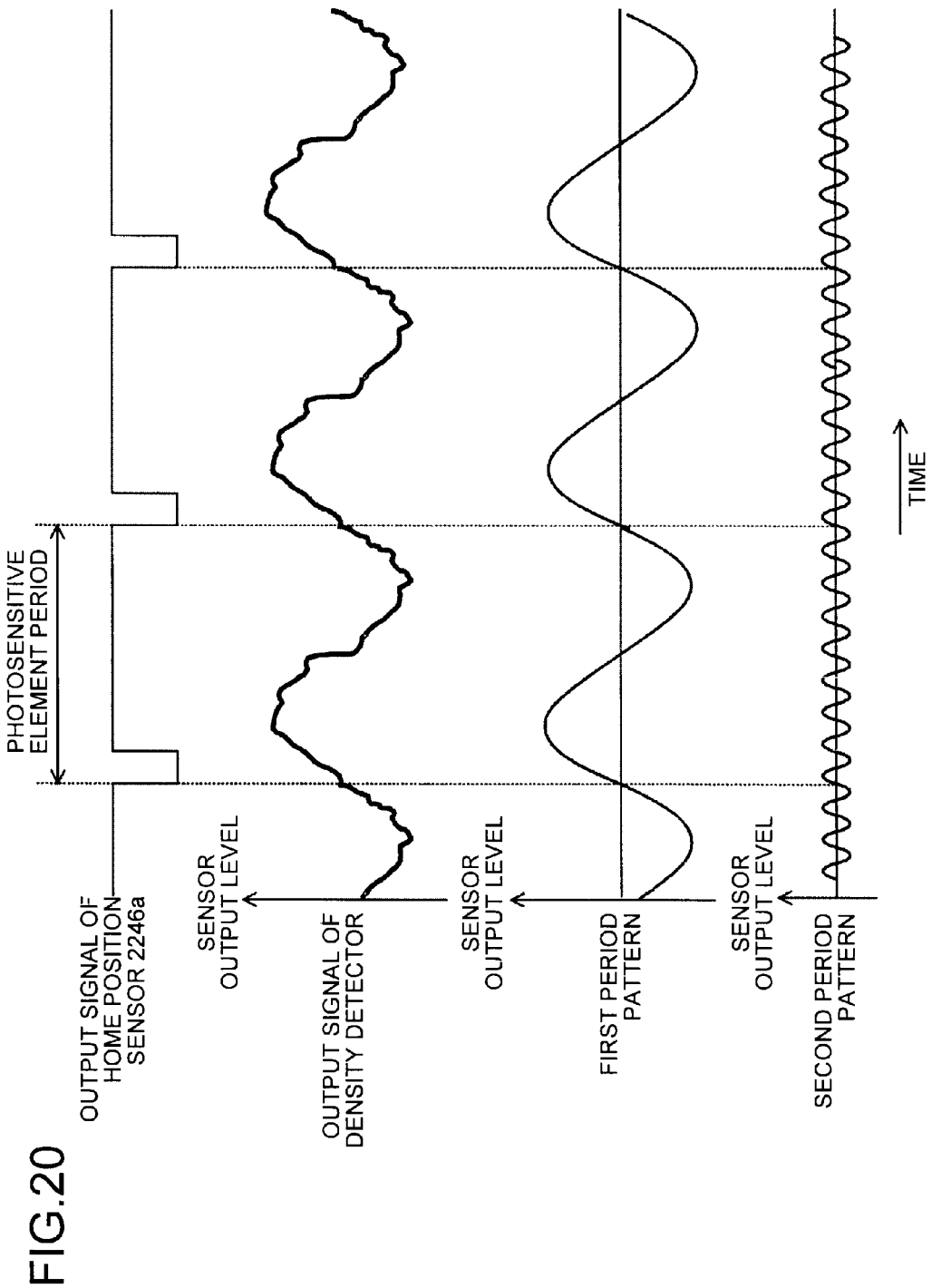
FIG. 20 is a timing chart for explaining a first period pattern and a second period pattern.

In step S406, a sine wave having the same period as a rotation period of the photosensitive element 2030a is extracted from the sensor output level waveform as a first period pattern based on the output signal of the home position sensor 2246a (see FIG. 20).

In step S407, a rotation period of the developing roller 2033a is obtained based on the diameter of the photosensitive element 2030a, the diameter of the developing roller 2033a, and the output signal of the home position sensor 2246a; and a sine wave having the same period as the rotation period of the developing roller 2033a is extracted from the sensor output level waveform as a second period pattern (see FIG. 20).

Figure 21:
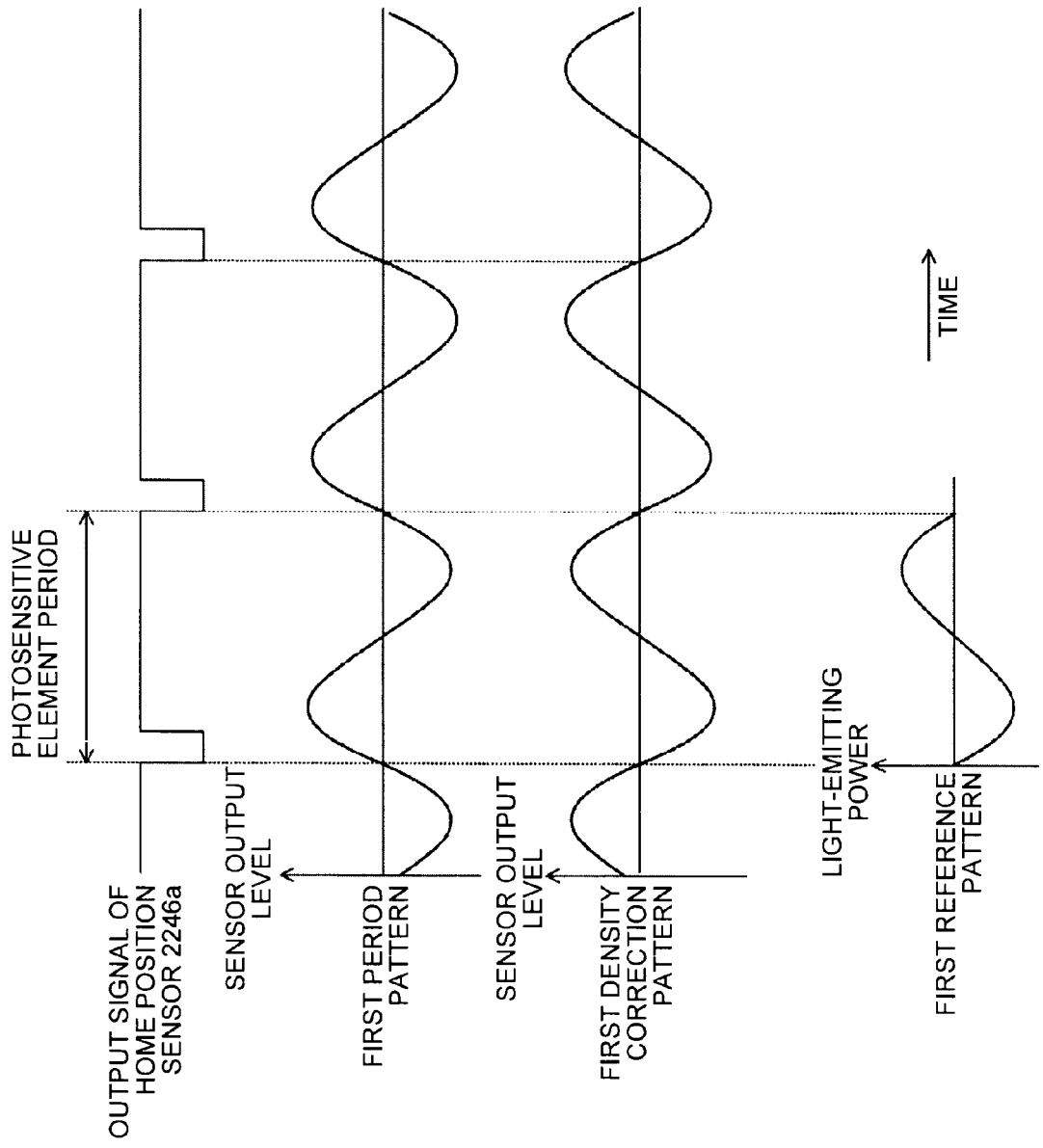
FIG. 21 is a timing chart for explaining a first reference pattern.

In step S408, as illustrated in FIG. 21, a first density correction pattern is obtained by shifting the phase of the first period pattern by a ½ wavelength; and a first reference pattern is obtained by converting the vertical axis from the sensor output level into the light-emitting power with reference to the correlation between the sensor output level and the light-emitting power on one period of the first density correction pattern.

Figure 22:
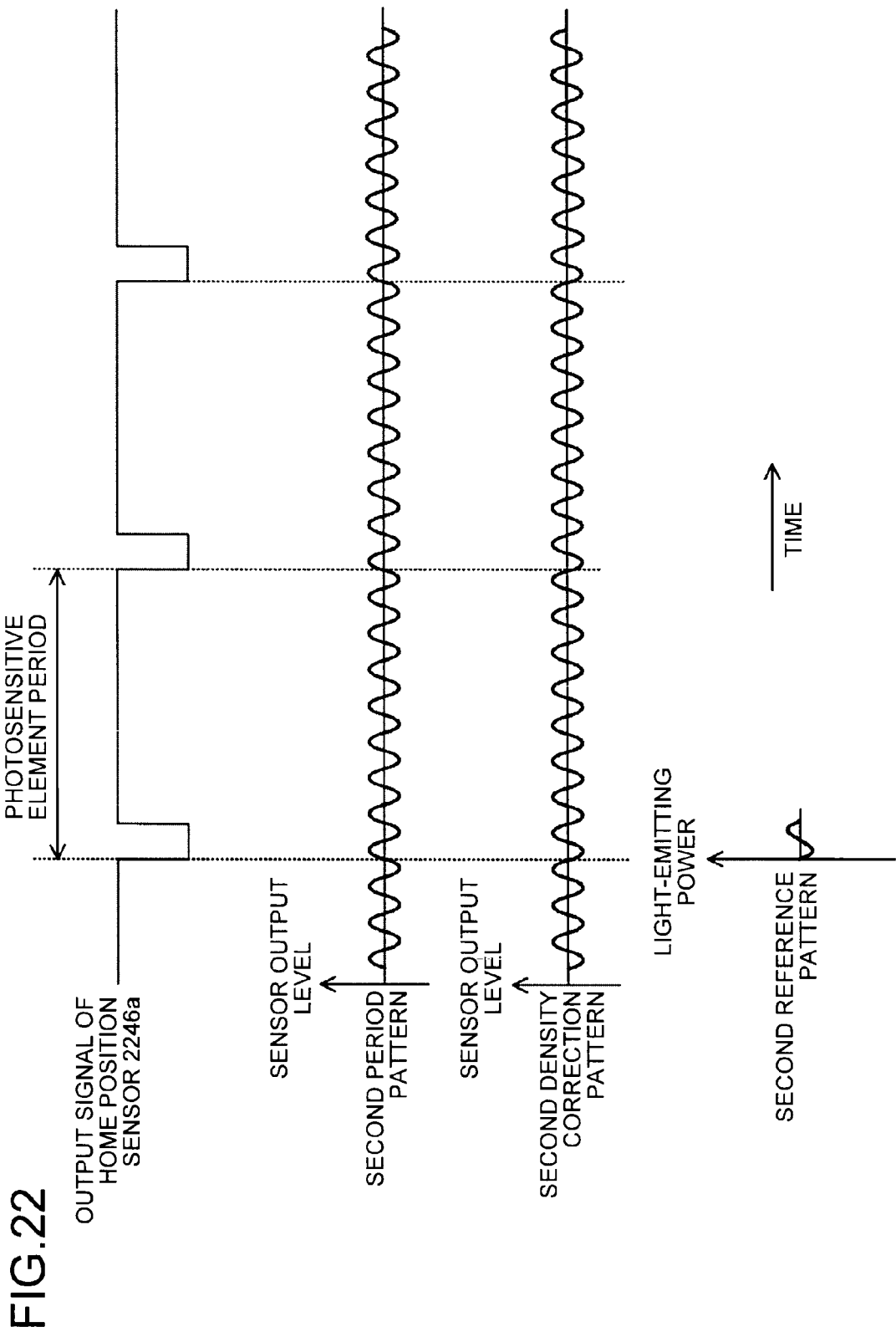
FIG. 22 is a timing chart for explaining a second reference pattern.

In step S409, as illustrated in FIG. 22, a second density correction pattern is obtained by shifting the phase of the second period pattern by a ½ wavelength; and a second reference pattern is obtained by converting the vertical axis from the sensor output level to the light-emitting power with reference to a correlation between the sensor output level and the light-emitting power on one period of the second density correction pattern.

In step S410, the first reference pattern and the second reference pattern are stored in the flash memory 3211, and the light quantity correction information acquiring process is finished.

Figure 23:
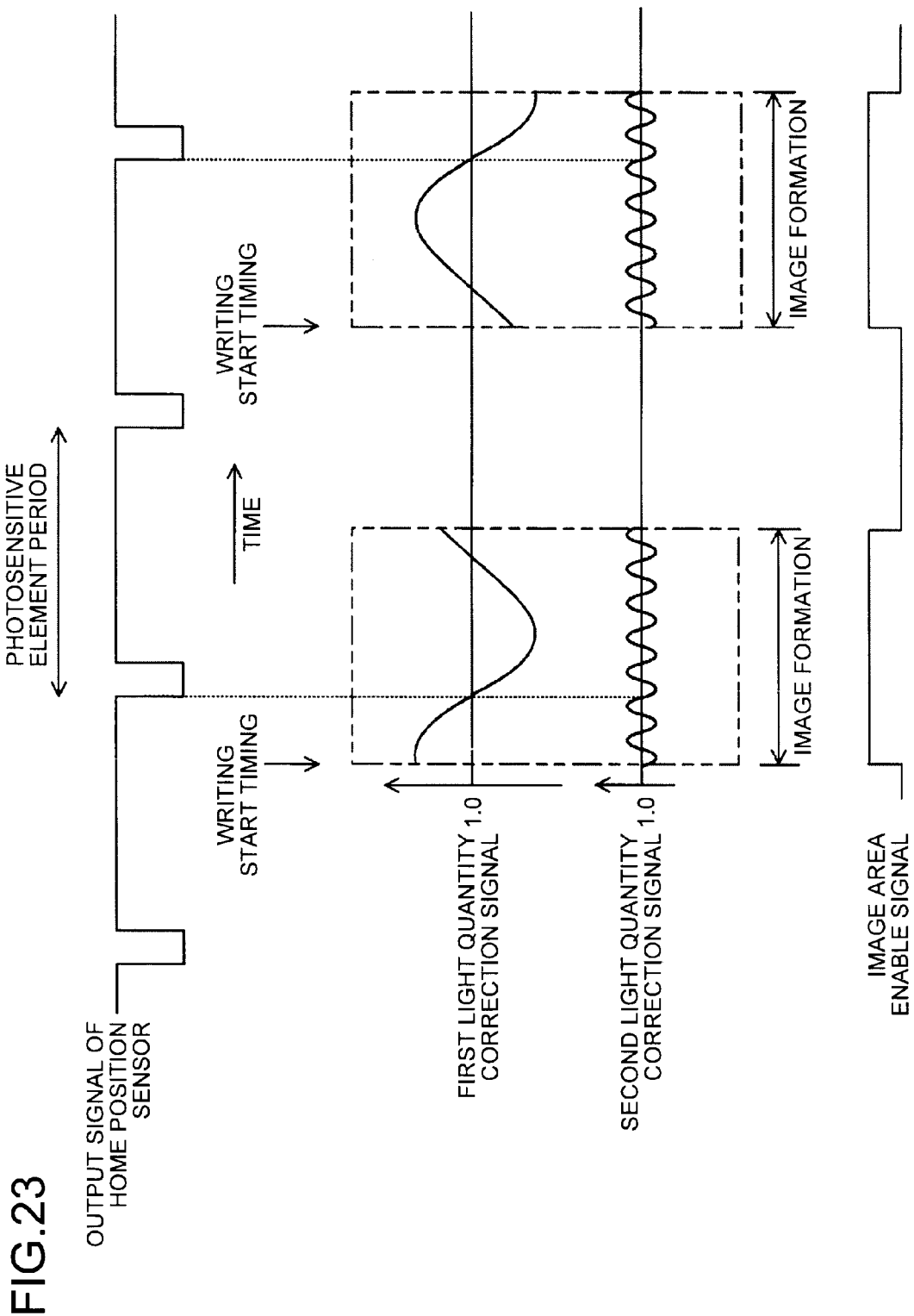
FIG. 23 is a timing chart for explaining a first light quantity correction signal and a second light quantity correction signal.
Figure 24:
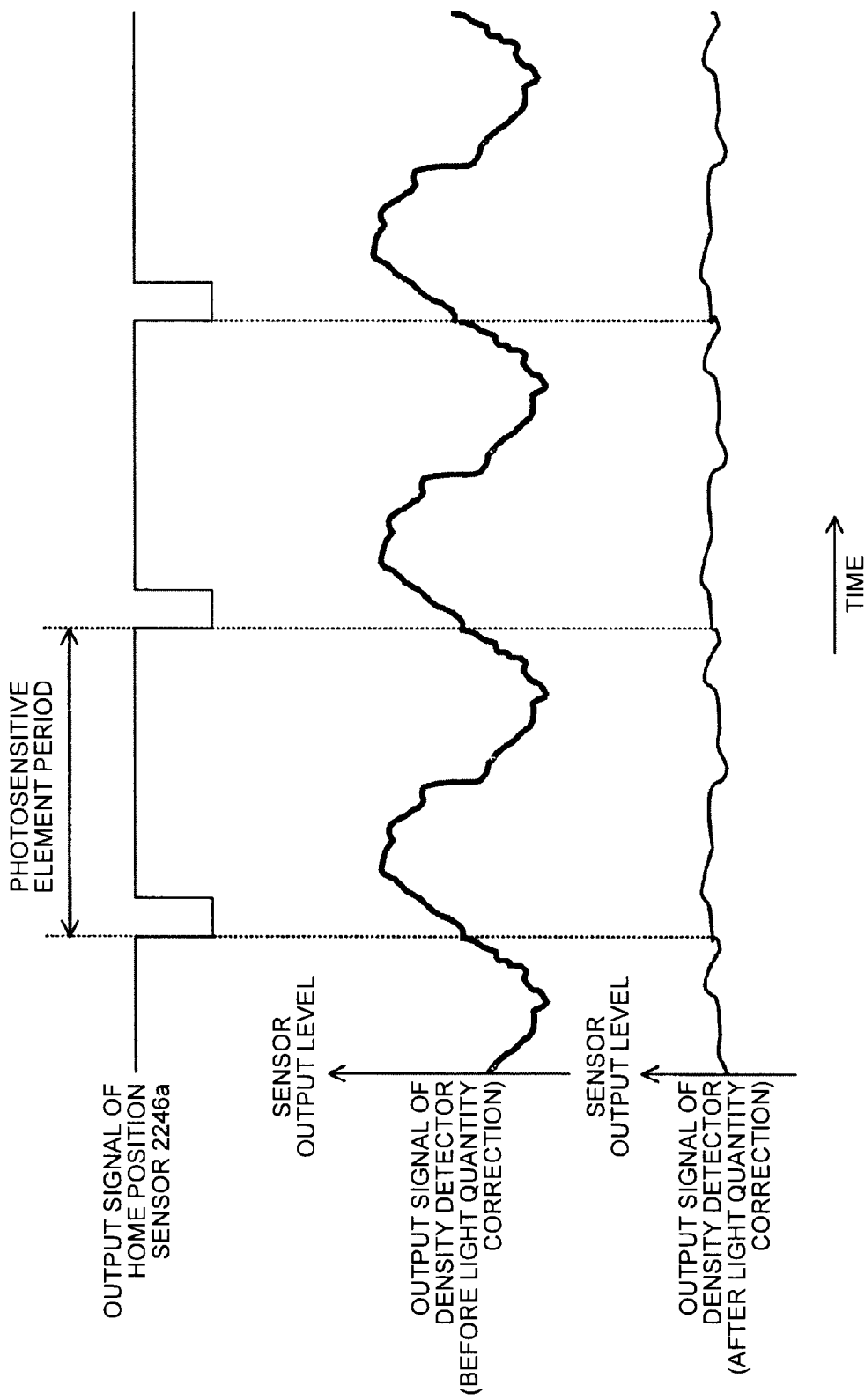
FIG. 24 is a timing chart for explaining a light quantity correction effect.

At the time of performing image formation, for each station, the CPU 3210 obtains a time difference between the home position and the writing start based on the output signal of the home position sensor and writing start timing obtained from an output signal of a synchronization detection sensor (not shown); and generates a first light quantity correction signal and a second light quantity correction signal by shifting the phase of the first reference pattern and the phase of the second reference pattern according to the time difference, respectively (see FIG. 23). Here, the vertical axis of each light quantity correction signal is converted to a coefficient having an average value of 1.0. Then, a driving signal is corrected by multiplying the coefficient and the driving signal of each light-emitting unit corresponding to image information. A non-corrected sensor output level and a corrected sensor output level of the density detector 2245 are illustrated in FIG. 24. In this way, it is possible to suppress the density variation in the sub scanning direction caused by the eccentricity or the shape error of the photosensitive element and the density variation in the sub scanning direction caused by the eccentricity or the shape error of the developing roller.

The horizontal axis (time) of each light quantity correction signal corresponds to the length of an image to be formed in the sub scanning direction. Here, when the time corresponding to the length of the image to be formed in the sub scanning direction is shorter than the rotation period of the photosensitive element, the first light quantity correction signal is generated based on a part of the first reference pattern. However, when the time corresponding to the length of the image to be formed in the sub scanning direction is longer than the rotation period of the photosensitive element, the first light quantity correction signal is generated based on a plurality of periods of the first reference pattern.

Further, when an image area enable signal having a signal level of a "high level" only at the time of image formation is generated, the image area enable signal may be used as a mask signal of each light quantity correction signal (see FIG. 23).

As described above, the color printer 2000 according to the first embodiment (1) includes the optical scanning device 2010, the four photosensitive elements 2030a, 2030b, 2030c, and 2030d, the four charging units 2032a, 2032b, 2032c, and 2032d, the four developing rollers 2033a, 2033b, 2033c, and 2033d, the transfer belt 2040, the density detector 2245, the four home position sensors 2246a, 2246b, 2246c, and 2246d, and the like.

The optical scanning device 2010 includes the four light sources 2200a, 2200b, 2200c, and 2200d, the four pre-deflector optical systems, the polygon mirror 2104, the four scanning optical systems, the scanning control device 3022, and the like.

The scanning control device 3022 obtains the first period pattern representing the density variation in the sub scanning direction caused by the eccentricity or the shape error of the photosensitive element and the second period pattern representing the density variation in the sub scanning direction caused by the eccentricity or the shape error of the developing roller based on the output signal of the density detector 2245 and the output signal of the corresponding home position sensor in each station at predetermined timing. The scanning control device 3022 store data corresponding to one period of the patterns obtained by shifting the phases of the first period pattern and the second period pattern by the ½ period as the first reference pattern and the second reference pattern, respectively, in the memory. Then, when image formation is performed, for each station, the scanning control device 3022 generates the first light quantity correction signal and the second light quantity correction signal using the first reference pattern and the second reference pattern and corrects the driving signal of each light-emitting unit.

In this case, it is possible to further reduce the density irregularity of the output image in the sub scanning direction compared to the related art. As a result, a high-quality image can be formed.

The first embodiment (1) has been described in connection with the case in which the sine wave is extracted as the first period pattern, but the present invention is not limited thereto.

Figure 25:
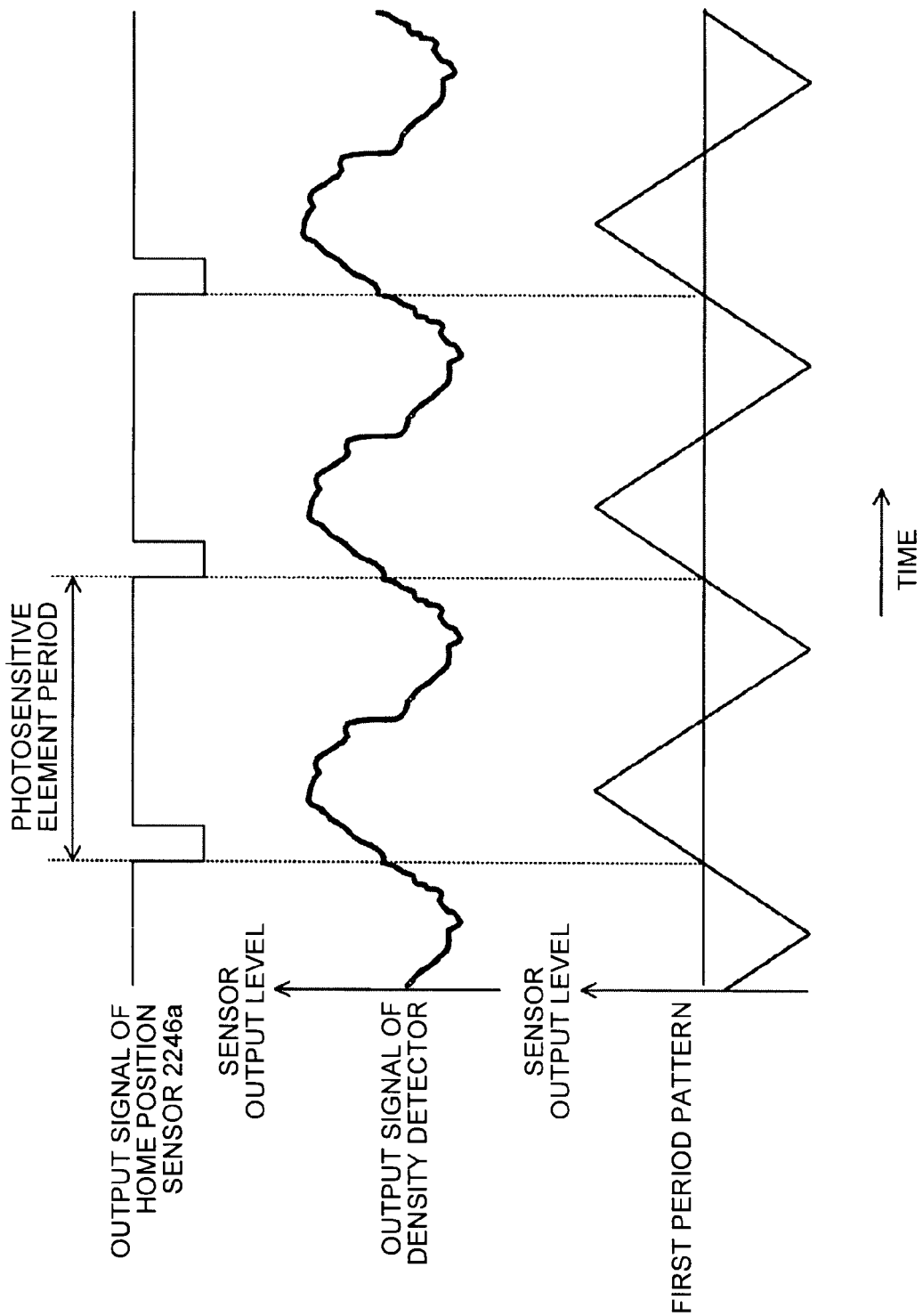
FIG. 25 is a timing chart for explaining a first modification of a first period pattern.

For example, as illustrated in FIG. 25, a triangle wave close to the sine wave may be extracted as the first period pattern. In this case, the first light quantity correction signal also has the triangle wave. The first light quantity correction signal can be generated when a phase shift time for the period of the photosensitive element and a correction range amount are known, and the data amount can be reduced, leading to the low cost.

Figure 26:
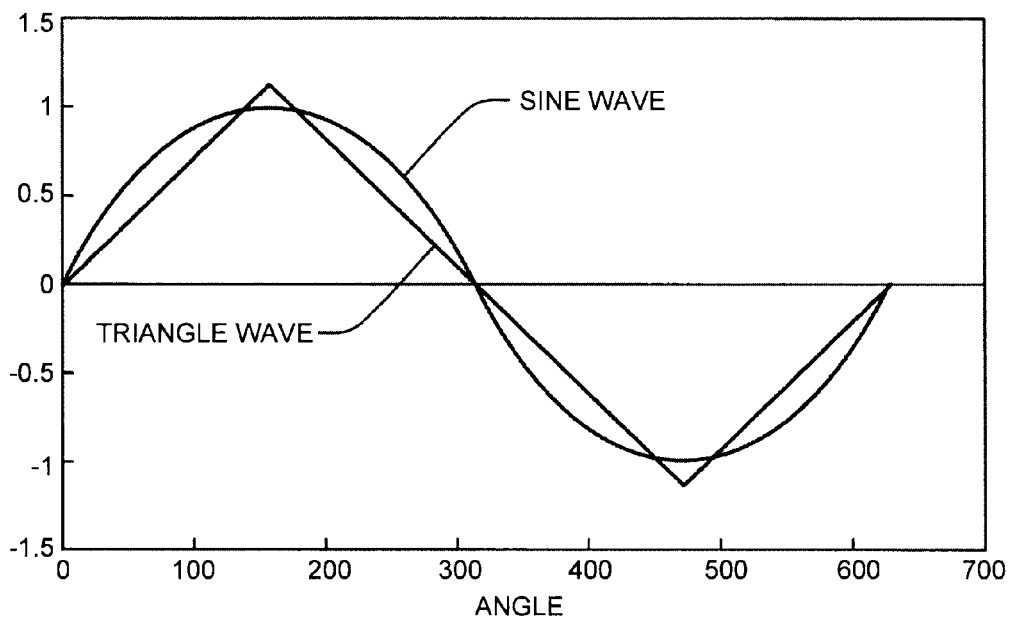
FIG. 26 is a diagram for explaining a difference between a triangle wave and a sine wave (1 thereof)

FIG. 26 illustrates the sine wave and the triangle wave close to the sine wave. In FIG. 26, the amplitude of the sine wave is set to 1.

Figure 27:
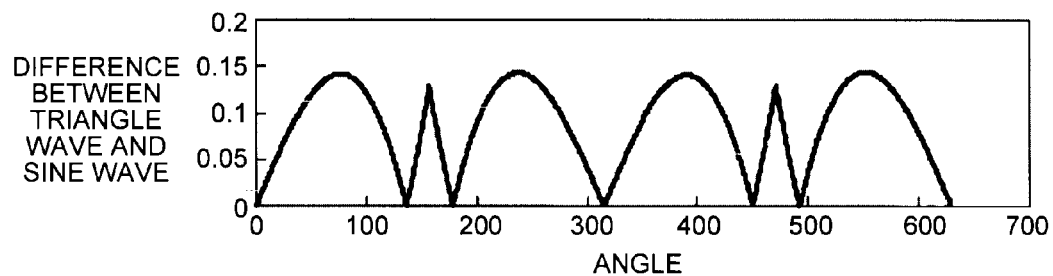
FIG. 27 is a diagram for explaining a difference between a triangle wave and a sine wave (2 thereof)

FIG. 27 illustrates a difference value between the sine wave and the triangle wave close to the sine wave. As can be seen from FIG. 27, the difference with the sine wave has a precipitous change in a peak portion of the triangle wave. Even though the triangle wave is approximated to the sine wave, the light quantity difference with the sine wave is about 15%.

Figure 28:
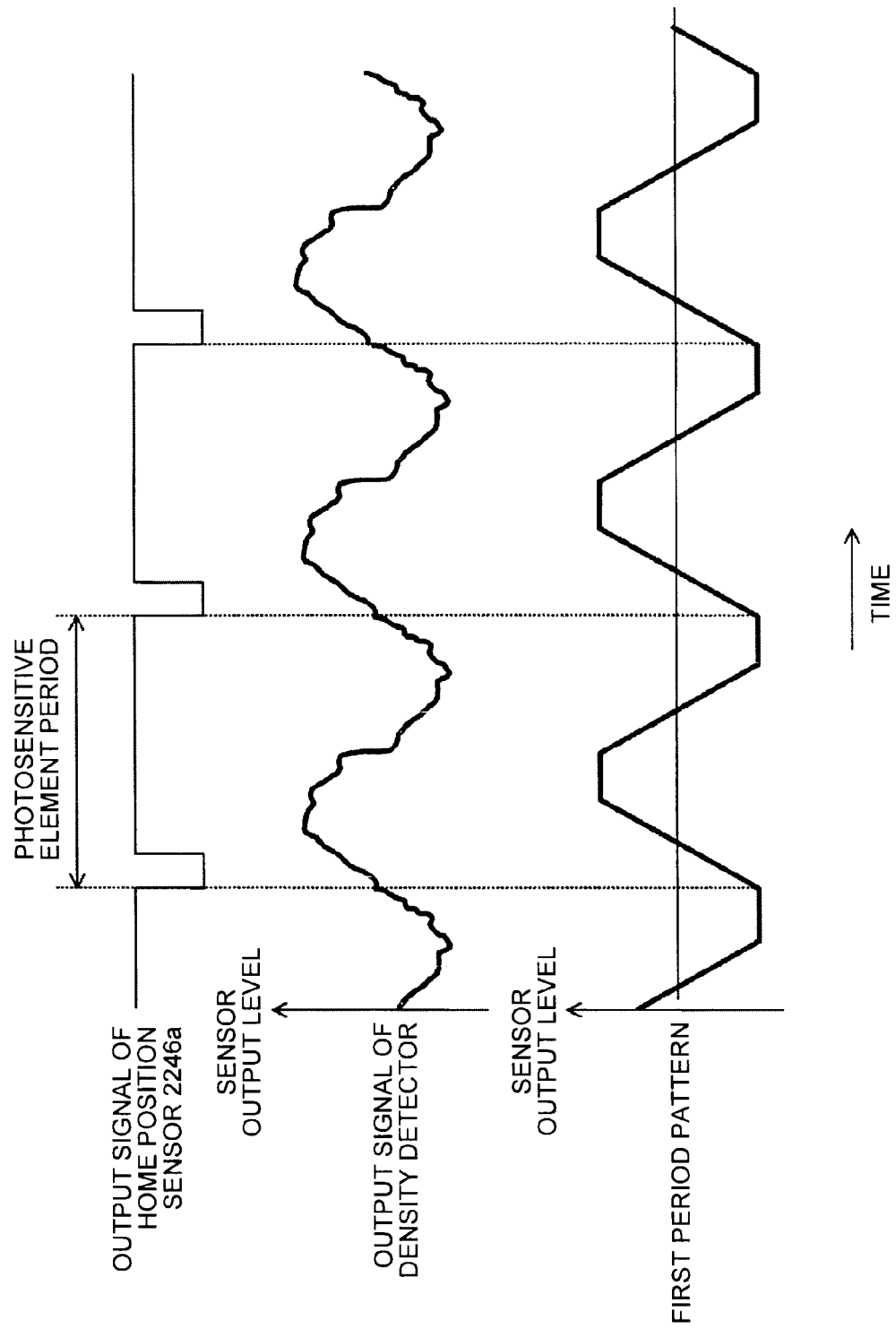
FIG. 28 is a timing chart for explaining a second modification of a first period pattern.
Figure 29:
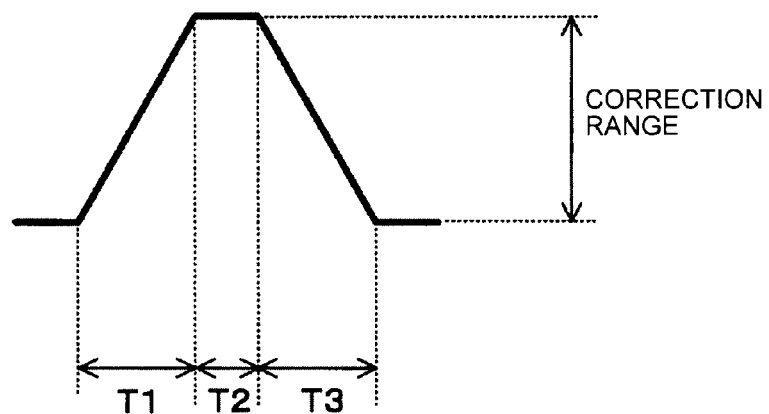
FIG. 29 is a diagram for explaining a trapezoidal wave of a second modification.
Figure 30:
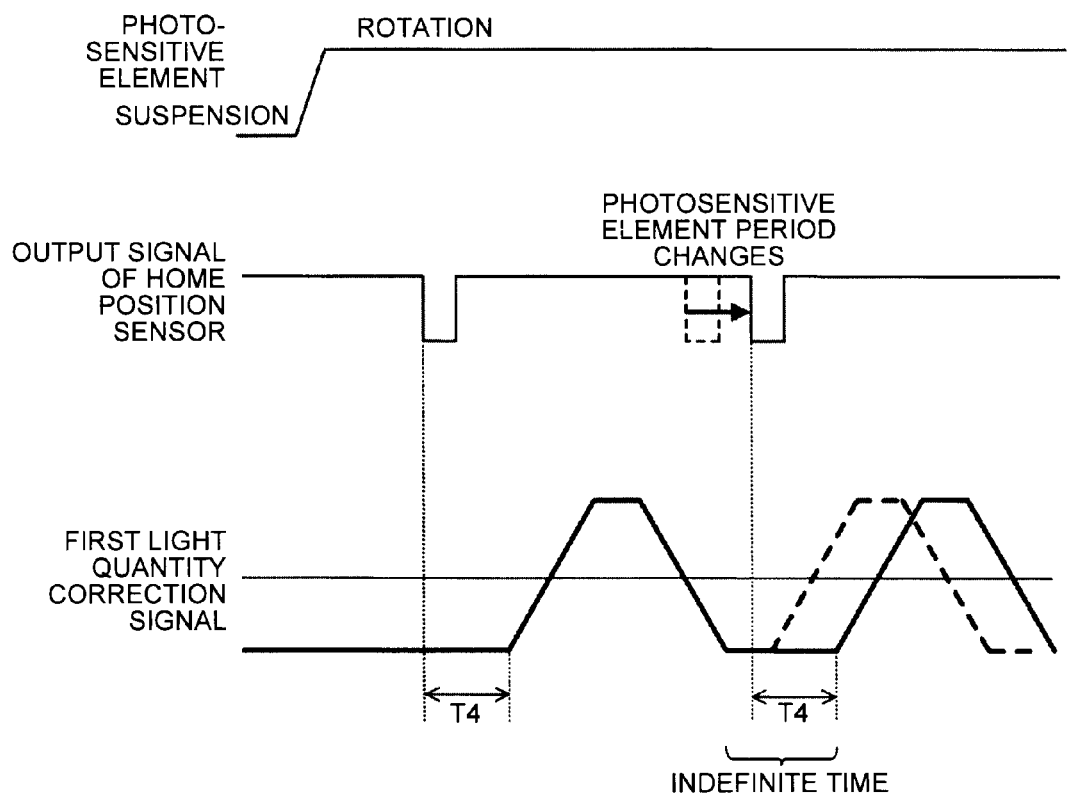
FIG. 30 is a diagram for explaining merit of a trapezoidal wave.

Further, as illustrated in FIG. 28 as an example, a trapezoidal wave close to the sine wave may be extracted as the first period pattern. In this case, the first quantity correction signal also has the trapezoidal wave. The first quantity correction signal can be generated when an increment time T1, a peak time T2, a decrement time T3, a correction range amount, and a phase shift time (defined as T4, see FIG. 30) for the period of the photosensitive element are known as illustrated in FIG. 29 as an example, and the data amount can be reduced compared to the sine wave.

The increment time T1 is obtained from the sensor output level waveform. The peak time T2 may be obtained from the sensor output level waveform but may be obtained from T1/2. The decrement time T3 is basically a value equal to T1. The phase shift time T4 is used for phase adjustment of the period of the photosensitive element and the writing start timing. When rotation of the photosensitive element is first rotation, it is defined by a period of a previously set default value.

The trapezoidal wave has a feature in which a density variation at the peak position is small unlike the triangle wave. Further, the trapezoidal wave has a feature in which even though the period of the photosensitive element changes, correction can be performed since there is no joint, (see FIG. 30).

Figure 31:
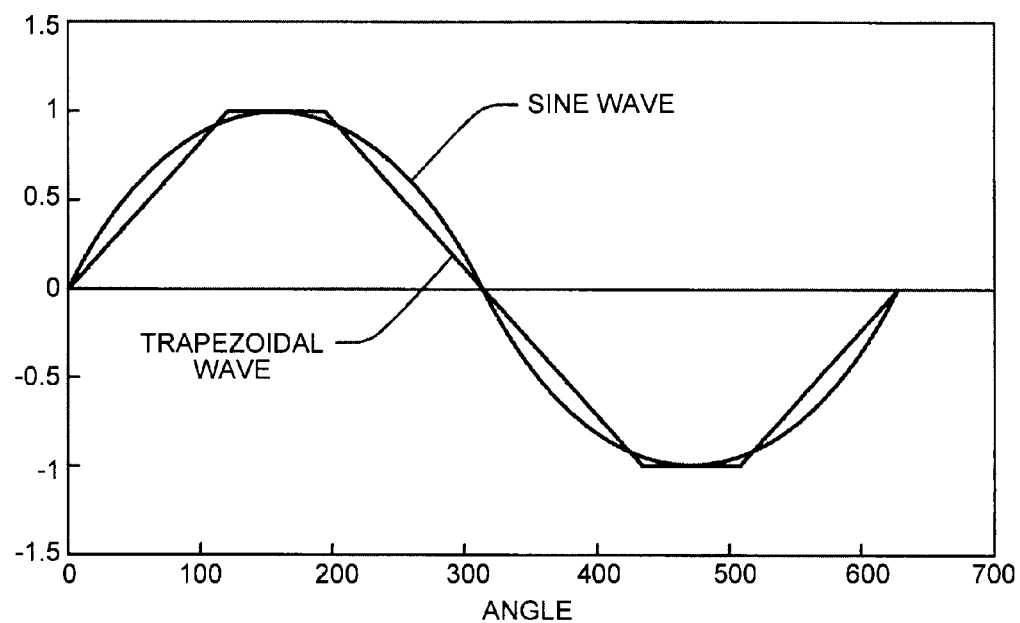
FIG. 31 is a diagram for explaining a difference between a trapezoidal wave and a sine wave (1 thereof)
Figure 32:
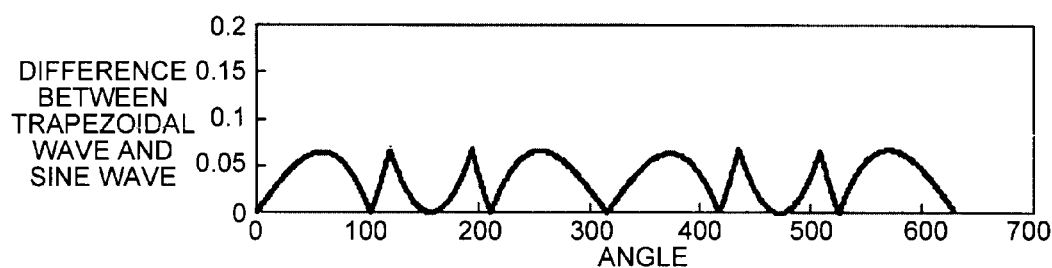
FIG. 32 is a diagram for explaining a difference between a trapezoidal wave and a sine wave (2 thereof)

FIG. 31 illustrates the sine wave and the trapezoidal wave close to the sine wave. FIG. 32 illustrates a difference value between the sine wave and the trapezoidal wave close to the sine wave.

In the case of the trapezoidal wave, the difference with the sine wave has a slightly precipitous change in an angular portion of the trapezoid, but this change is smaller than the case of the triangle wave. The difference with the sine wave as a whole is about 7% or less, and the sine wave can be simulated with a higher degree of accuracy than the case of the triangle wave.

The first embodiment (1) has been described in connection with the case in which the rotation period of the developing roller is obtained based on the diameter of the photosensitive element, the diameter of the developing roller, and the output signal of the home position sensor of the photosensitive element, but the present invention is not limited thereto.

The home position sensor may be disposed even in the developing roller, and the rotation period of the developing roller may be obtained based on the output signal of the home position sensor.

Figure 33:
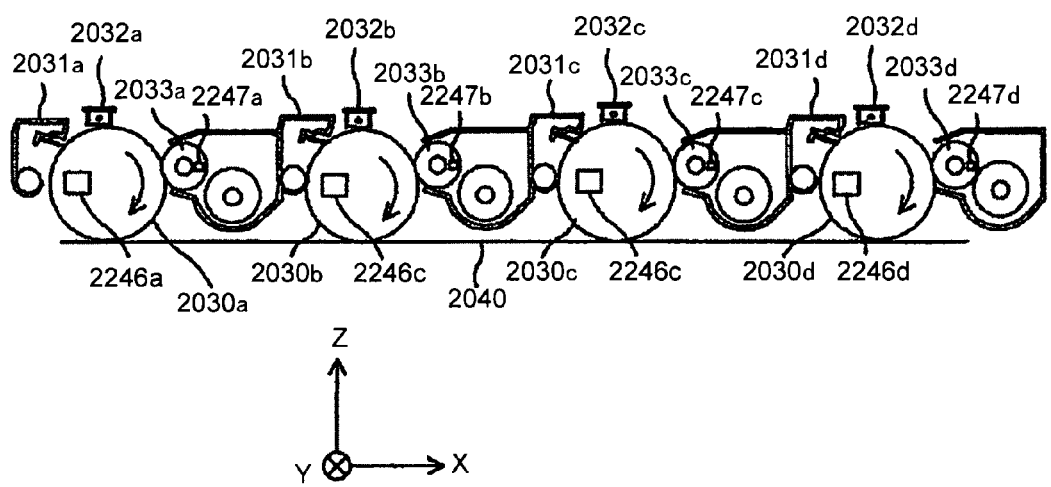
FIG. 33 is a diagram for explaining home position sensors of developing rollers.

As illustrated in FIG. 33 as an example, home position sensors (2247a to 2247d) may be disposed even in the respective developing rollers, and the rotation periods of the developing rollers may be obtained based on the output signals of the respective home position sensors (2247a to 2247d).

Figure 34:
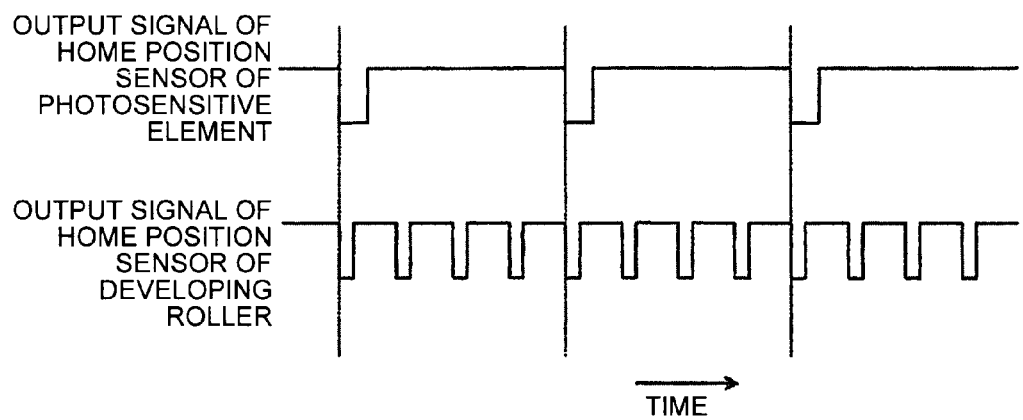
FIG. 34 is a diagram for explaining the relation between an output signal of the home position sensor of the photosensitive element and an output signal of the home position sensor of the developing roller.

An example of the relation between an output signal of the home position sensor of the photosensitive element and an output signal of the home position sensor of the developing roller is illustrated in FIG. 34.

Figure 35:
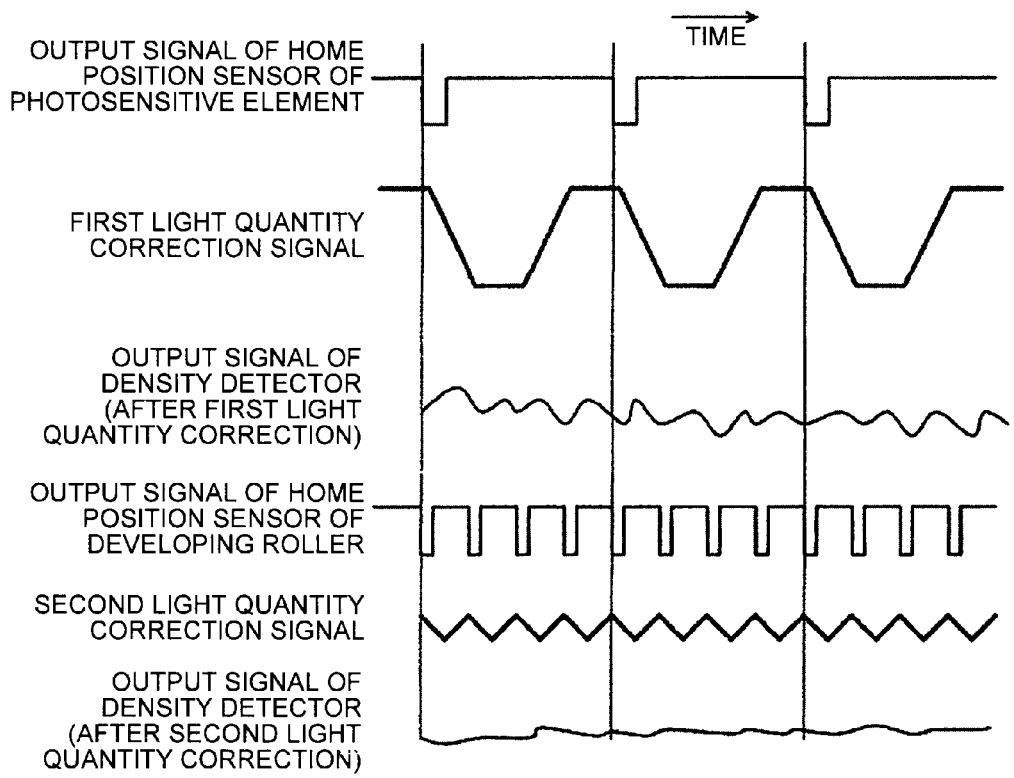
FIG. 35 is a diagram for explaining the correction of density variation due to the photosensitive element and the correction of density variation due to the developing roller.

Furthermore, as illustrated in FIG. 35 as an example, it may be configured to, after the driving signal of each light-emitting unit is corrected by using the first light quantity correction signal, calculate the residue of a density variation by using the density detector 2245; and then to correct, based on the residue of the density variation and the output signal of the home position sensor of the developing roller, the driving signal of each light-emitting unit by using the second light quantity correction signal.

Meanwhile, the period of a density variation due to the developing roller is much shorter than the period of a density variation due to the photosensitive element. When a density variation is corrected by using a too high frequency minutely, there is a possibility that banding occurs due to the residue component for correction.

Therefore, for correction of a density variation due to the developing roller, it is preferable to use a simple triangle-wave signal, a sine-wave signal, and a trapezoid-wave signal having a signal period that is equal to about one period or two periods of the developing roller. FIG. 35 illustrates an example of the triangle-wave signal. Alternatively, it may be configure to process sampling data of the density detector 2245 by using linear approximation; and then to correct the driving signal of each light-emitting unit by using the correction signal (second light quantity correction signal) that is set in accordance with it.

Figure 36:
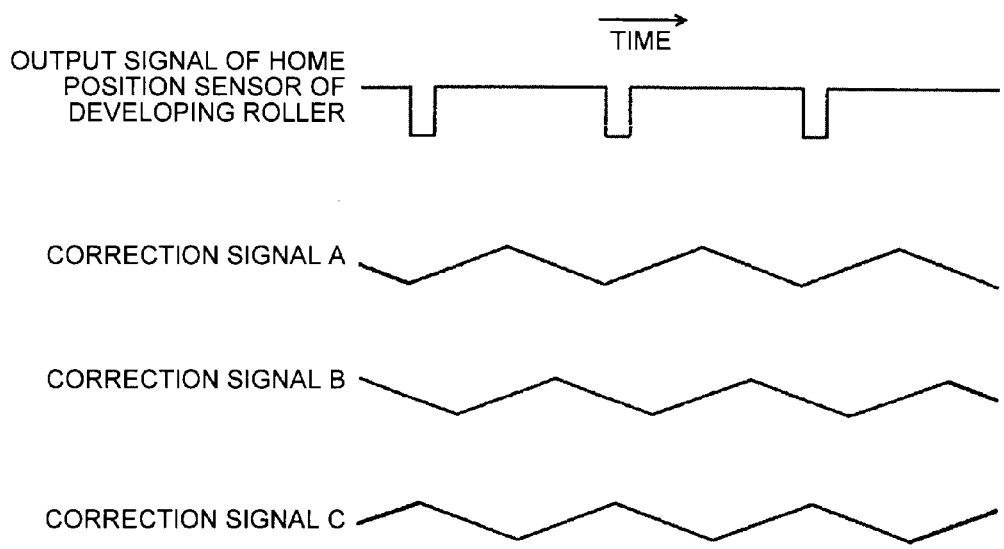
FIG. 36 is a graph for explaining an example of a correction signal that is set previously as a second correction signal.

Moreover, it may be configured to provide a plurality of correction signals that have phases different from each other as the second light quantity correction signals (see FIG. 36); and to select a correction signal having such a phase that the density variation detected by the density detector 2245 becomes the lowest possibly. Although three correction signals illustrated in FIG. 36 have different phases shifted 120 degrees from each other (a correction signal A, a correction signal B, and a correction signal C), which are not limited thereto.

The photosensitive element may be mechanically connected to the developing roller using a gear, and the rotation period of the developing roller may be obtained based on a gear ratio and the output signal of the home position sensor of the photosensitive element.

Meanwhile, there is a case of sliding the developing roller at the time of development. In this case, the rotation period of the developing roller may be obtained in consideration of a sliding ratio.

Figure 37:
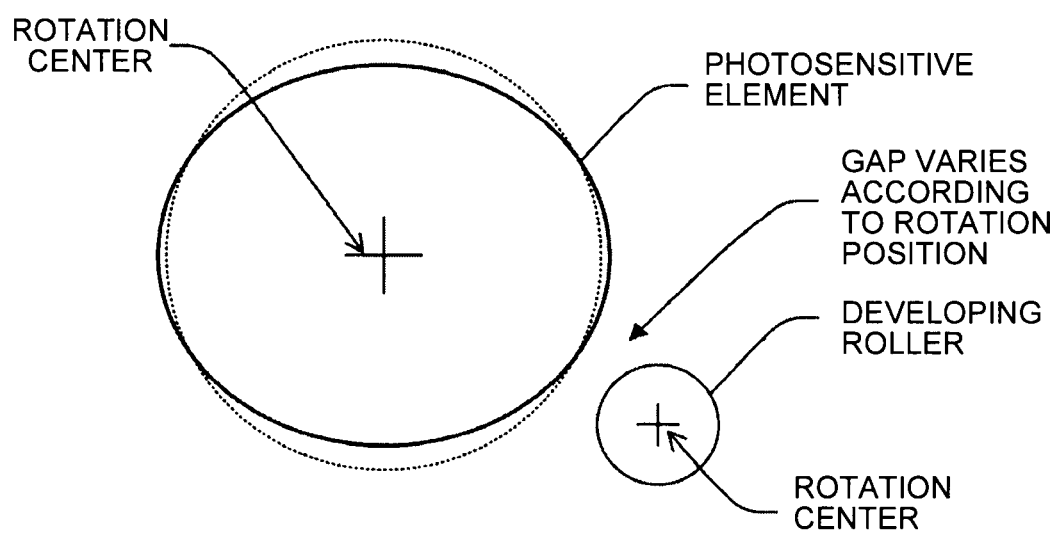
FIG. 37 is a diagram for explaining a case in which only a photosensitive element has a shape error.

In the first embodiment (1), when the eccentricity or the shape error of the developing roller is small, the second reference pattern may not be obtained (see FIG. 37).

First Embodiment (2)

Figure 38:
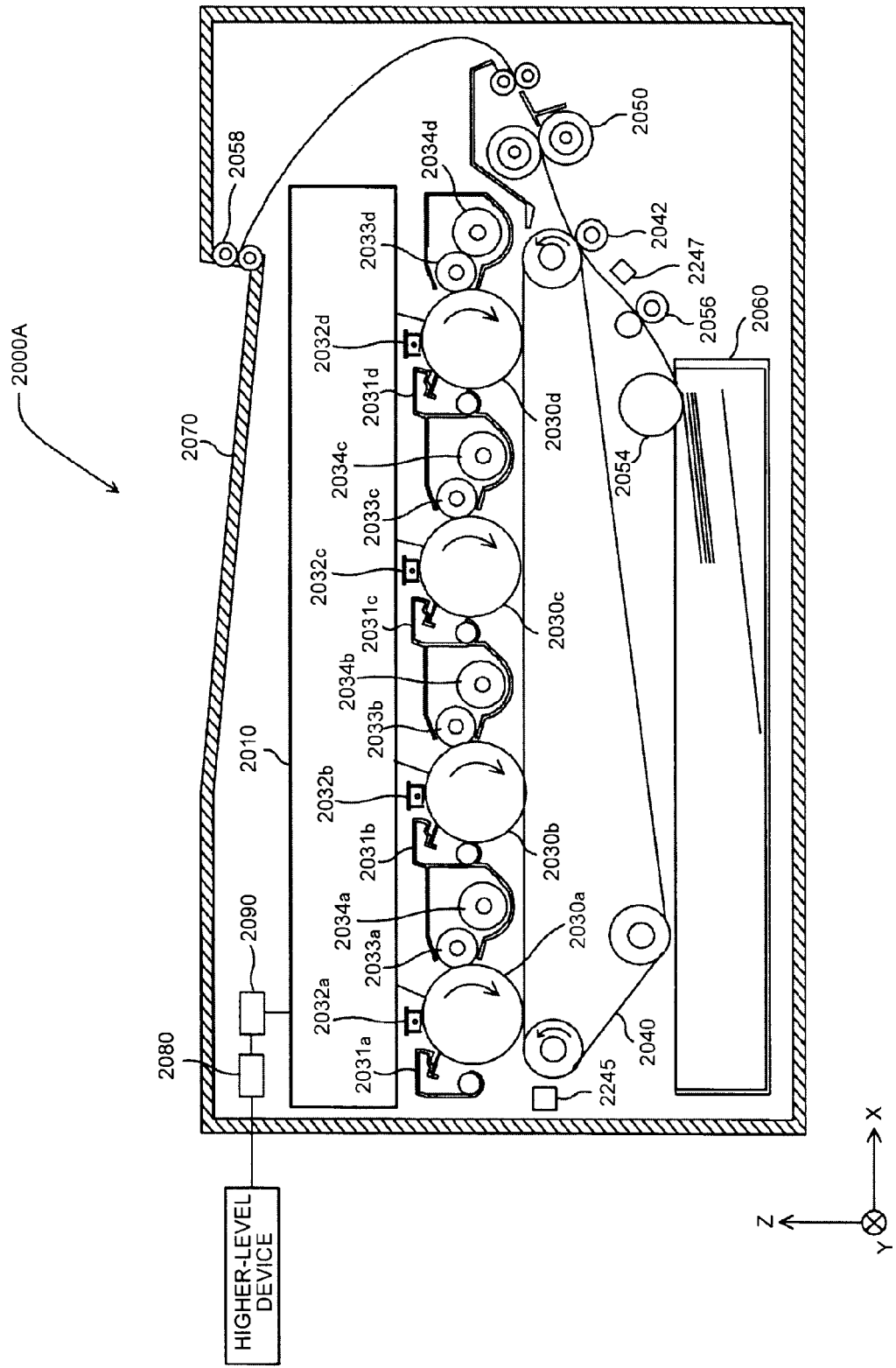
FIG. 38 is a diagram illustrating a schematic configuration of a color printer according to a first embodiment (2)

A first embodiment (2) will be described below with reference to FIGS. 38 to 41. A color printer 2000A according to the first embodiment (2) has a feature of including a paper leading edge detecting sensor 2247 as illustrated in FIG. 38. The remaining configuration is the same as in the first embodiment (1). Thus, the following description will be made focusing on a difference point from the first embodiment (1). Components identical or equivalent to the first embodiment (1) will be denoted by the same reference numerals, and a description thereof will be simplified or will not be redundantly repeated.

Meanwhile, there is a phenomenon (hereinafter, referred to as a "thick leading edge") that a density deviation band corresponding to the length of one period of the developing roller is generated, in a leading edge of an image directly after an image pattern is switched, at a position where the image pattern is switched due to one of the density variations in the sub scanning direction. Particularly, when an image is continuously output from a background area, there arises a problem in that the image density of the paper leading edge uniformly increases. The cause is as follows.

In a two-component developing type, the toner is attached to the surface of the developing roller in the background area, and effective developing potential increases as much as one period of the developing roller following the background area. Thereafter, the toner attached to the developing roller in the image area is returned to the carrier side; and the developing roller is cleaned by returning of the toner, so that the developing potential is restored to the original state. It is believed that the density of the leading edge of the paper becomes thicker by one rotation of the developing roller due to the difference in the developing potential.

Figure 39:
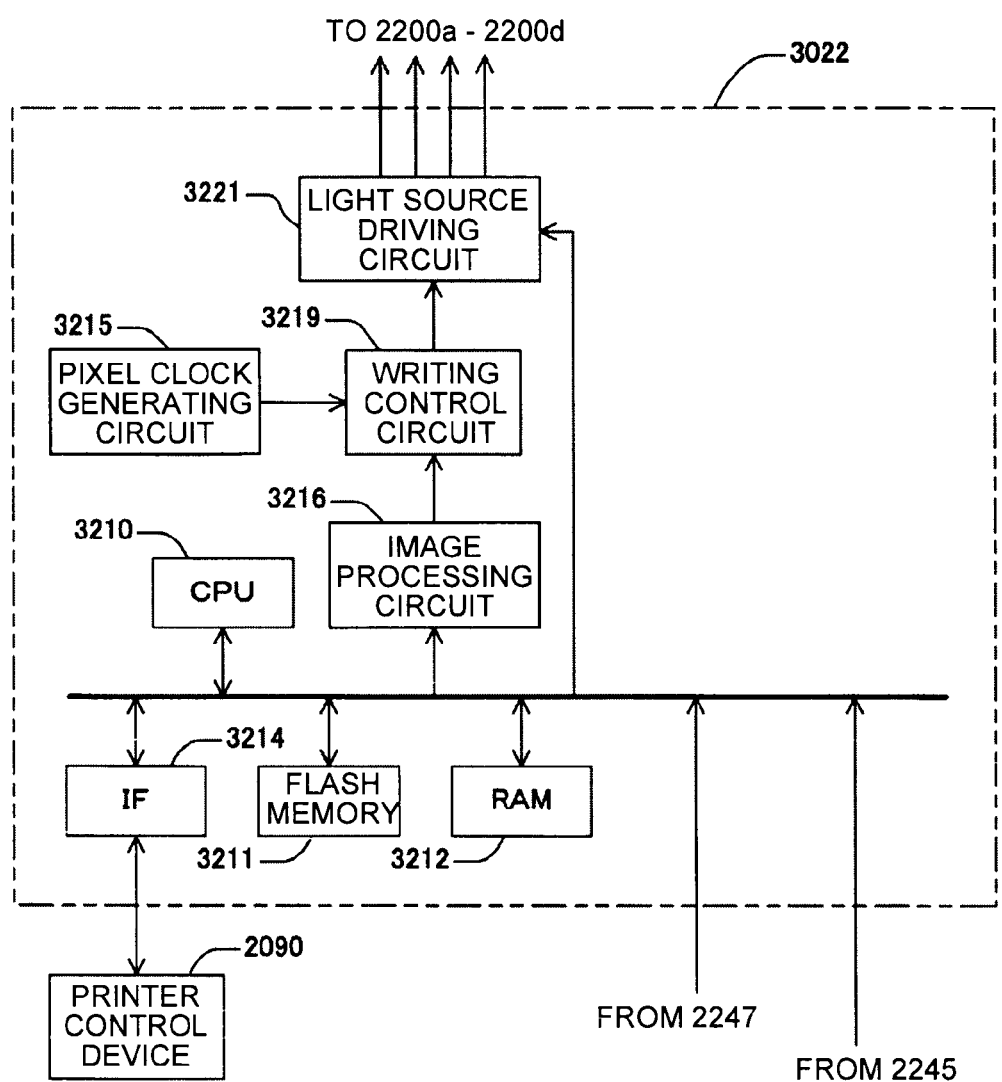
FIG. 39 is a block diagram for explaining a scanning control device according to the first embodiment (2)

FIG. 39 illustrates a configuration of the scanning control device 3022. An arrow illustrated in FIG. 39 represents the flow of a representative signal or information but does not represent all of connection relations between blocks.

The CPU 3210 acquires "thick leading edge" information at predetermined timing. A process of acquiring the "thick leading edge" information is hereinafter roughly referred as a "thick leading edge information acquiring process".

Figure 40:
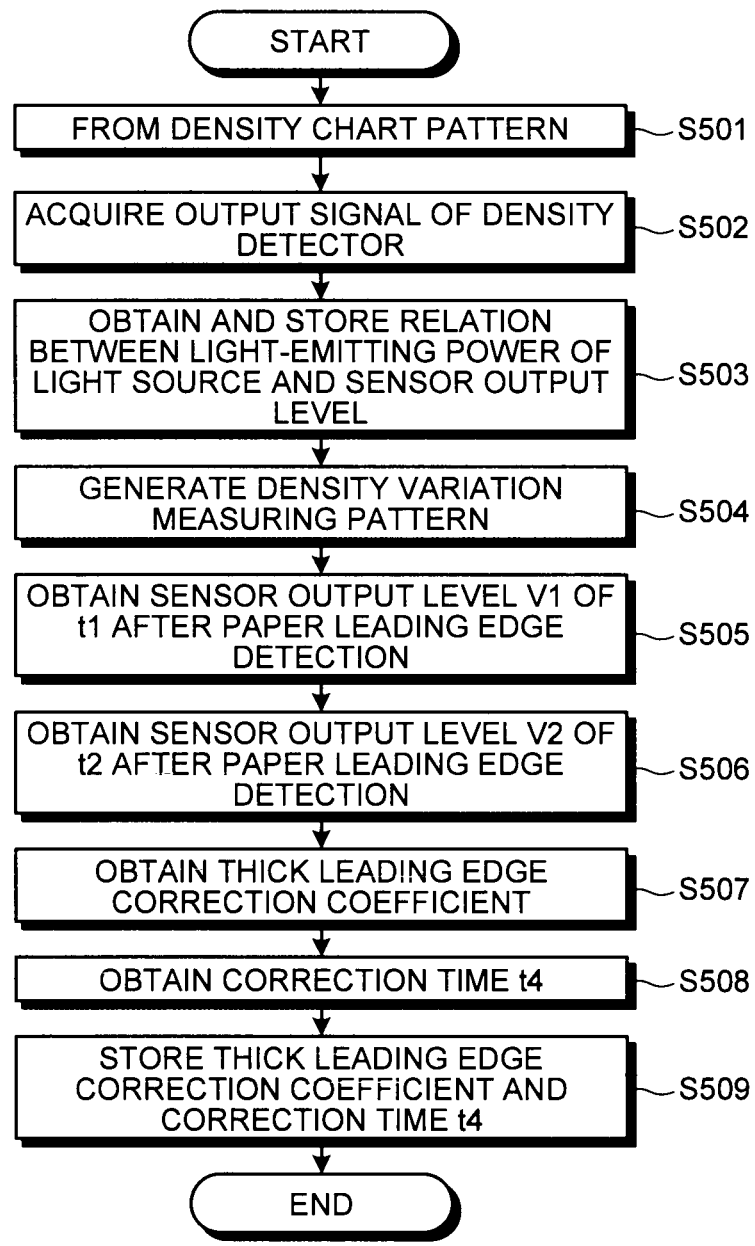
FIG. 40 is a flowchart for explaining a thick leading edge information acquiring process according to the first embodiment (2)

The thick leading edge information acquiring process will be described with reference to FIG. 40. A flowchart of FIG. 40 corresponds to an algorithm including a series of processes executed by the CPU 3210 at the time of performing the thick leading edge information acquiring process. The thick leading edge information acquiring process is performed for each station; but since it is performed in the same manner for each station, a description will be exemplarily made in connection the thick leading edge information acquiring process for the K station.

In step S501, the same density chart pattern as in the first embodiment (1) is formed for black so that the center position in the Y axis direction can be Y0.

In step S502, the LED 11 of the density detector 2245 is turned on. The area of the density n1 to the area of the density n10 in the density chart pattern are sequentially irradiated with light (referred to as "detection light") from the LED 11 as the transfer belt 2040 rotates, that is, as time elapses. Then, output signals of the specular reflected light receiving element 12 and the diffuse reflected light receiving element 13 are acquired.

In step S503, the output level of the diffuse reflected light receiving element 13 is normalized using Equation (1) for each density in the density chart pattern. A correlation between the sensor output level and the light-emitting power is obtained. Here, the correlation is approximated by a polynomial equation, and the polynomial equation is stored in the flash memory 3211.

In step S504, a density variation measuring pattern is generated. Here, a black solid pattern is formed with an A3 vertical size as the density variation measuring pattern.

In step S505, the LED 11 of the density detector 2245 is turned on. The detection light from the LED 11 illuminates the density variation measuring pattern in a direction corresponding to the sub scanning direction as the transfer belt 2040 rotates, that is, as time elapses.

Figure 41:
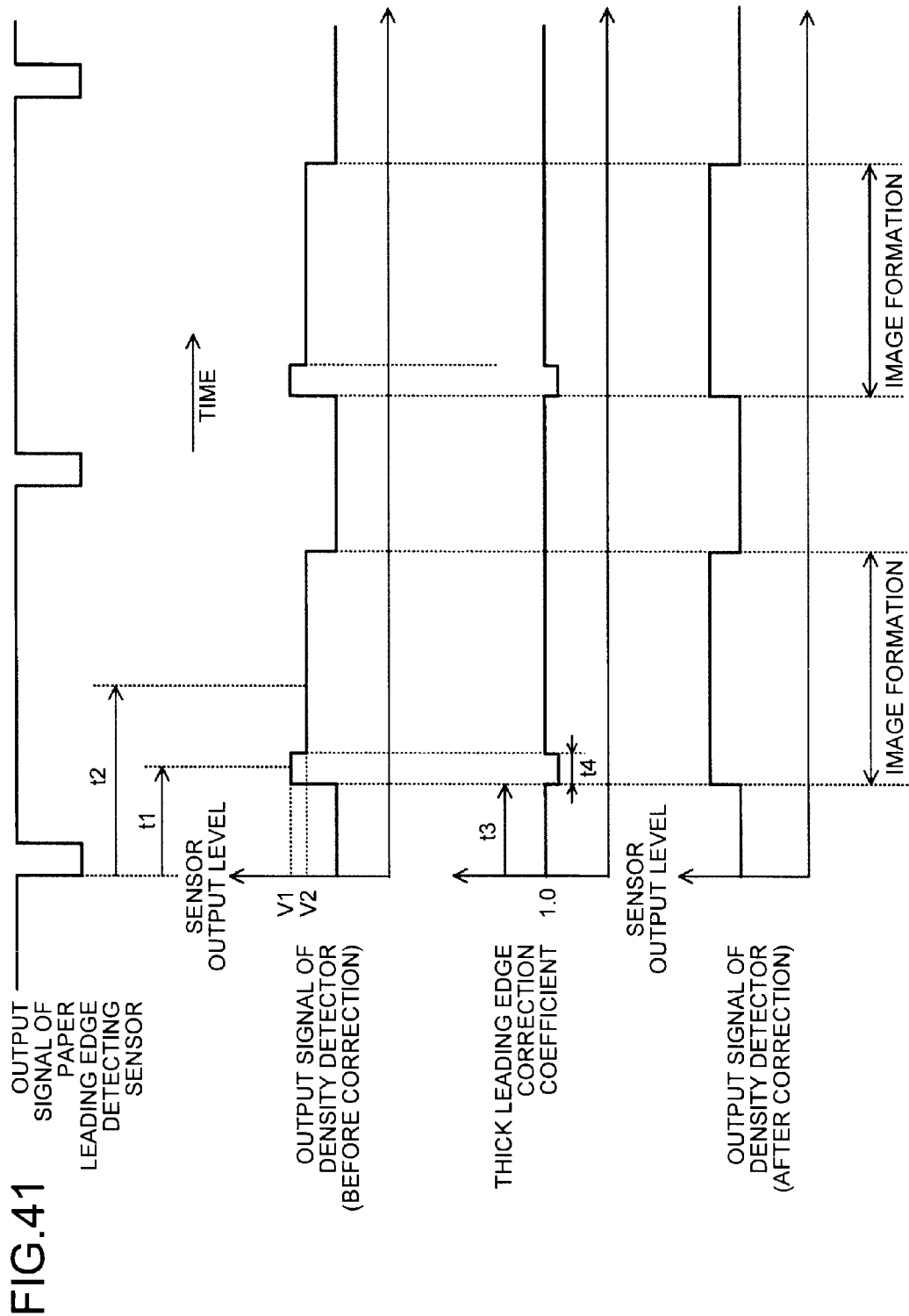
FIG. 41 is a diagram for explaining a thick leading edge correction coefficient and a correction time t4 according to the first embodiment (2)

When a time t1 elapses after falling edge timing of the output signal of the paper leading edge detecting sensor 2247, an sensor output level (referred to as "V1") is obtained (see FIG. 41).

In step S506, when a time t2 (t2>t1) elapses after falling edge timing of the output signal of the paper leading edge detecting sensor 2247, an sensor output level (referred to as "V2") is obtained (see FIG. 41).

In step S507, the light-emitting power corresponding to (V1-V2) is obtained with reference to the correlation between the sensor output level and the light-emitting power and then converted into a correction coefficient (referred to as "thick leading edge correction coefficient"). Here, 1.0 is set as a value representing a case in which correction is unnecessary.

In step S508, a correction time t4 is obtained based on the outer circumferential size of the developing roller and the printing speed (see FIG. 41).

In step S509, the thick leading edge correction coefficient and the correction time t4 are stored in the flash memory 3211, and the thick leading edge information acquiring process is finished.

At the time of performing image formation, when the falling edge of the output signal of the paper leading edge detection sensor 2247 is detected, the CPU 3210 corrects the driving signal by multiplying the thick leading edge correction coefficient and the driving signal of each light-emitting unit corresponding to the image information during the correction time t4 according to the writing start timing obtained from the output signal of a synchronization detection sensor (not shown). FIG. 41 illustrates a non-corrected sensor output level and a corrected sensor output level. As described above, it is possible to suppress the density variation in the sub scanning direction caused by contamination of the developing roller.

As described above, the color printer 2000A according to the first embodiment (2) includes the optical scanning device 2010, the four photosensitive elements 2030a, 2030b, 2030c, and 2030d, the four charging units 2032a, 2032b, 2032c, and 2032d, the four developing rollers 2033a, 2033b, 2033c, and 2033d, the transfer belt 2040, the density detector 2245, the paper leading edge detection sensor 2247, and the like.

The optical scanning device 2010 includes the four light sources 2200a, 2200b, 2200c, and 2200d, the four pre-deflector optical systems, the polygon mirror 2104, the four scanning optical systems, the scanning control device 3022, and the like.

The scanning control device 3022 obtains the thick leading edge correction coefficient for suppressing the density variation in the sub scanning direction caused by the contamination of the developing roller based on the output signal of the density detector 2245 and the output signal of the paper leading edge detecting sensor 2247 in each station at predetermined timing. Then, when image formation is performed, for each station, the scanning control device 3022 corrects the driving signal by multiplying the thick leading edge correction coefficient and the driving signal of each light-emitting unit corresponding to the image information during the correction time t4 calculated from the outer circumferential size of the developing roller and the printing speed according to the writing start timing.

In this case, it is possible to further reduce the density variation in which the leading edge of the output image becomes thick compared to the related art. As a result, a high-quality image can be formed.

The above embodiments have been described in connection with the case in which the number of density detectors 2245 is one, but the present invention is not limited thereto. A plurality of density detectors 2245 may be arranged along the Y axis direction.

In the above embodiments, at least part of processing performed by the scanning control device 3022 may be performed by the printer control device 2090. Further, at least part of processing performed by the printer control device 2090 may be performed by the scanning control device 3022.

The above embodiments have been described in connection with the case in which the density detector 2245 detects the toner pattern on the transfer belt 2040, but the present invention is not limited thereto. The density detector 2245 may detect the toner pattern on the surface of the photosensitive element. The surface of the photosensitive element is close to a regularly reflecting body similarly to the transfer belt 2040.

In the above embodiments, the toner pattern may be transferred onto the recording sheet, and the toner pattern on the recording sheet may be detected by the density detector 2245.

The above embodiments have been described in connection with the case in which the optical scanning device is integrally configured, but the present invention is not limited thereto. For example, the optical scanning device may be disposed for each image forming station, and the optical scanning device may be disposed for every two image forming stations.

Further, the above embodiments have been described in connection with the case in which the four photosensitive elements are disposed, but the present invention is not limited thereto. For example, five or six photosensitive elements may be disposed.

Further, the above embodiments have been described in connection with the case in which the color printer 2000 is used as the image forming apparatus, but the present invention is not limited thereto.

For example, there may be used an image forming apparatus that directly irradiates laser light onto a medium (for example, a paper sheet) that produces color by the laser light.

Further, there may be used as an image forming apparatus using a silver halide film as an image carrier. In this case, a latent image can be formed on the silver halide film by optical scanning, and the late image can be visualized by the same processing as the developing process in a typical silver halide photography process. Then, the image can be transferred onto a printing paper sheet by the same processing as the printing process in the typical silver halide photography process. This image forming apparatus can be implemented as an optical plate making device or an optical drawing device for drawing a computer tomography (CT) scan image or the like.

Further, an image forming apparatus other than the printer such as a copying machine, a facsimile, or a multi-function peripheral (MFP) in which these devices are integrated may be used as the image forming apparatus.

Second Embodiment

Second Embodiment (1)

Next, a description will be made in connection with a second embodiment (1). A color printer according to the second embodiment (1) is the same as in FIG. 1, a configuration of the optical scanning device is the same as in FIGS. 4 to 7, and thus a redundant description thereof will not be repeated. In the second embodiment, the same drawings and the same reference numerals are used for the same drawings as in the first embodiment, and a redundant description thereof will not be repeated. A description will be made in connection with different portions.

Figure 42:
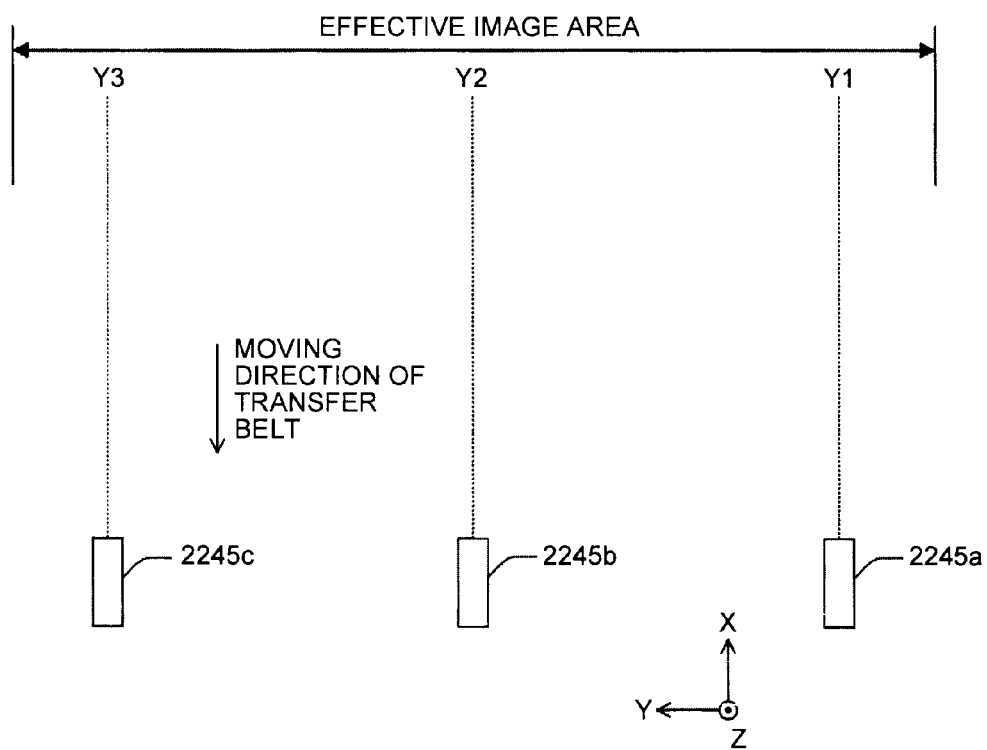
FIG. 42 is a diagram illustrating a schematic configuration of a color printer according to a second embodiment (1)

The second embodiment (1) is different from the first embodiment in that three density detectors are disposed in the main scanning direction as illustrated in FIG. 42.

The density detector 2245 is arranged at the −X side of the transfer belt 2040. The density detectors 2245 includes three optical sensors 2245a, 2245b, and 2245c as illustrated in FIG. 42 as an example.

The optical sensor 2245a is arranged at the position facing the vicinity of the −Y side end portion within the effective image area in the transfer belt 2040. The optical sensor 2245c is arranged at the position facing the vicinity of the +Y side end portion within the effective image area in the transfer belt 2040. The optical sensor 2245b is arranged substantially at the center position between the optical sensor 2245a and the optical sensor 2245c in the main direction. Here, the center position of the optical sensor 2245a in the main direction (the Y axis direction) is referred to as "Y1"; the center position of the optical sensor 2245b in the main direction (the Y axis direction) is referred to as "Y2"; and the center position of the optical sensor 2245c in the main direction (the Y axis direction) is referred to as "Y3".

Each optical sensor includes the LED 11 that emits light (hereinafter, also referred to as "detection light") toward the transfer belt 2040, the specular reflected light receiving element 12 that receives specular reflected light from the transfer belt 2040 or a toner pad on the transfer belt 2040, and the diffuse reflected light receiving element 13 that receives diffuse reflected light from the transfer belt 2040 or the toner pad on the transfer belt 2040 as illustrated in FIG. 3 as an example. Each of the light receiving elements outputs a signal (a photoelectric conversion signal) according to the amount of received light.

The home position sensor 2246a detects a home position of rotation in the photosensitive element 2030a.

The home position sensor 2246b detects a home position of rotation in the photosensitive element 2030b.

The home position sensor 2246c detects a home position of rotation in the photosensitive element 2030c.

The home position sensor 2246d detects a home position of rotation in the photosensitive element 2030d.

Figure 43:
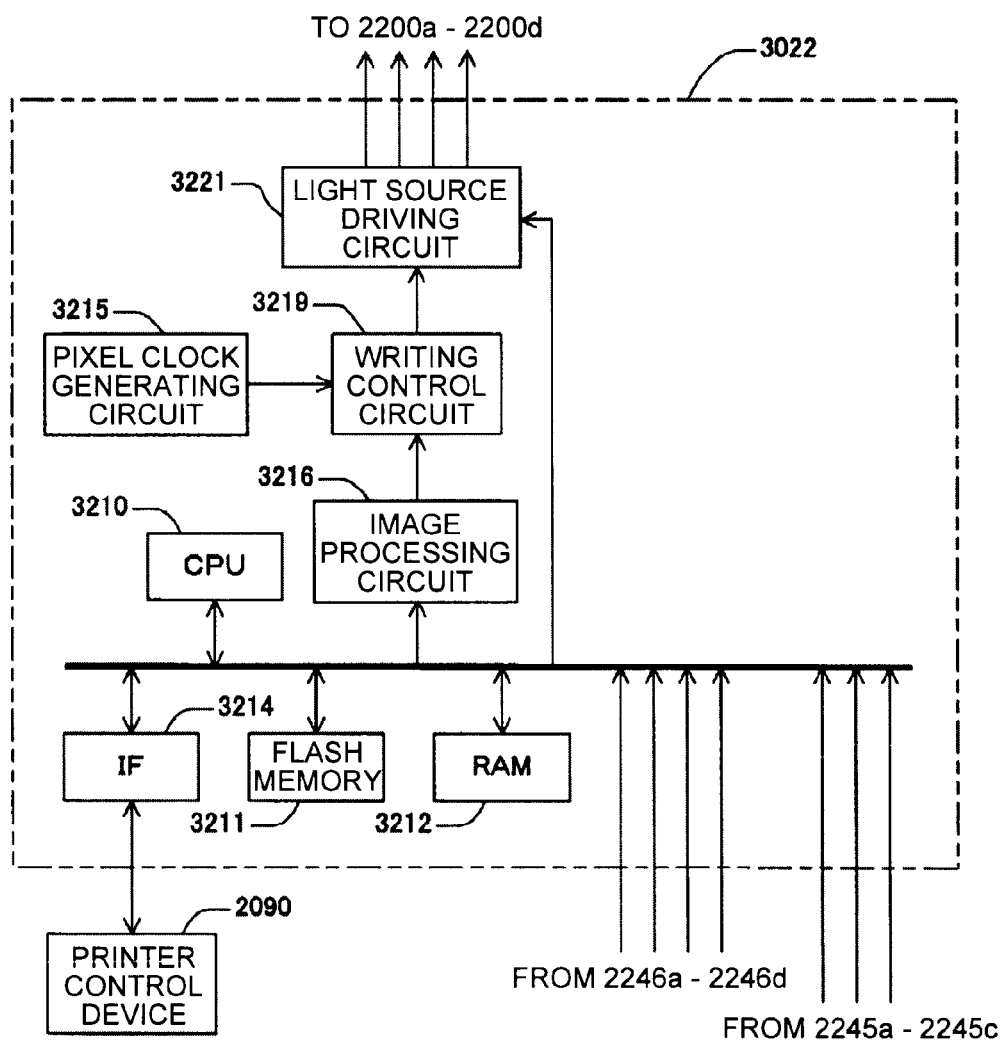
FIG. 43 is a block diagram for explaining a scanning control device according to the second embodiment (1)

A configuration of a scanning control device according to the second embodiment (1) is illustrated in FIG. 43. The configuration is different from the configuration of FIG. 8 in signal parts input from the three optical sensors 2245a, 2245b, and 2245c.

Figure 9:
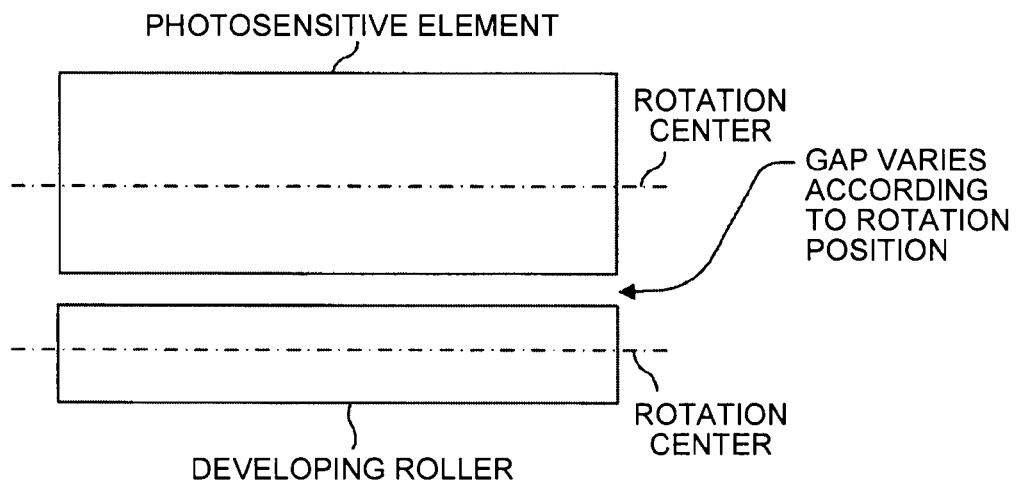
FIG. 9 is a diagram for explaining eccentricity of a photosensitive element.
Figure 10:
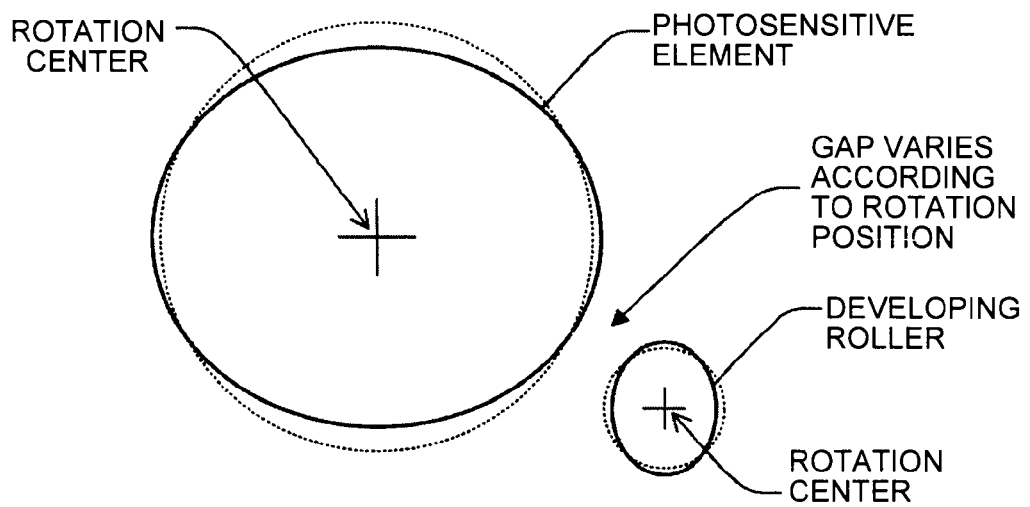
FIG. 10 is a diagram for explaining shape errors of a photosensitive element and a developing roller.
Figure 44:
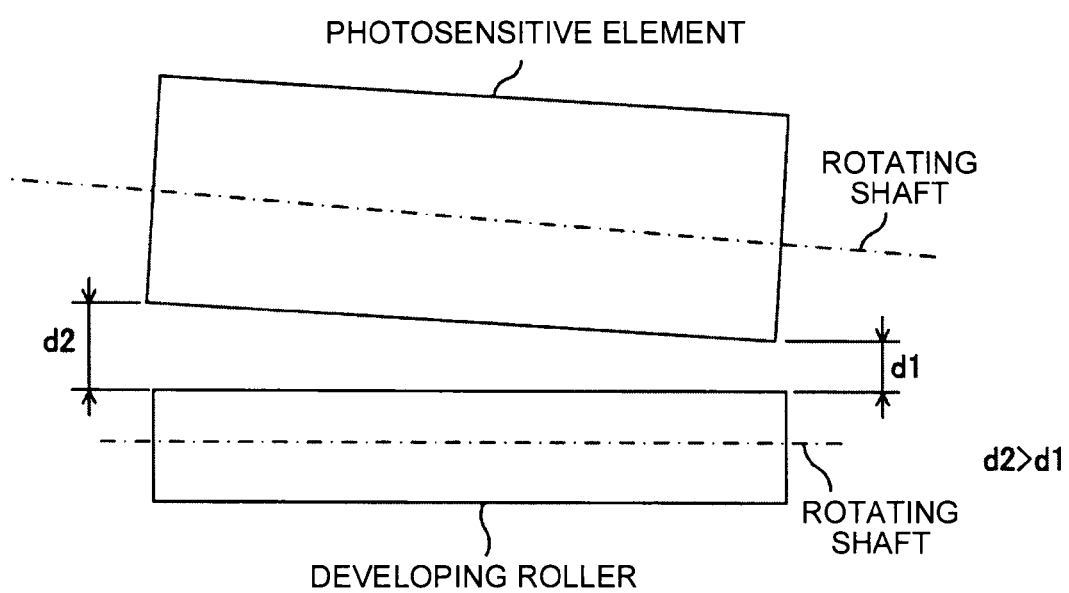
FIG. 44 is a diagram for explaining a state in which a rotating shaft of a photosensitive element and a rotating shaft of a developing roller.

Meanwhile, as described above, when there is eccentricity or a shape error of the photosensitive element, the unnecessary density variation in the sub scanning direction occurs in the output image (see FIGS. 9 and 10). Further, when a rotating shaft of the photosensitive element is not parallel to a rotating shaft of the developing roller, the unnecessary density variation in the sub scanning direction occurs in the output image (see FIG. 44).

In this regard, the CPU 3210 acquires light quantity correction information, which is used for suppressing the density variation in the sub scanning direction or the density variation in the main scanning direction, at predetermined timing. Hereinafter, a process for acquiring the light quantity correction information is roughly referred as "light quantity correction information acquiring process".

At the time of power activation, the light quantity correction information acquiring process is performed in the following cases as the predetermined timing: (1) when a suspension time of the photosensitive element is 6 hours or more; (2) when the temperature inside the device changes by 10° C. or more; or (3) when relative humidity inside the device changes by 50% or more. Further, at the time of printing, the light quantity correction information acquiring process is performed in the following cases as the predetermined timing: (4) when the number of print sheets reaches a predetermined number of sheets; (5) the number of rotation times of the developing roller reaches a predetermined number of times; or (6) a traveling distance of the transfer belt reaches a predetermined distance.

Figure 45:
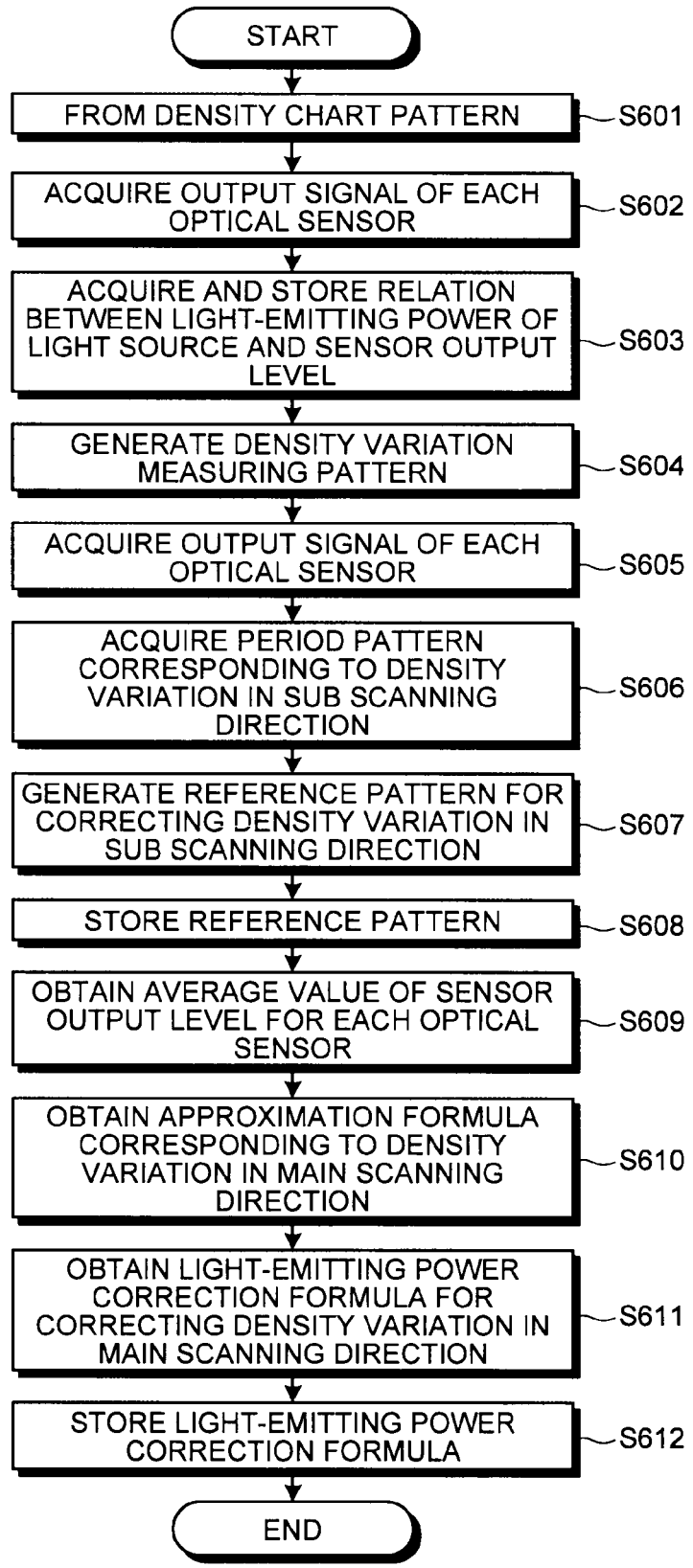
FIG. 45 is a flowchart for explaining a light quantity correction information acquiring process according to the second embodiment (1)

The light quantity correction information acquiring process will be described with reference to FIG. 45. A flowchart of FIG. 45 corresponds to an algorithm including a series of processes executed by the CPU 3210 at the time of the light quantity correction information acquiring process. The light quantity correction information acquiring process is performed for each station; but since it is performed in the same manner for each station, a description will be exemplarily made in connection the light quantity information acquiring process for the K station.

Figure 46:
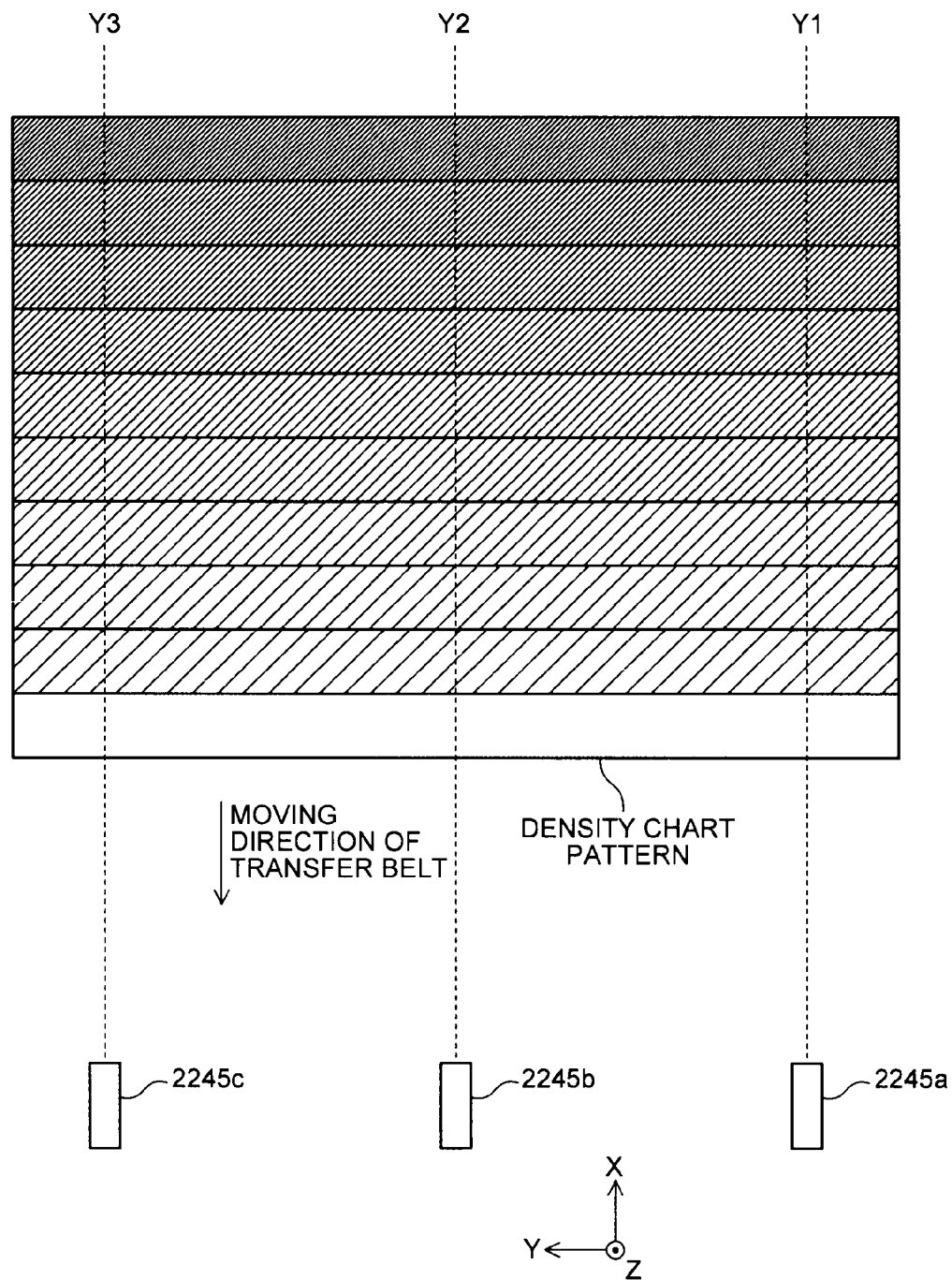
FIG. 46 is a diagram for explaining a positional relation between a density chart pattern and each optical sensor.

In step S601, a density chart pattern including a plurality of areas having different toner densities is formed for black as illustrated in FIG. 13 as an example so that the center position in the Y axis direction can be Y2 as illustrated in FIG. 46 as an example.

As an example, the density chart pattern includes areas of 10 types of densities n1 to n10. The density n1 is lowest in density, and the density n10 is highest in density. When the density chart pattern is formed, a lighting time of the light-emitting unit is constant regardless of the density, and only light-emitting power changes according to the density. Here, p1 is defined as light-emitting power corresponding to the density n1; and p2 is defined as light-emitting power corresponding to the density n2. Further, in the same manner, p3 to p10 are defined as light-emitting power corresponding to the density n3 to n10, respectively.

Figure 47:
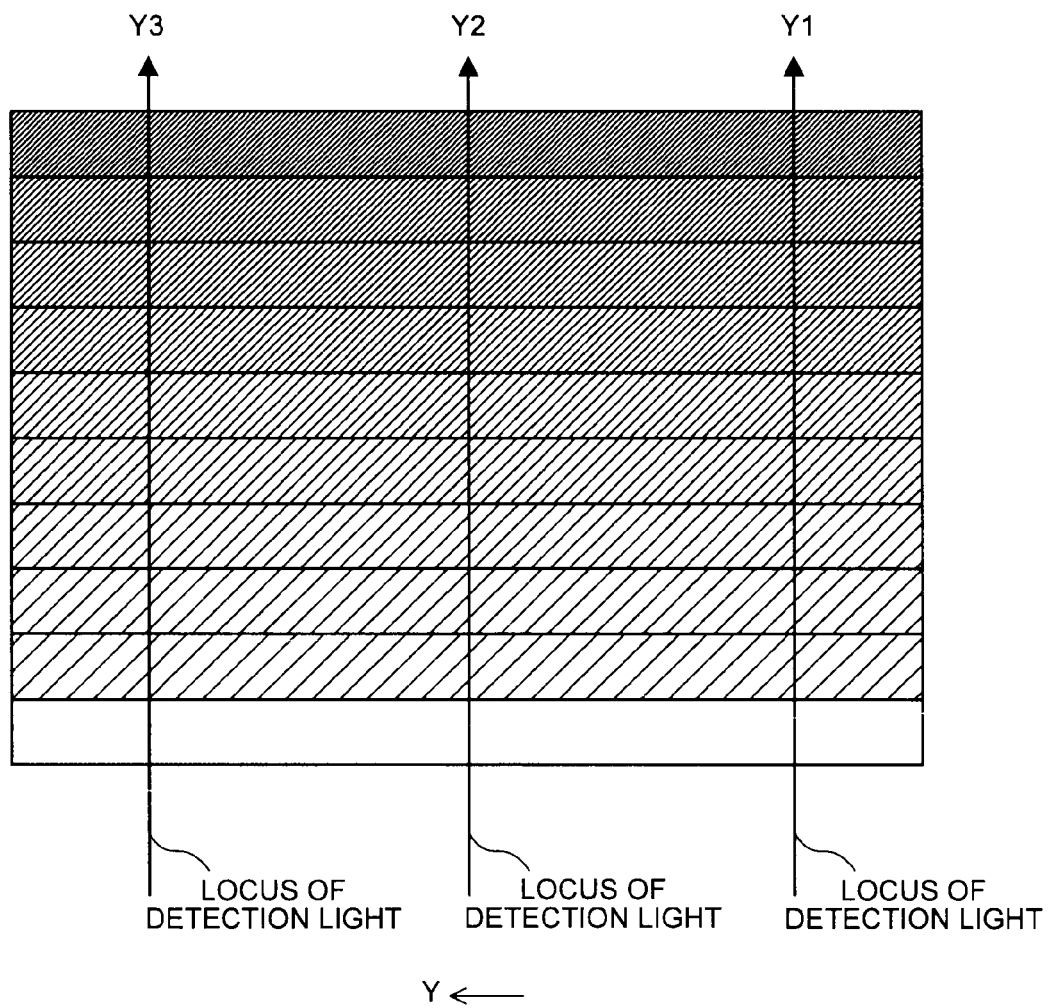
FIG. 47 is a diagram for explaining a locus of detection light emitted from each optical sensor in a light quantity correction information acquiring process.

In step S602, the LED 11 of each optical sensor is turned on. The area of the density n1 to the area of the density n10 in the density chart pattern are sequentially irradiated with light (referred to as "detection light") from the LED 11 as the transfer belt 2040 rotates, that is, as time elapses (see FIG. 47).

Then, output signals of the specular reflected light receiving element 12 and the diffuse reflected light receiving element 13 are acquired.

Meanwhile, when the toner does not remain attached to the transfer belt 2040, the detection light reflected by the transfer belt 2040 contains a large amount of the specular reflected light component compared to the diffuse reflected light component. Thus, a large amount of light is incident to the specular reflected light receiving element 12; but light is hardly incident to the diffuse reflected light receiving element 13 (see FIG. 15A).

However, when the toner remains attached to the transfer belt 2040, compared to when the toner does not remain attached to the transfer belt 2040, the specular reflected light component decreases, and the diffuse reflected light component increases. Thus, light incident to the specular reflected light receiving element 12 decreases, and light incident to the diffuse reflected light receiving element 13 increases (see FIG. 15B).

That is, it is possible to detect the density of the toner attached to the transfer belt 2040 based on the output levels of the specular reflected light receiving element 12 and the diffuse reflected light receiving element 13.

In step S603, the output level of the diffuse reflected light receiving element 13 is normalized using the following Equation (1) for each density in the density chart pattern for each optical sensor. The normalized output level of the diffuse reflected light receiving element 13 is hereinafter also referred to as "sensor output level" for convenience sake.

$$L = \text{(output level of diffuse reflected light receiving element 13)} / \{\text{(output level of specular reflected light receiving element 12)} + \text{(output level of diffuse reflected light receiving element 13)}\} \quad (1)$$

Then, a correlation between the sensor output level and the light-emitting power is acquired on the optical sensor 2245b (see FIG. 16). Here, the correlation is approximated by a polynomial equation, and the polynomial equation is stored in the flash memory 3211.

In the present embodiment, the correlation between the sensor output level and the light-emitting power is adjusted to be uniform between the optical sensors.

Figure 48:
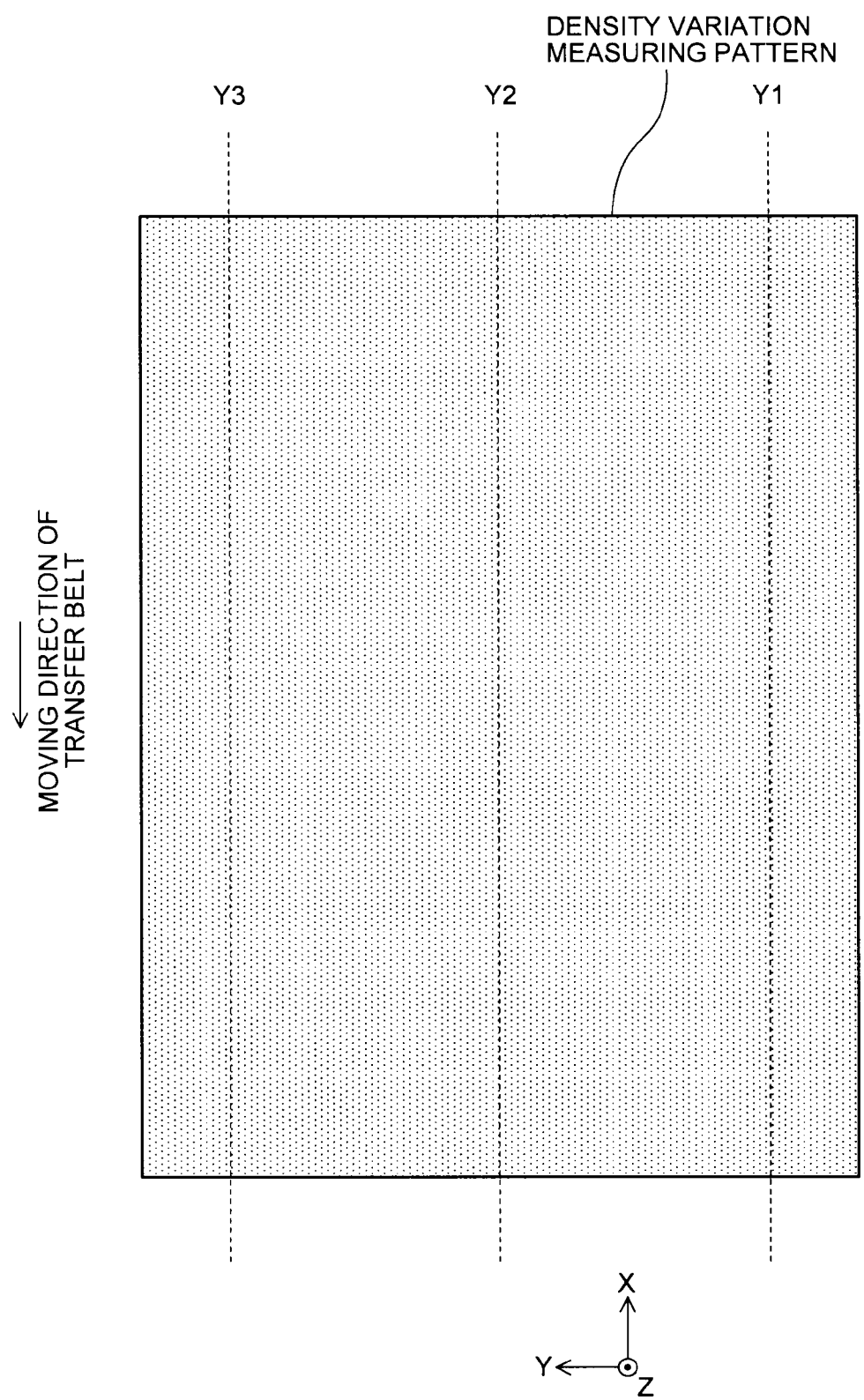
FIG. 48 is a diagram for explaining a density variation measuring pattern.

In step S604, a density variation measuring pattern is generated. Here, a black solid pattern is formed with an A3 vertical size as the density variation measuring pattern (see FIG. 48).

Figure 49:
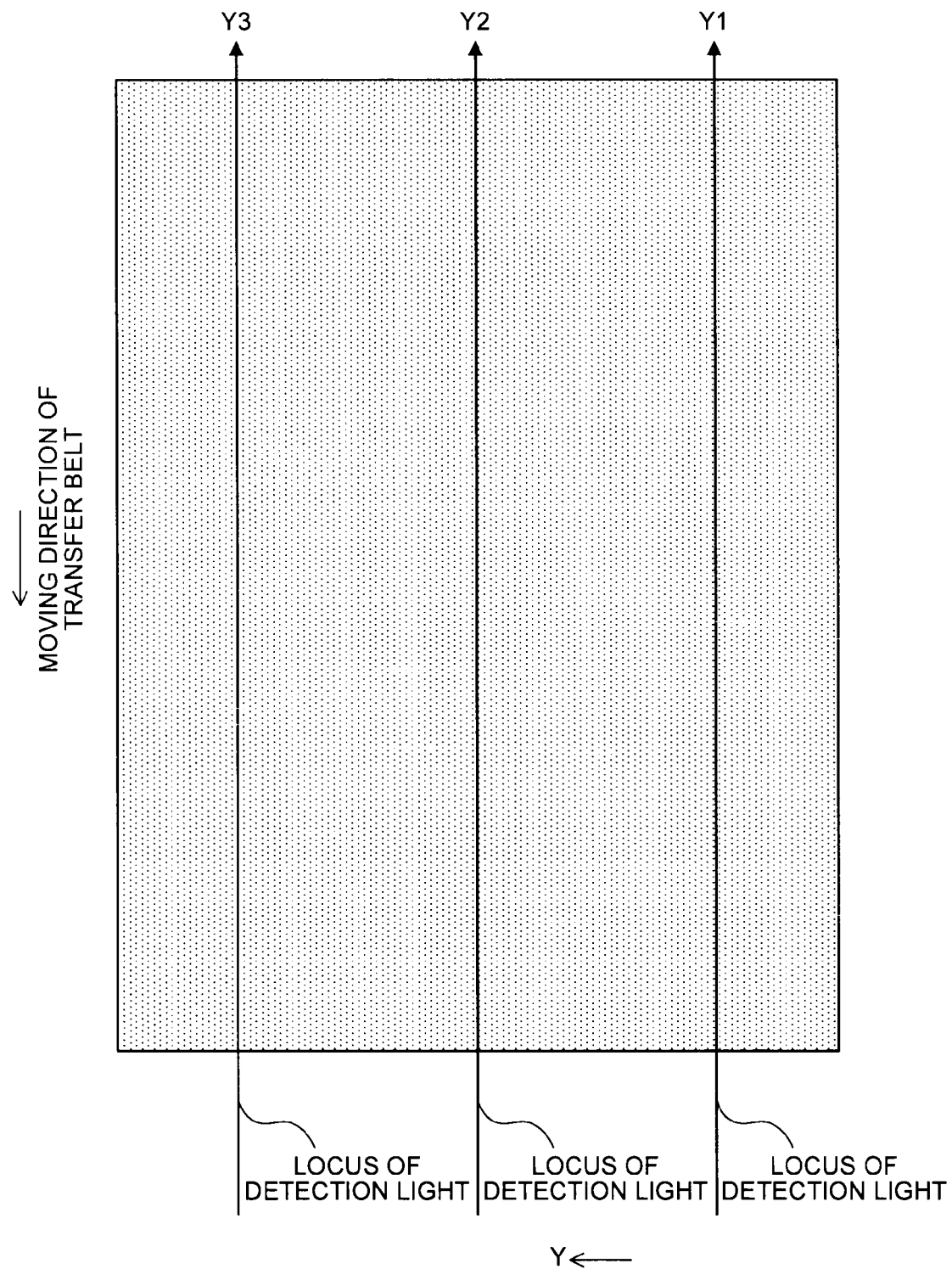
FIG. 49 is a diagram for explaining a locus of detection light emitted from each optical sensor on a density variation measuring pattern.

In step S605, the LED 11 of each optical sensor is turned on. The detection light from the LED 11 illuminates the density variation measuring pattern in a direction corresponding to the sub scanning direction as the transfer belt 2040 rotates, that is, as time elapses (see FIG. 49).

Figure 50:
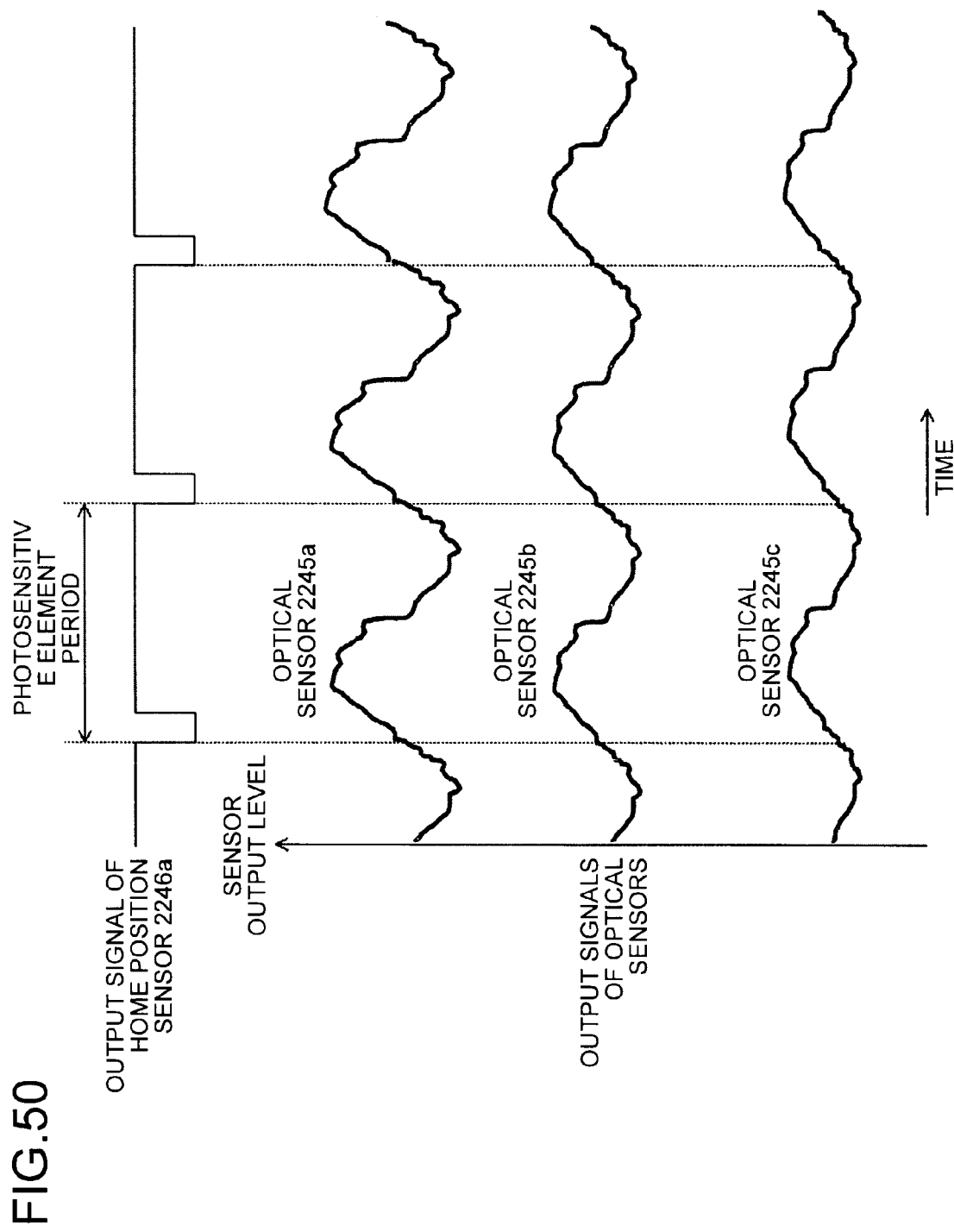
FIG. 50 is a timing chart for explaining a sensor output level of each optical sensor on a density variation measuring pattern.

The output signals of the specular reflected light receiving element 12 and the diffuse reflected light receiving element 13 are acquired at predetermined time intervals for each optical sensor; and the sensor output level is calculated using Equation (1) (see FIG. 50). FIG. 50 also illustrates an output signal of the home position sensor 2246a.

As illustrated in FIG. 50, the sensor output level is not constant. A temporal variation in the sensor output level is hereinafter referred to as "sensor output level waveform".

Figure 51:
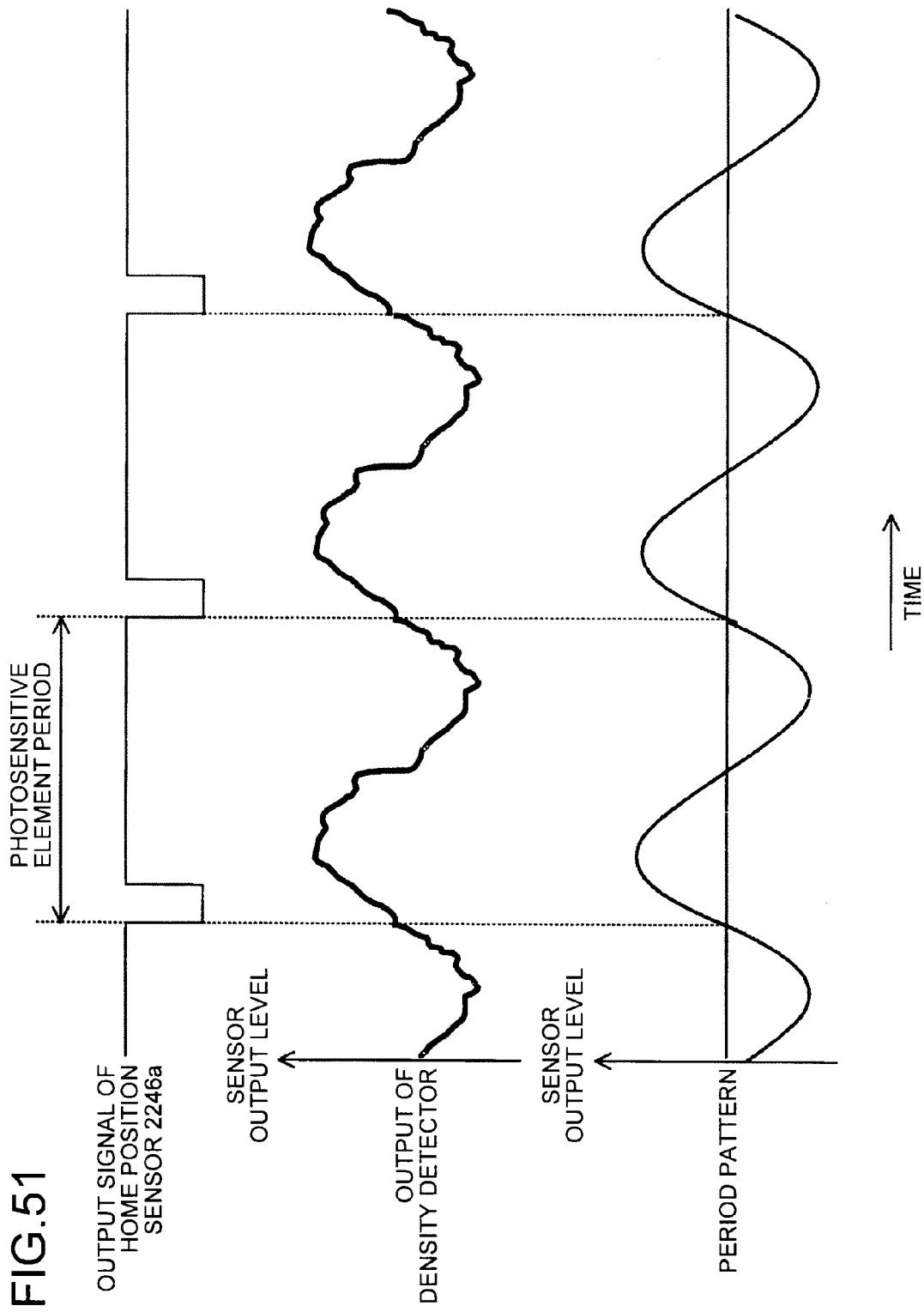
FIG. 51 is a timing chart for explaining a period pattern.

In step S606, a sine wave having the same period as a rotation period of the photosensitive element 2030a is extracted from each sensor output level waveform as a period pattern based on the output signal of the home position sensor 2246a (see FIG. 51).

In step S607, a density correction pattern is obtained by shifting the period pattern by a ½ period; and a reference pattern is obtained by converting the vertical axis from the sensor output level into the light-emitting power with reference to the correlation between the sensor output level and the light-emitting power on one period of the density correction pattern (see FIG. 51).

In step S608, the reference pattern is stored in the flash memory 3211.

In step S609, an average value of the sensor output levels is obtained for each optical sensor. Hereinafter, the average value of the sensor output levels is roughly referred to as a "level average value" for convenience sake.

Figure 52:
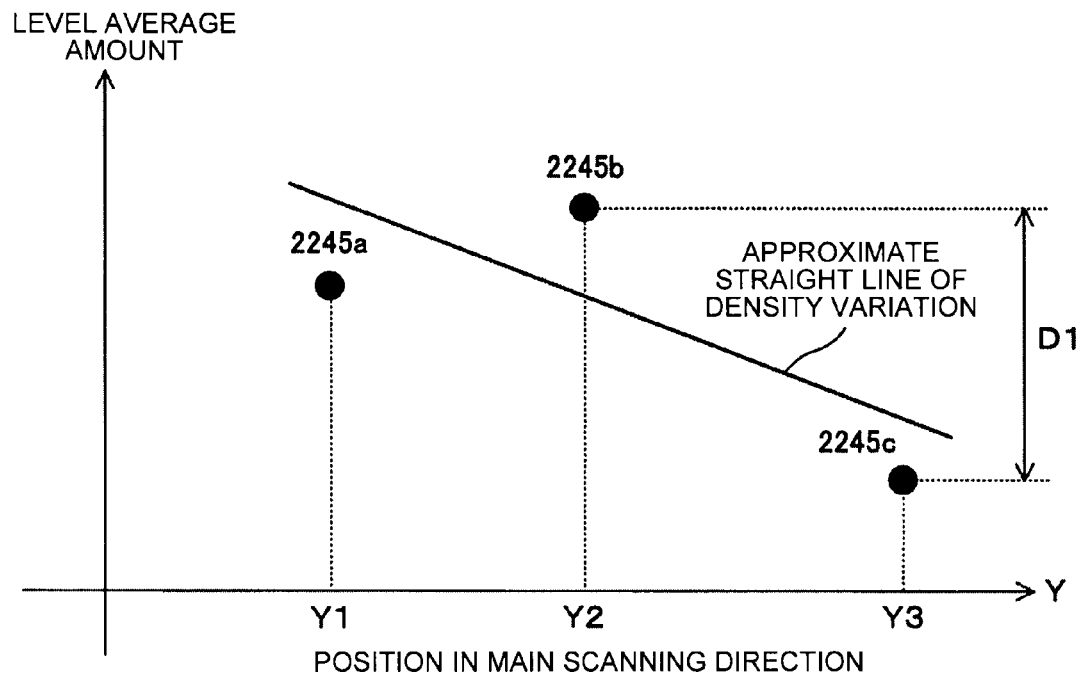
FIG. 52 is a diagram for explaining an approximate straight line representing a density variation in a main scanning direction before correction.

In step S610, an approximation formula corresponding to the density variation in the main scanning direction is obtained based on the position of each optical sensor in the main scanning direction and the level average value of each optical sensor. Here, the density variation in the main scanning direction is approximated by a linear function as illustrated in FIG. 52 as an example.

Figure 53:
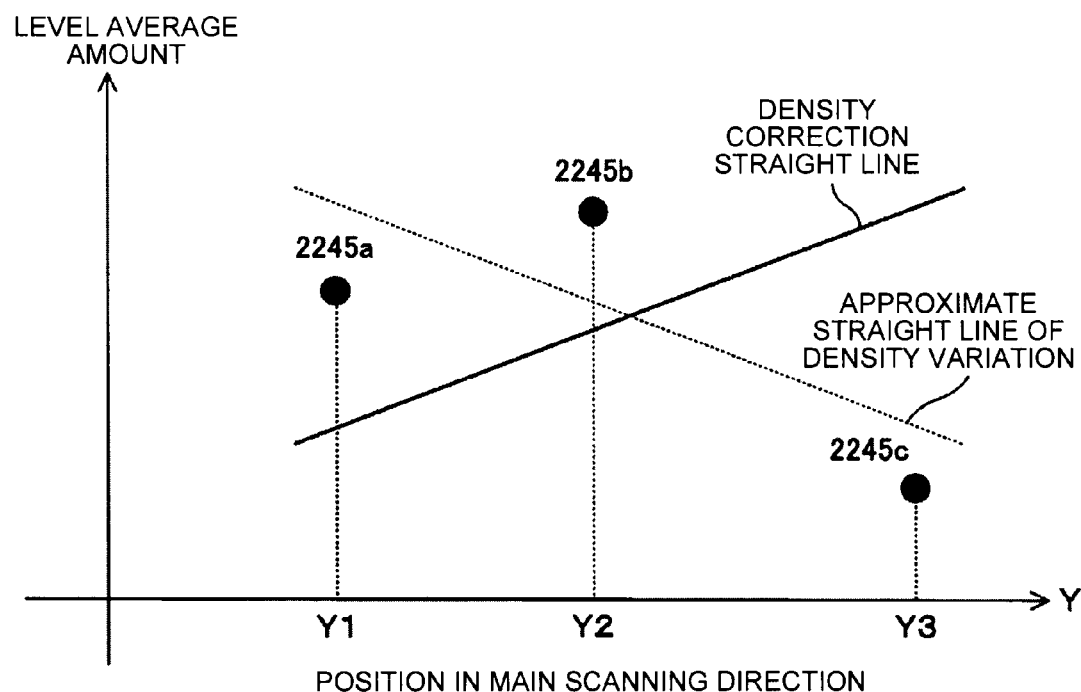
FIG. 53 is a diagram for explaining a density correction straight line corresponding to the approximate straight line of FIG. 52.
Figure 54:
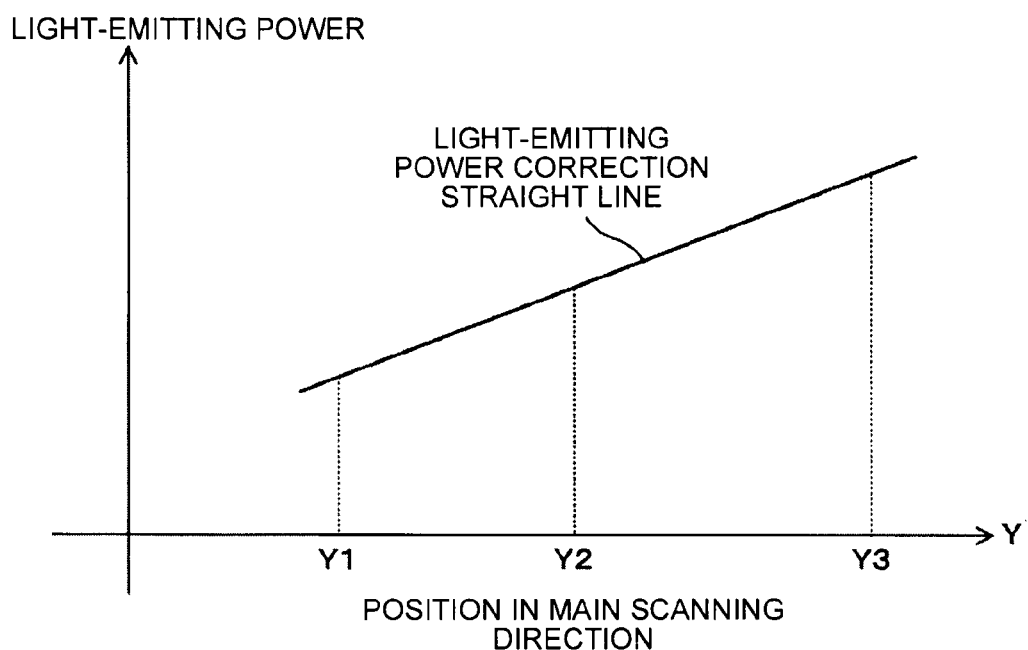
FIG. 54 is a diagram for explaining a light-emitting power correction straight line corresponding to the density correction straight line of FIG. 53.

In step S611, a density correction straight line is obtained by vertically reversing a straight line represented by the approximation formula as illustrated in FIG. 53 as an example. Then, a light-emitting power correction straight line for correcting the density variation in the main scanning direction is obtained by converting the vertical axis from the sensor output level into the light-emitting power with reference to the correlation between the sensor output level and the light-emitting power (see FIG. 54). A formula representing the light-emitting power correction straight line is referred to as "light-emitting power correction formula".

In step S612, the light-emitting power correction formula is stored in the flash memory 3211. Thereafter, the light quantity correction information acquiring process is finished.

Figure 55:
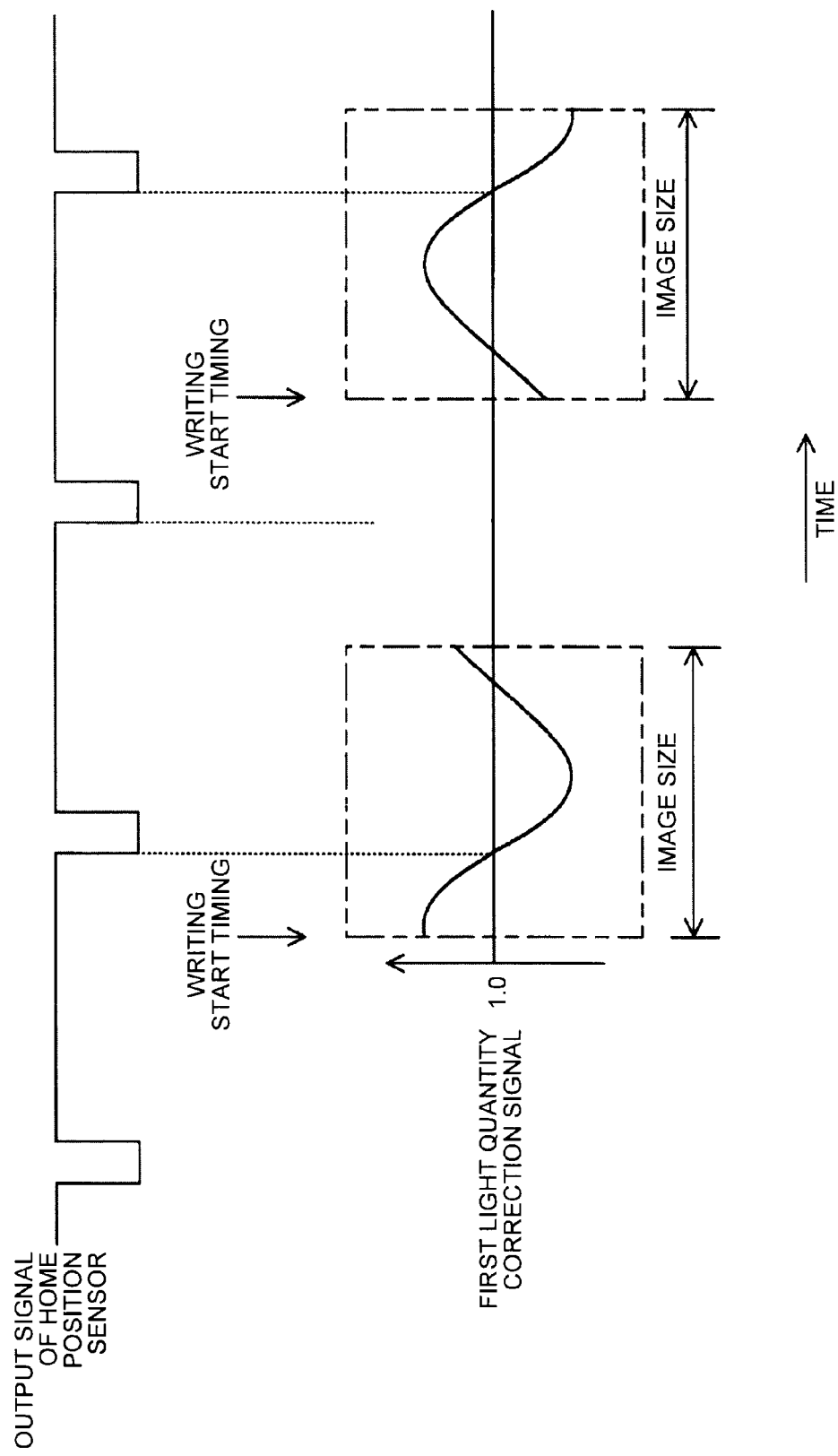
FIG. 55 is a timing chart for explaining a first light quantity correction signal.

At the time of performing image formation, for each station, the CPU 3210 obtains a time difference between the home position and the writing start based on the output signal of the home position sensor and the writing start timing obtained from an output signal of a synchronization detection sensor (not shown); and generates a first light quantity correction signal by shifting the phase of the reference pattern according to the time difference (see FIG. 55). Here, the vertical axis of the first light quantity correction signal is converted to a coefficient having an average value of 1.0.

Figure 56:
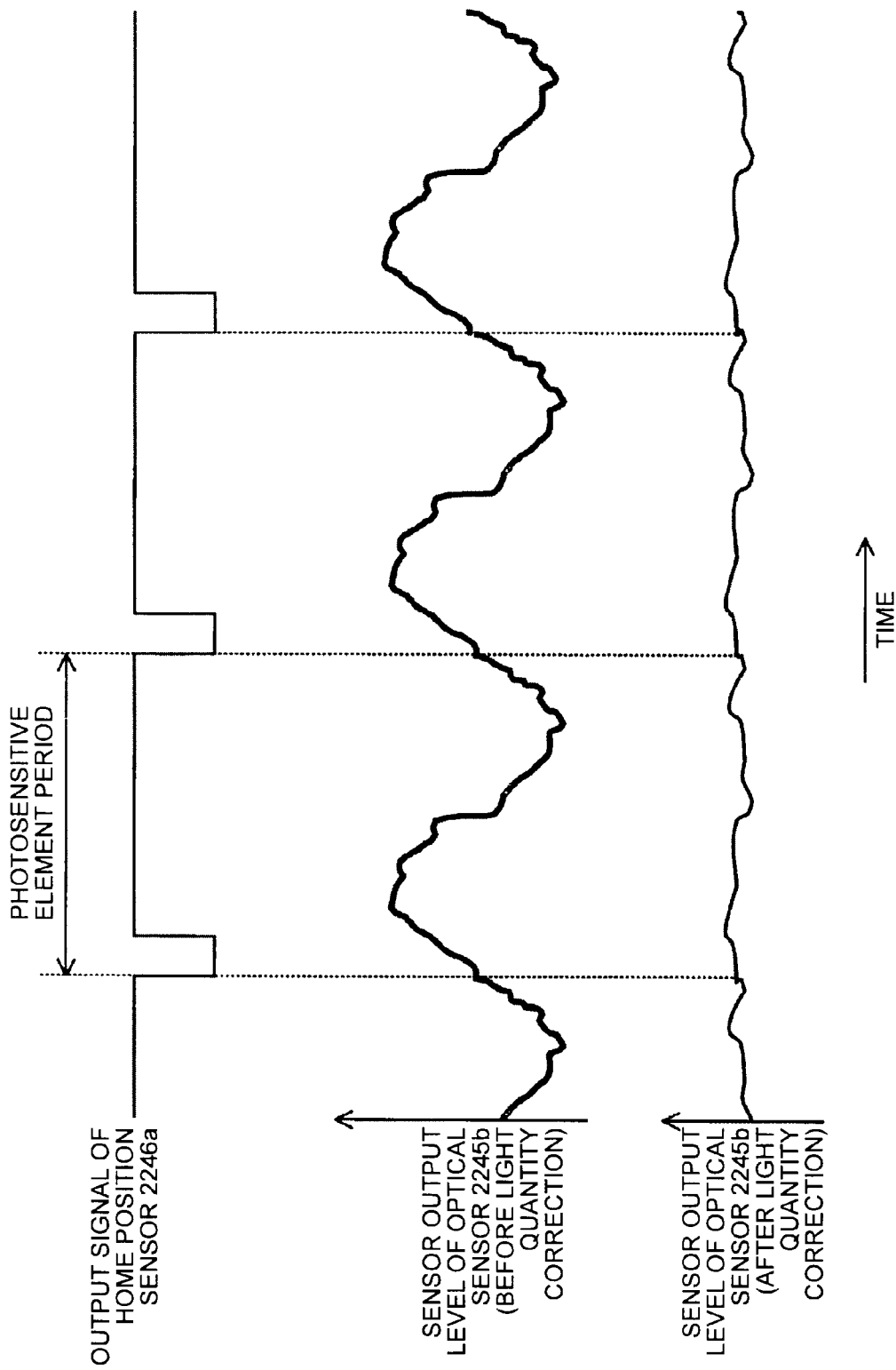
FIG. 56 is a timing chart for explaining a light quantity correction effect in a sub scanning direction.

Then, a driving signal is corrected by multiplying the coefficient and the driving signal of each light-emitting unit corresponding to image information. A non-corrected sensor output level and a corrected sensor output level are illustrated in FIG. 56. In this way, it is possible to suppress the density variation in the sub scanning direction.

Figure 57:
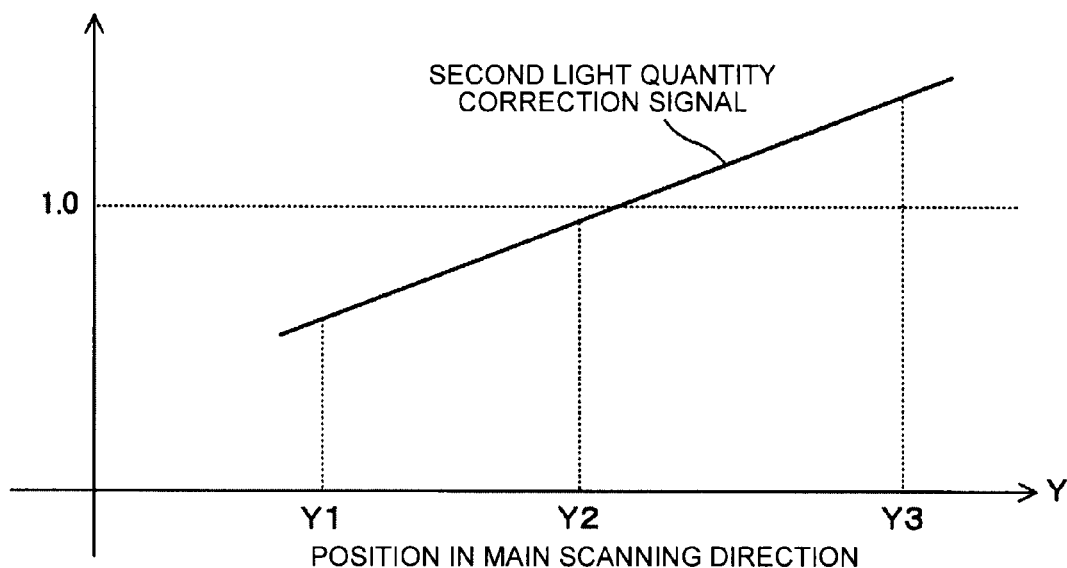
Figure 58:
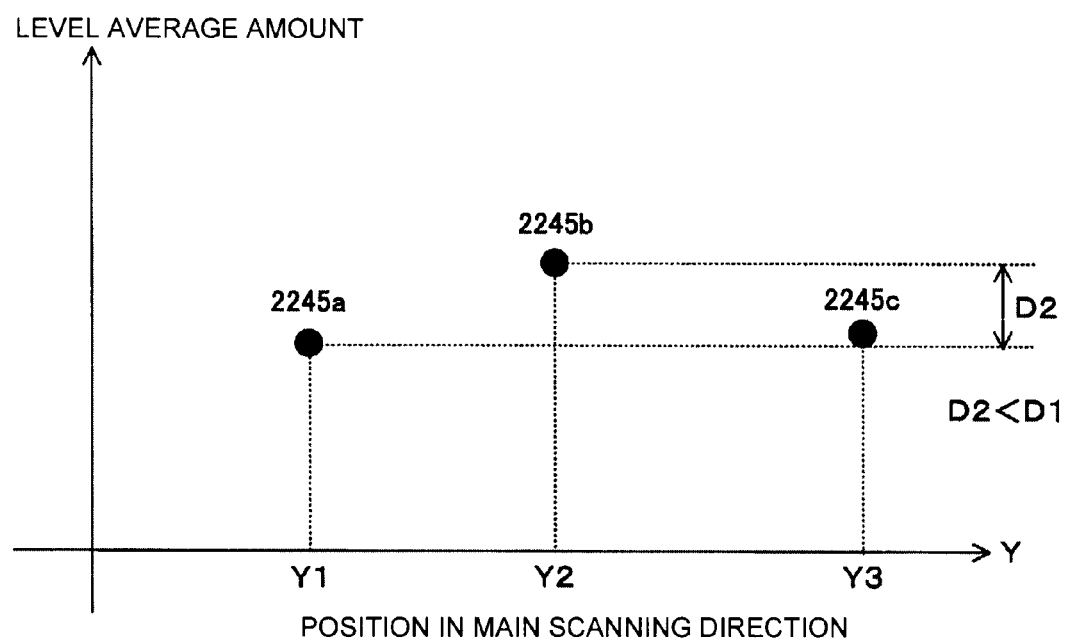
FIG. 58 is a diagram for explaining a density variation in the main scanning direction after correction is performed using the second light quantity correction signal of FIG. 57.

At the time of performing image formation, for each station, the CPU 3210 generates a second light quantity correction signal from the light-emitting power correction formula based on the writing start timing obtained from an output signal of a synchronization detection sensor (not shown) (see FIG. 57). Here, the vertical axis of the second light quantity correction signal is converted to a coefficient having an average value of 1.0. Then, a driving signal is corrected by multiplying the coefficient and the driving signal of each light-emitting unit corresponding to image information. Corrected level average values of the optical sensors are illustrated in FIG. 58. In this way, it is possible to suppress the density variation in the main scanning direction.

Figure 59:
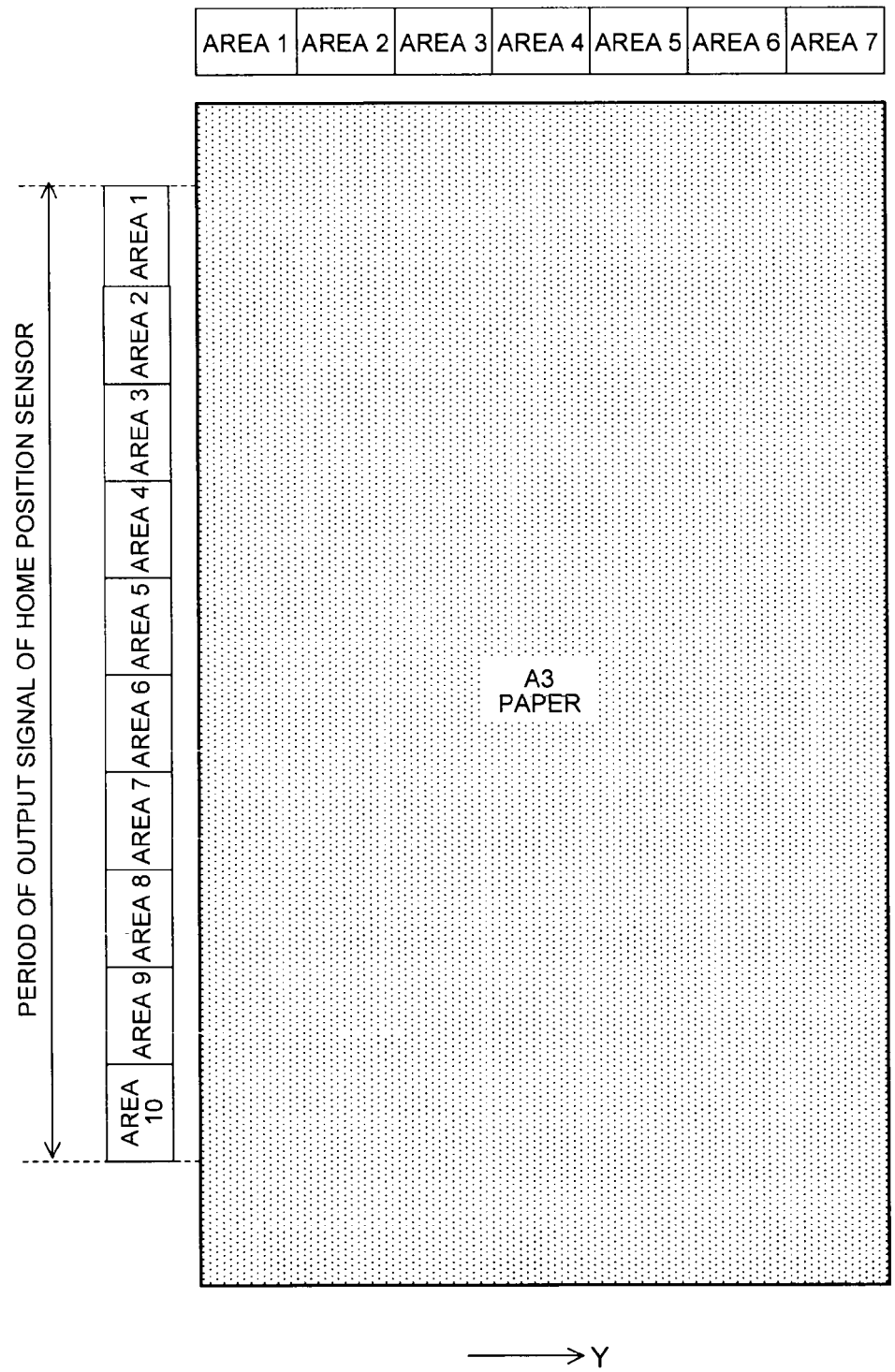
FIG. 59 is a diagram for explaining the area division.

For example, the CPU 3210 performs the area division in the main scanning direction and the sub scanning direction in order to correct the density variation within one page of an A3 paper as illustrated in FIG. 59. In FIG. 59, for easy understanding, 7 divisions are made in the main scanning direction, 10 divisions are made in the sub scanning direction, but the present invention is not limited thereto. Generally, it is believed that 16 divisions or 32 divisions in both directions are appropriate in view of the circuit size and the cost. Of course, when the division number increases, correction can be performed with a higher degree of accuracy. However, an increment in the division number increases the number of gates of the circuit, the number of memories, and the number of registers, leading to a high cost. Thus, the division number is preferably decided according to the type of device.

Figure 60:
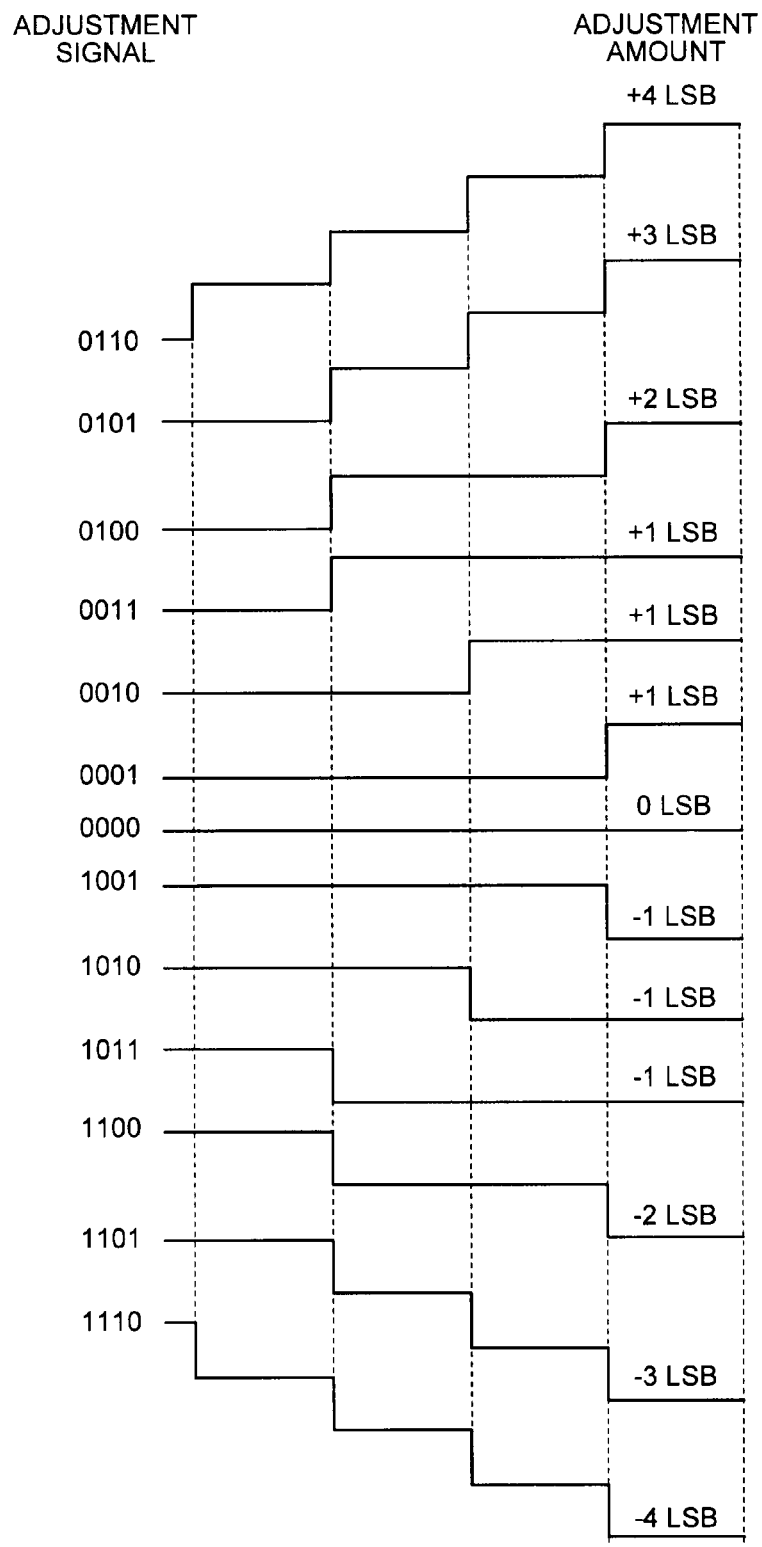
FIG. 60 is a diagram for explaining an adjustment amount and an adjustment signal.

FIG. 60 illustrates an example of an adjustment pattern for adjusting the driving signal of each light-emitting unit. Referring to FIG. 60, a change amount in each area may be set within a range of +4 LSB to −4 LSB using an adjustment signal including 4 bits. In order to suppress influence of correction on an image, a change of 1 LSB, which is a minimum resolution of a digital to analog converter (DAC), is made within each area. However, when it is not necessary to consider influence of correction on an image, a larger change may be made. This is similarly applied to both correction of the density variation in the main scanning direction and correction of the density variation in the sub scanning direction.

By disposing a low pass filter or the like in the main scanning direction, it is possible to reduce a change speed of a light quantity in the main scanning direction to some extent. However, as for the sub scanning direction, a scanning period is generally hundreds of micro seconds, and it is difficult to reduce a change speed of a light quantity even though a filter is disposed. Thus, there is a case in which the sub scanning direction needs a higher resolution.

Various combinations are conceivable. As an example, an initial value in the main scanning direction (for example, the density at a main scanning writing start position) is first decided, and then correction in the sub scanning direction may be performed based on the initial value.

As described above, the color printer 2000 according to the second embodiment (1) includes the optical scanning device 2010, the four photosensitive elements 2030a, 2030b, 2030c, and 2030d, the four charging units 2032a, 2032b, 2032c, and 2032d, the four developing rollers 2033a, 2033b, 2033c, and 2033d, the transfer belt 2040, the density detector 2245, the four home position sensors 2246a, 2246b, 2246c, and 2246d, and the like.

The density detector 2245 includes the three optical sensors 2245a, 2245b, and 2245c.

The optical scanning device 2010 includes the four light sources 2200a, 2200b, 2200c, and 2200d, the four pre-deflector optical systems, the polygon mirror 2104, the four scanning optical systems, the scanning control device 3022, and the like.

The scanning control device 3022 obtains the reference pattern for controlling the density variation in the sub scanning direction and the light-emitting power correction formula for suppressing the density variation in the main scanning direction based on the output signal of the density detector 2245 and the output signal of the corresponding home position sensor in each station at predetermined timing. Then, when image formation is performed, for each station, the scanning control device 3022 generates the first light quantity correction signal and the second light quantity correction signal using the reference pattern and the light-emitting correction formula and corrects the driving signal of each light-emitting unit.

In this case, it is possible to further reduce the density irregularity of the output image in the sub scanning direction and the main scanning direction compared to the related art. As a result, a high-quality image can be formed.

The second embodiment (1) has been described in connection with the case in which the sine wave is extracted as the period pattern, but the present invention is not limited thereto.

Figure 61:
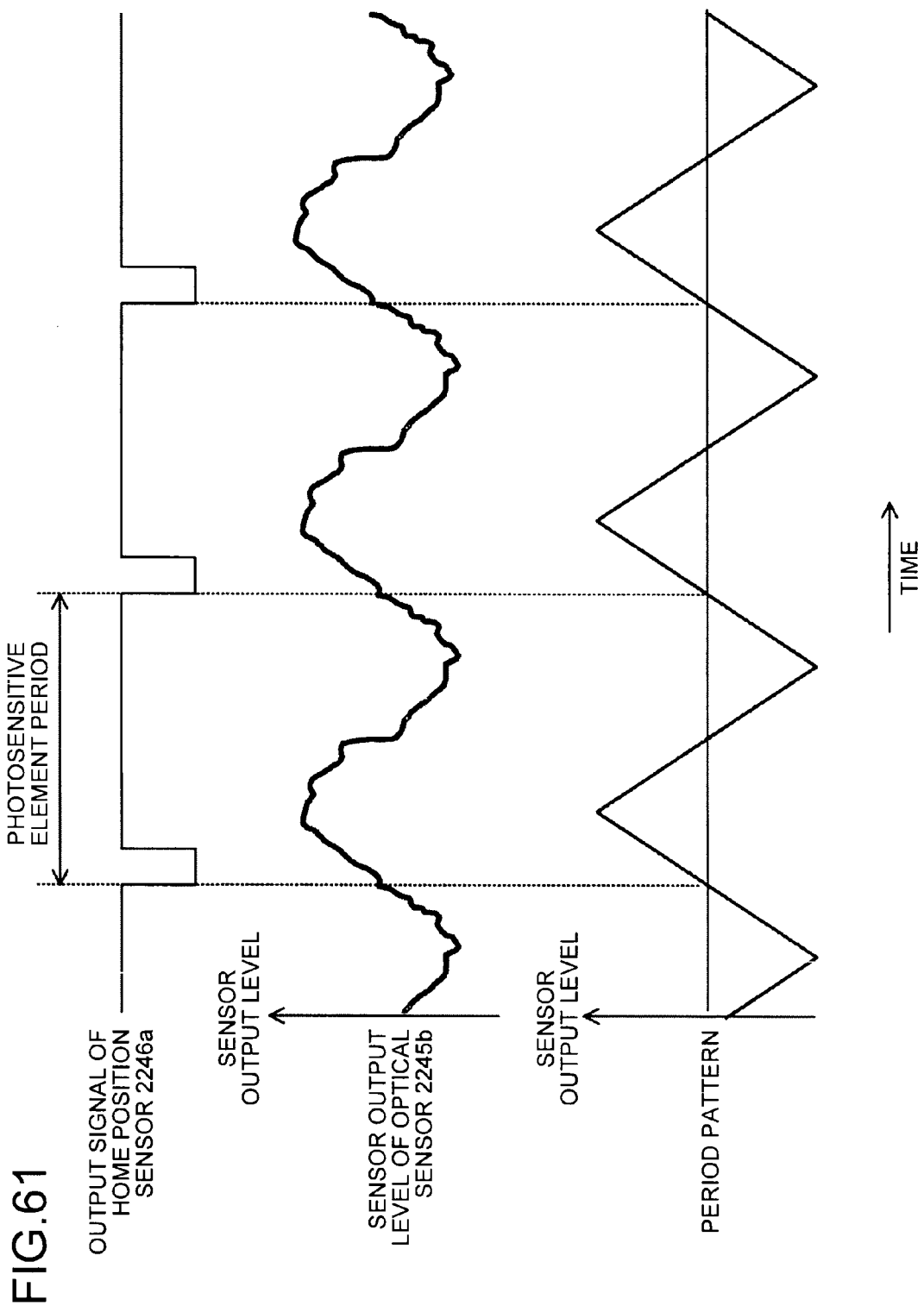
FIG. 61 is a timing chart for explaining a first modification of a period pattern.

For example, as illustrated in FIG. 61, a triangle wave close to the sine wave may be extracted as the first period pattern. In this case, the first light quantity correction signal also has the triangle wave. The first light quantity correction signal can be generated when a phase shift time for the period of the photosensitive element and a correction range amount are known, and the data amount can be reduced. Thus, the cost can be reduced.

Figure 62:
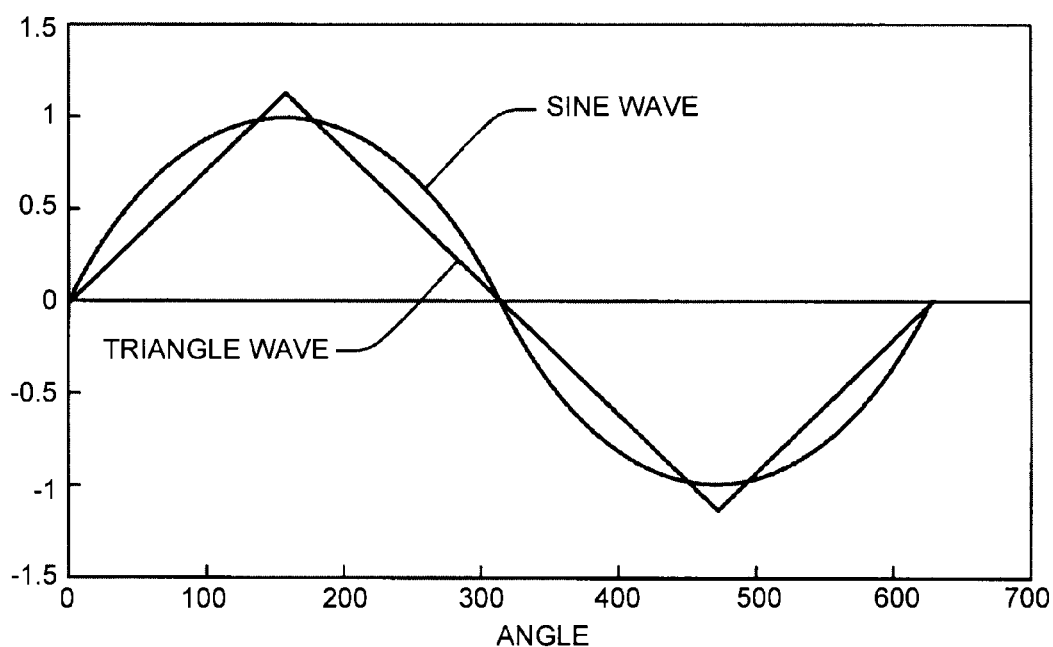
FIG. 62 is a diagram for explaining a difference between a triangle wave and a sine wave (1 thereof)

FIG. 62 illustrates the sine wave and the triangle wave close to the sine wave. In FIG. 62, the amplitude of the sine wave is set to 1.

Figure 63:
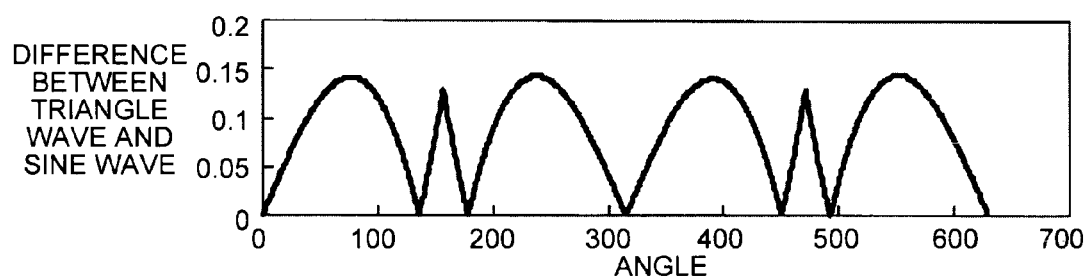
FIG. 63 is a diagram for explaining a difference between a triangle wave and a sine wave (2 thereof)

FIG. 63 illustrates a difference value between the sine wave and the triangle wave close to the sine wave. As can be seen from FIG. 63, the difference with the sine wave has a precipitous change in a peak portion of the triangle wave. Even though the triangle wave is approximated to the sine wave, the difference of the light quantity with the sine wave is about 15%.

Figure 64:
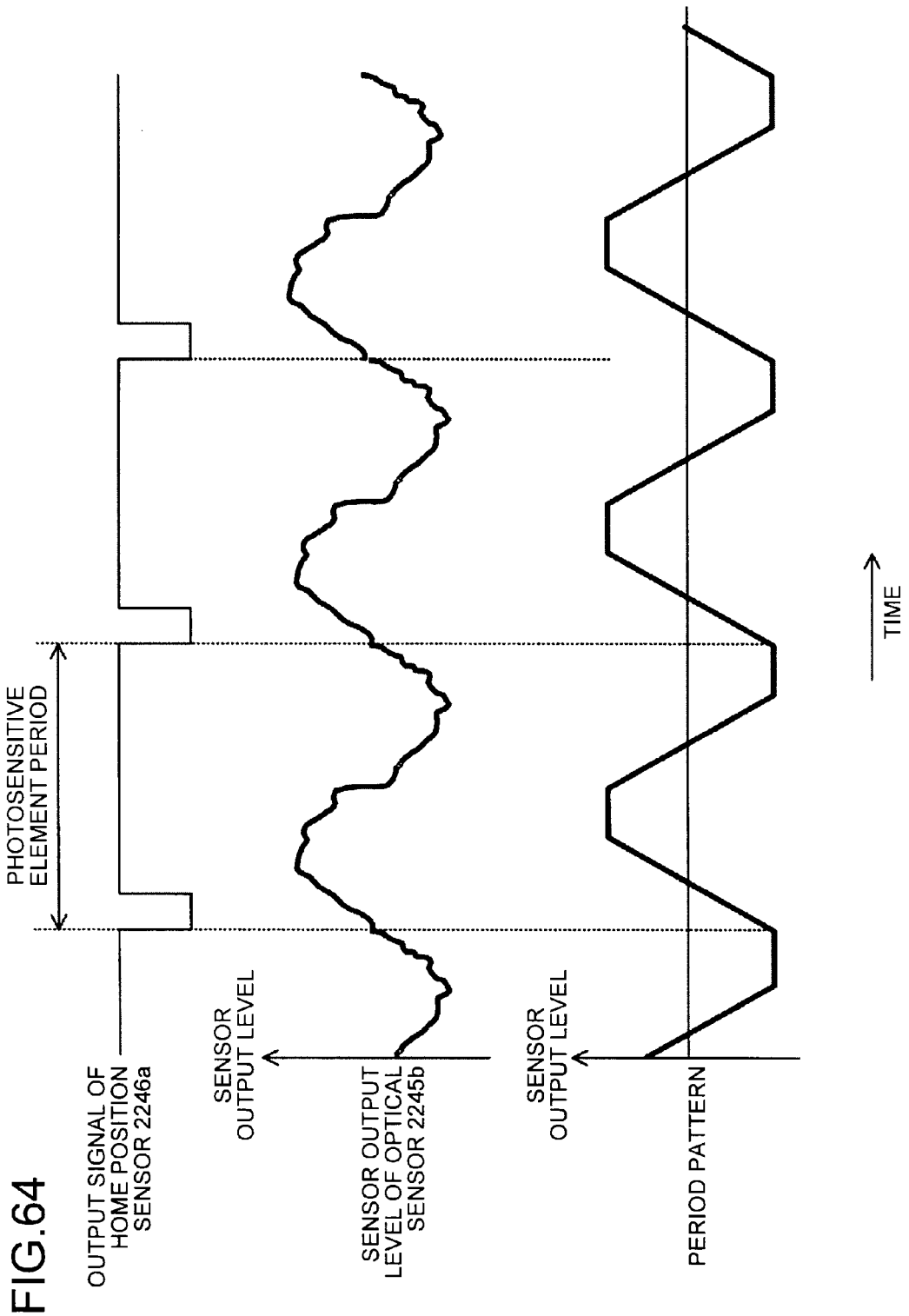
FIG. 64 is a timing chart for explaining a second modification of a period pattern.
Figure 65:
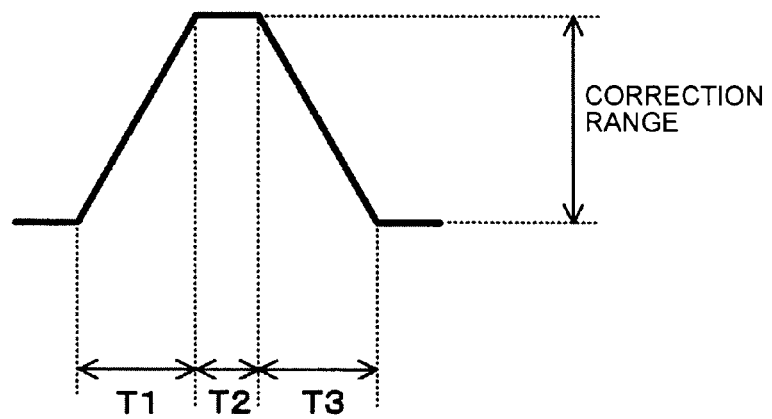
FIG. 65 is a diagram for explaining a trapezoidal wave of a second modification.
Figure 66:
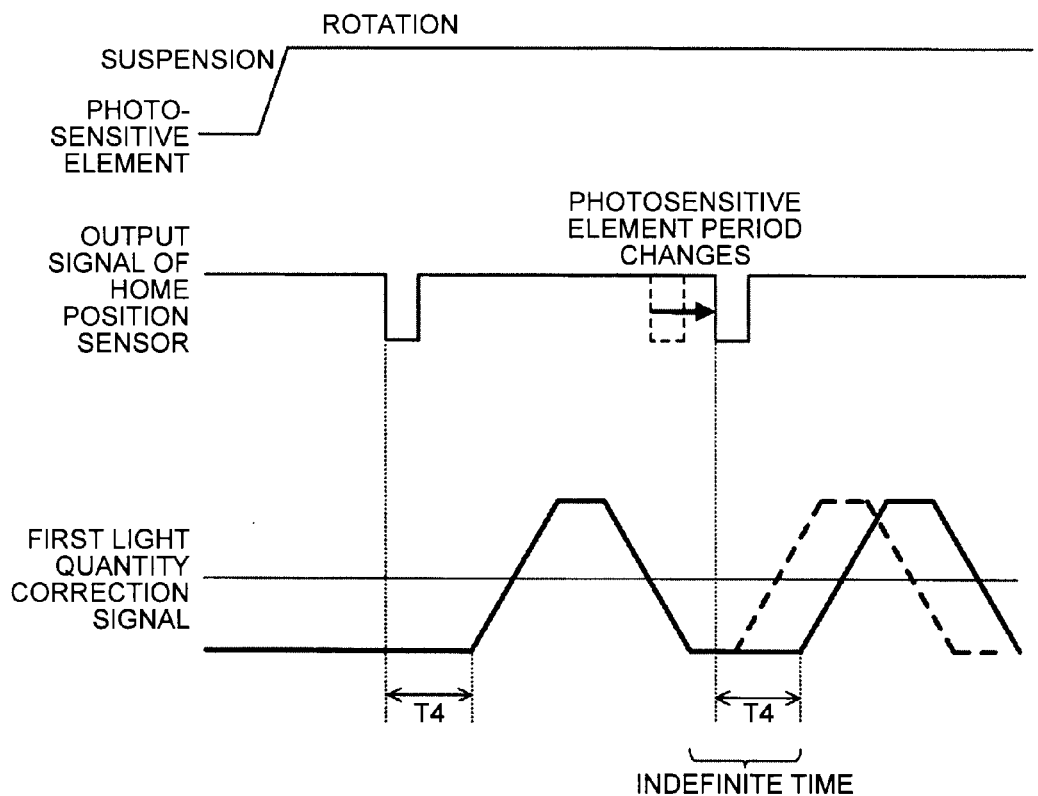
FIG. 66 is a diagram for explaining merit of a trapezoidal wave.

Further, as illustrated in FIG. 64 as an example, a trapezoidal wave close to the sine wave may be extracted as the period pattern. In this case, the first quantity correction signal also has the trapezoidal wave. The first quantity correction signal can be generated when an increment time T1, a peak time T2, a decrement time T3, a correction range amount, and a phase shift time (defined as T4, see FIG. 66) for the period of the photosensitive element are known as illustrated in FIG. 65 as an example, and the data amount can be reduced compared to the sine wave.

The increment time T1 is obtained from the sensor output level waveform. The peak time T2 may be obtained from the sensor output level waveform but may be obtained from T1/2. The decrement time T3 is basically a value equal to T1. The phase shift time T4 is used for phase adjustment of the period of the photosensitive element and the writing start timing. When rotation of the photosensitive element is first rotation, it is defined by a period of a previously set default value.

The trapezoidal wave has a feature in which a density variation at the peak position is small unlike the triangle wave. Further, the trapezoidal wave has a feature in which even though the period of the photosensitive element changes, correction can be performed since there is no joint, (see FIG. 66).

Figure 67:
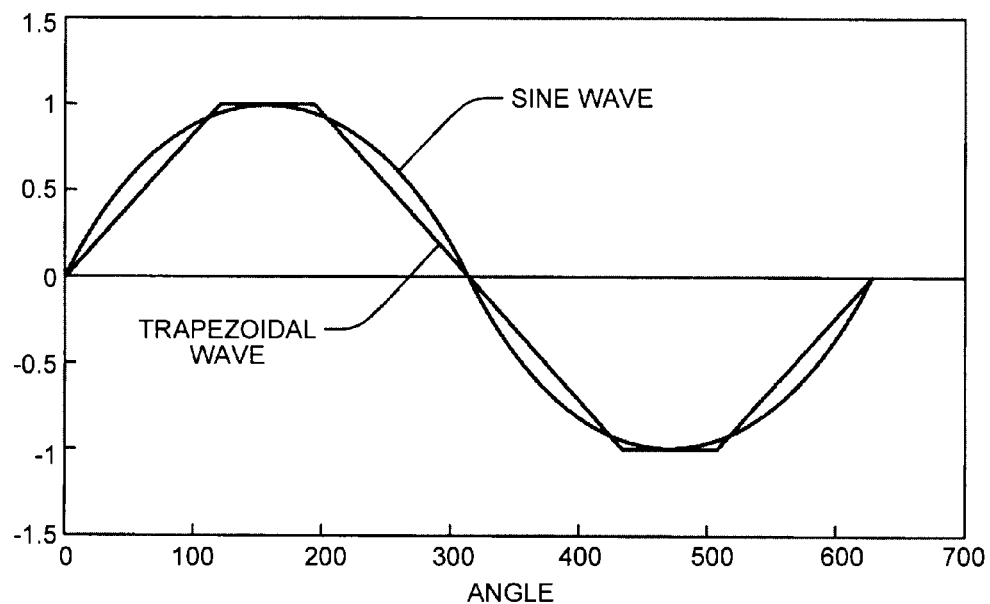
FIG. 67 is a diagram for explaining a difference between a trapezoidal wave and a sine wave (1 thereof)
Figure 68:
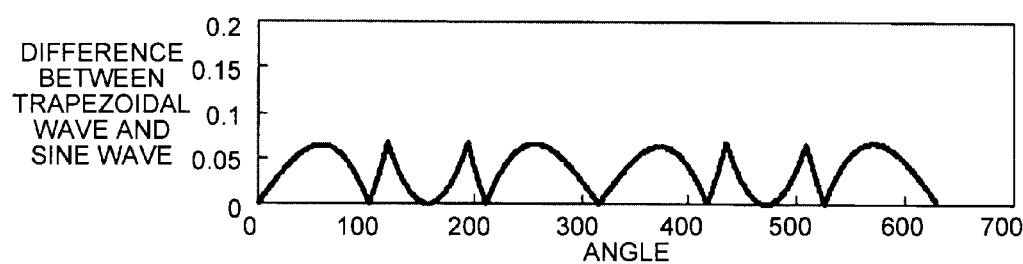
FIG. 68 is a diagram for explaining a difference between a trapezoidal wave and a sine wave (2 thereof)

FIG. 67 illustrates the sine wave and the trapezoidal wave close to the sine wave. FIG. 68 illustrates a difference value between the sine wave and the trapezoidal wave close to the sine wave.

In the case of the trapezoidal wave, the difference with the sine wave has a slightly precipitous change in an angular portion of the trapezoid, but this change is smaller than the case of the triangle wave. The difference with the sine wave as a whole is about 7% or less, and the sine wave can be simulated with a higher degree of accuracy than the case of the triangle wave.

Figure 69:
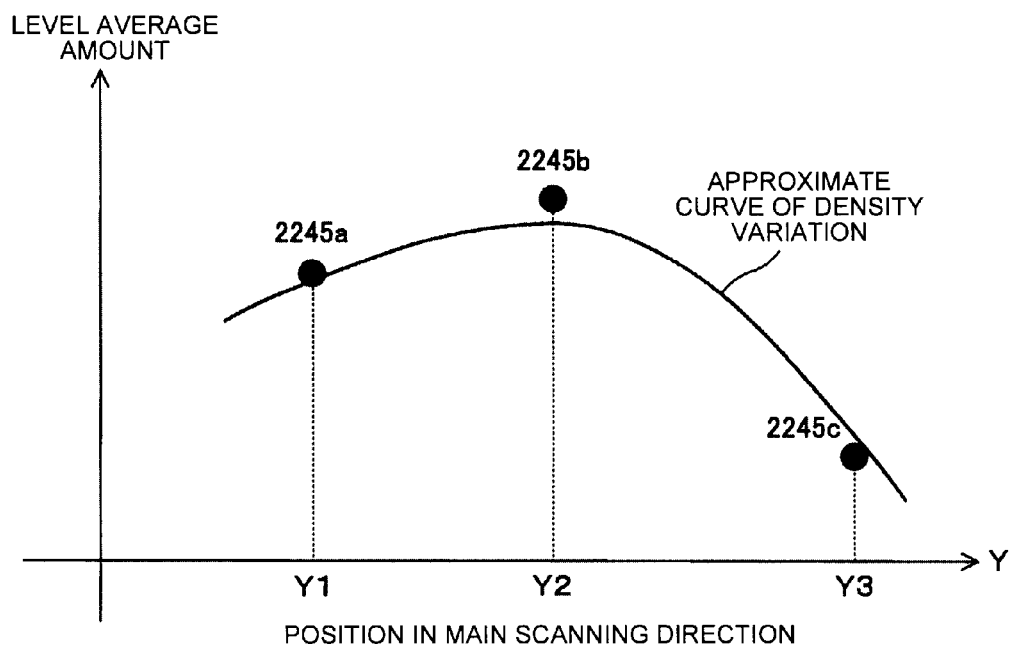
FIG. 69 is a diagram for explaining an approximate curve representing a density variation in the main scanning direction before correction.
Figure 70:
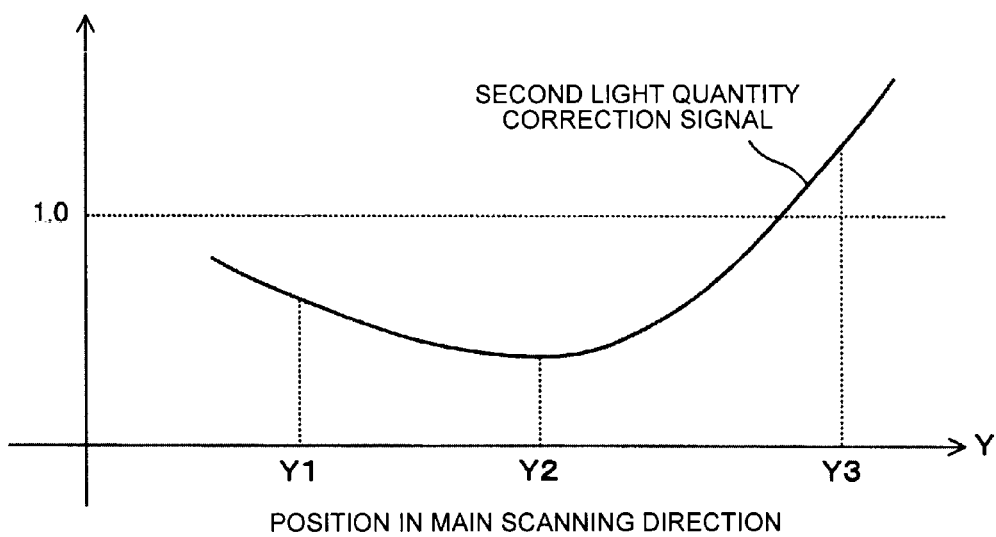
FIG. 70 is a diagram for explaining a second light quantity correction signal corresponding to the approximate curve of FIG. 69.
Figure 71:
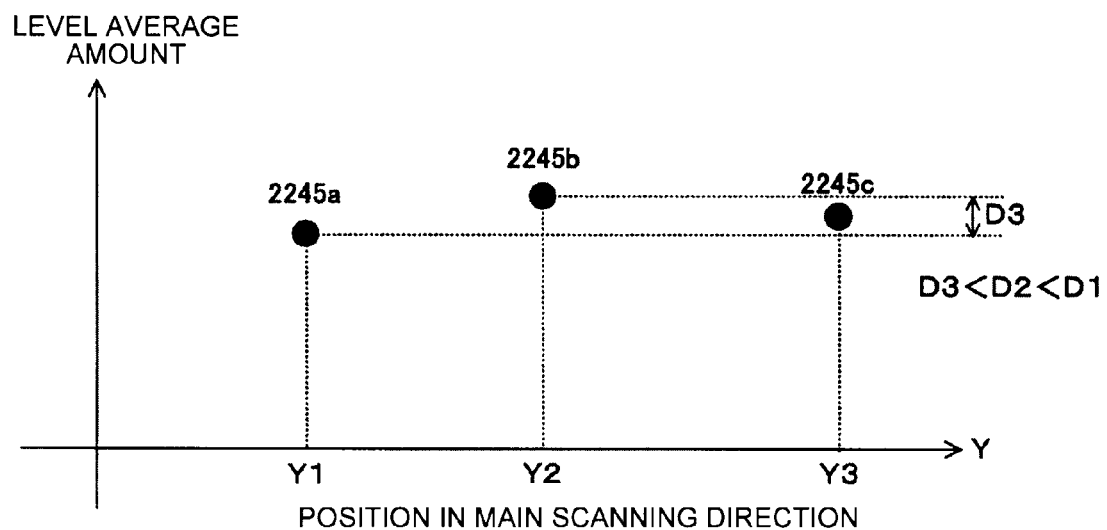
FIG. 71 is a diagram for explaining a density variation in the main scanning direction after correction is performed using the second light quantity correction signal of FIG. 70.

Further, as illustrated in FIG. 69 as an example, the density variation in the main scanning direction may be approximated by a function of higher degree. A second light quantity correction signal at this time is illustrated in FIG. 70. FIG. 71 illustrates a density variation in the main scanning direction after correction is performed using the second light quantity correction signal. The density variation in the main scanning direction is further reduced compared to the case in which the density variation in the main scanning direction is approximated by a linear function.

Figure 72:
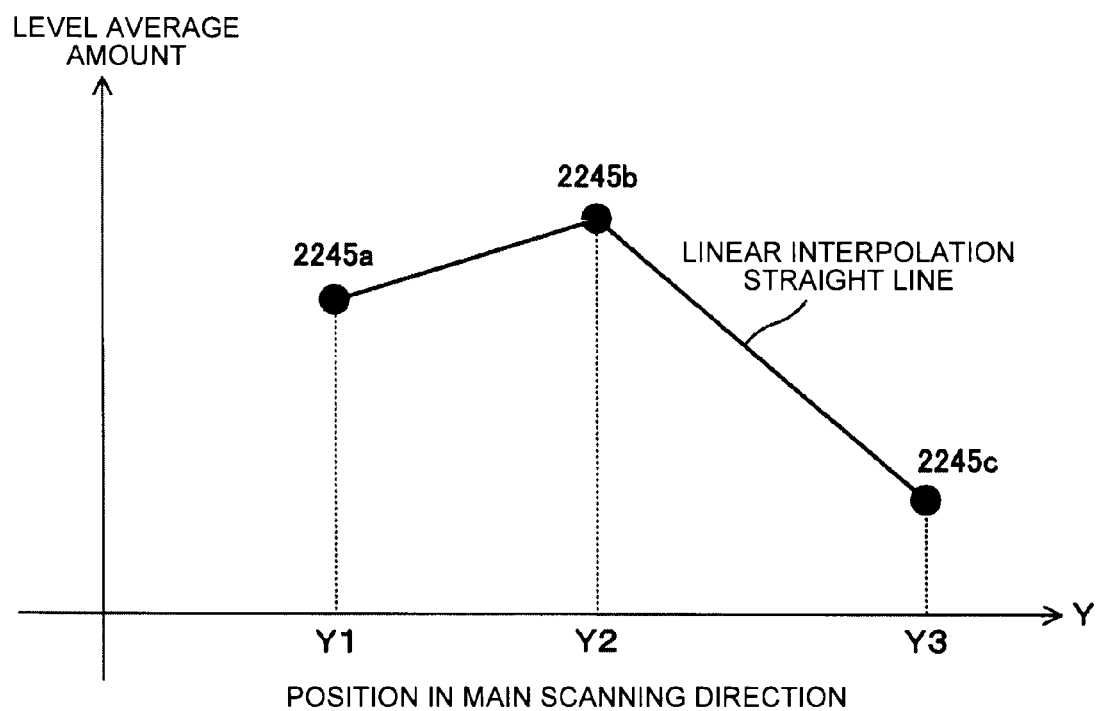
FIG. 72 is a diagram for explaining a linear interpolation straight line representing a density variation in the main scanning direction before correction.
Figure 73:
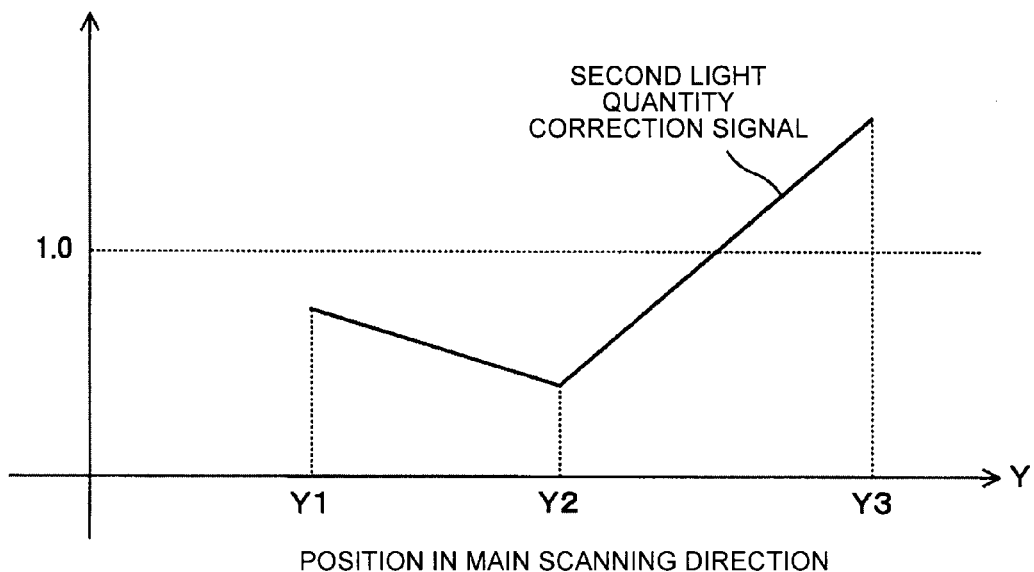
FIG. 73 is a diagram for explaining a second light quantity correction signal corresponding to the linear interpolation straight line of FIG. 72.
Figure 74:
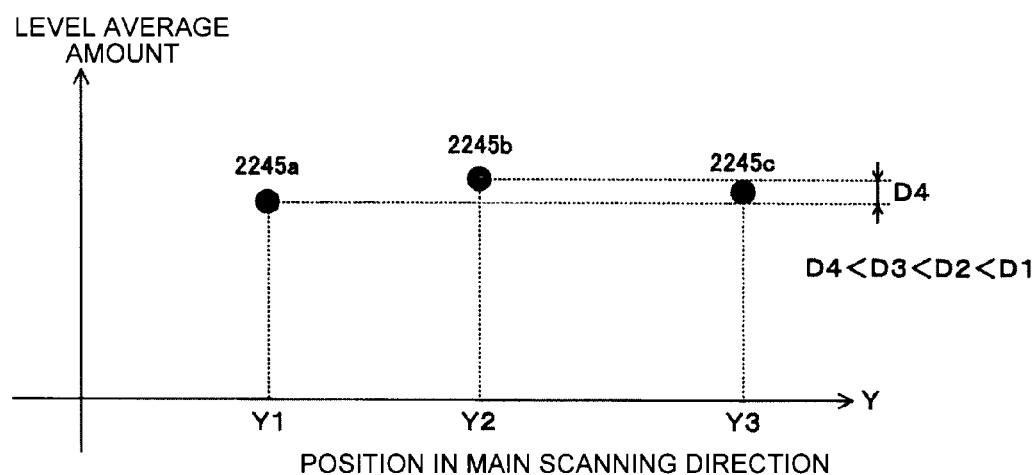
FIG. 74 is a diagram for explaining a density variation in the main scanning direction after correction is performed using the second light quantity correction signal of FIG. 73.

Further, as illustrated in FIG. 72 as an example, the density variation in the main scanning direction may be obtained by interpolating the level averages values of the optical sensors by a straight line. A second light quantity correction signal at this time is illustrated in FIG. 73. FIG. 74 illustrates a density variation in the main scanning direction after correction is performed using the second light quantity correction signal. The density variation in the main scanning direction is further reduced compared to the case in which the density variation in the main scanning direction is approximated by a function of higher degree.

Second Embodiment (2)

A second embodiment (2) will be described below with reference to FIGS. 75 to 77. A color printer 2000A according to the second embodiment (2) has a feature of including a paper leading edge detecting sensor 2247 as illustrated in FIG. 38. The remaining configuration is the same as in the second embodiment (1). Thus, the following description will be made focusing on a difference point from the second embodiment (1). Components identical or equivalent to the second embodiment (1) will be denoted by the same reference numerals, and a description thereof will be simplified or will not be redundantly repeated.

Meanwhile, there is a phenomenon (hereinafter, referred to as a "thick leading edge") that a density deviation band corresponding to the length of one period of the developing roller is generated, in a leading edge of an image directly after a pattern is switched, at a position where an image pattern is switched due to one of the density variations in the sub scanning direction. Particularly, when an image is continuously output from a background area, there arises a problem in that an image density of the paper leading edge uniformly increases. The cause is as follows.

In a two-component developing type, the toner is attached to the surface of the developing roller in the background area, and effective developing potential increases as much as one period of the developing roller following the background area increases. Thereafter, the toner attached to the developing roller in the image area is returned to the carrier side; and the developing roller is cleaned by returning of the toner, so that the developing potential is restored to the original state. It is believed that the density of the leading edge of the paper becomes thicker by one rotation of the developing roller due to the difference in the developing potential.

Figure 75:
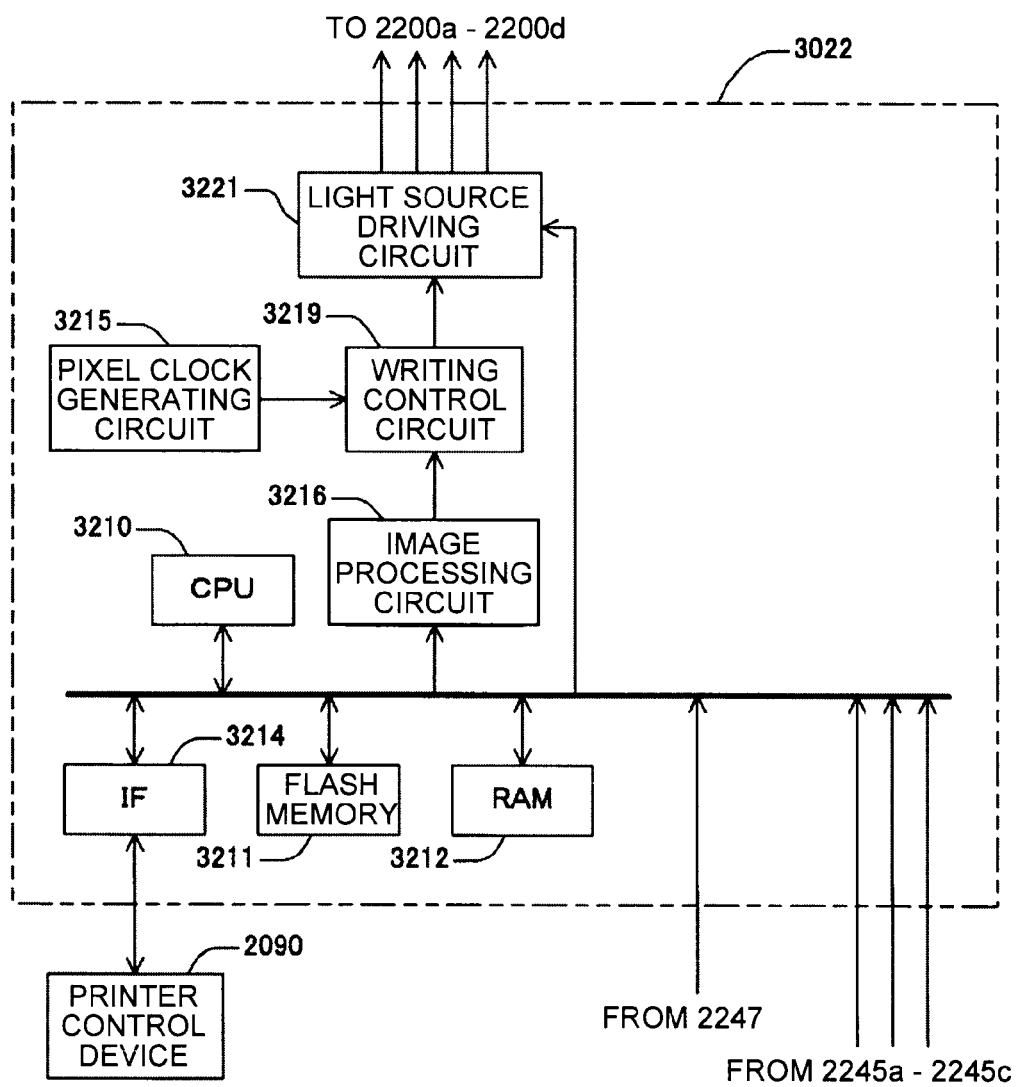
FIG. 75 is a block diagram for explaining a scanning control device according to the second embodiment (2)
Figure 76:
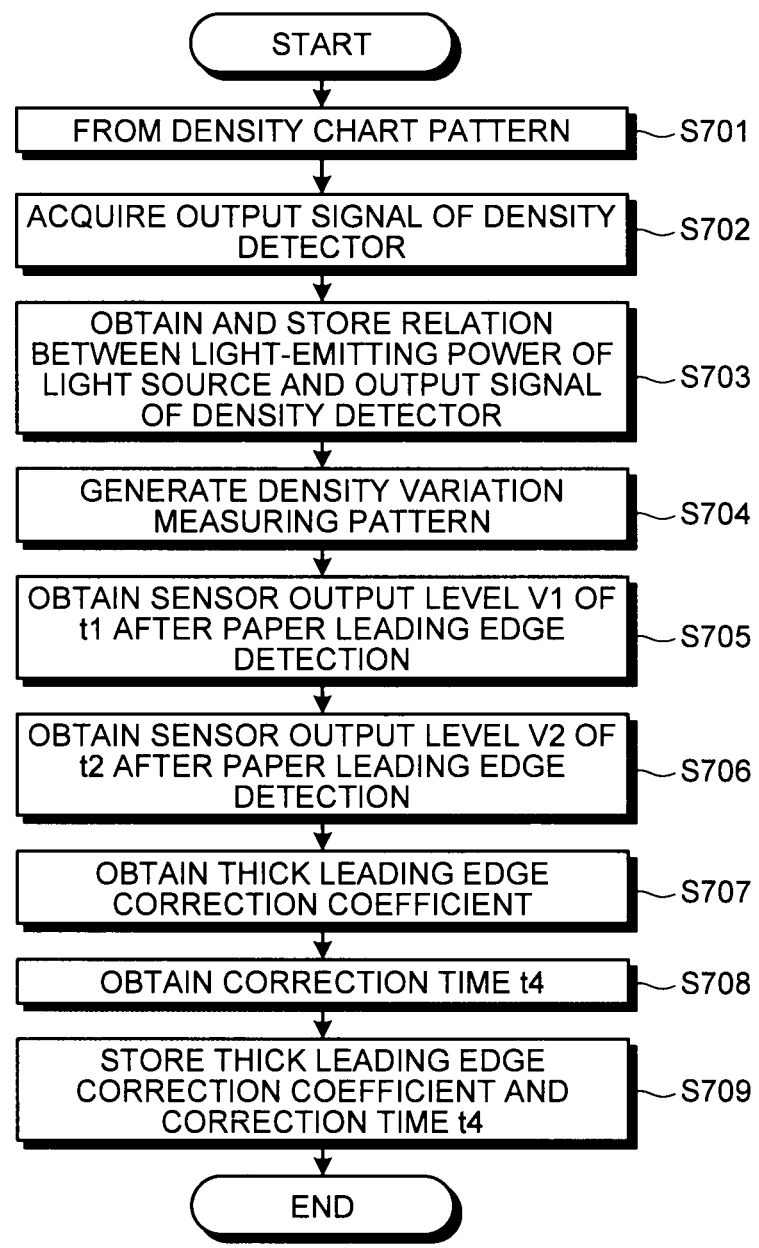
FIG. 76 is a flowchart for explaining a thick leading edge information acquiring process according to the second embodiment (2)

FIG. 75 illustrates a configuration of the scanning control device 3022. An arrow illustrated in FIG. 75 represents the flow of a representative signal or information but does not represent all of connection relations between blocks.

The CPU 3210 acquires "thick leading edge" information at predetermined timing. Hereinafter, a process of acquiring the "thick leading edge" information is roughly referred as a "thick leading edge information acquiring process".

The thick leading edge information acquiring process will be described with reference to FIG. 76. A flowchart of FIG. 76 corresponds to an algorithm including a series of processes executed by the CPU 3210 at the time of performing the thick leading edge information acquiring process. The thick leading edge information acquiring process is performed for each station; but since it is performed in the same manner for each station, a description will be exemplarily made in connection the thick leading edge information acquiring process for the K station.

In step S701, the same density chart pattern as in the second embodiment (1) is formed for black so that the center position in the Y axis direction can be Y0.

In step S702, the LED 11 of the density detector 2245 is turned on. The area of the density n1 to the area of the density n10 in the density chart pattern are sequentially irradiated with light (referred to as "detection light") from the LED 11 as the transfer belt 2040 rotates, that is, as time elapses.

Then, the output signals of the specular reflected light receiving element 12 and the diffuse reflected light receiving element 13 are acquired.

In step S703, the output level of the diffuse reflected light receiving element 13 is normalized using Equation (1) for each density in the density chart pattern. A correlation between the sensor output level and the light-emitting power is obtained. Here, the correlation is approximated by a polynomial equation, and the polynomial equation is stored in the flash memory 3211.

In step S704, a density variation measuring pattern is generated. Here, a black solid pattern is formed with an A3 vertical size as the density variation measuring pattern.

In step S705, the LED 11 of the density detector 2245 is turned on. The detection light from the LED 11 illuminates the density variation measuring pattern in a direction corresponding to the sub scanning direction as the transfer belt 2040 rotates, that is, as time elapses.

Figure 77:
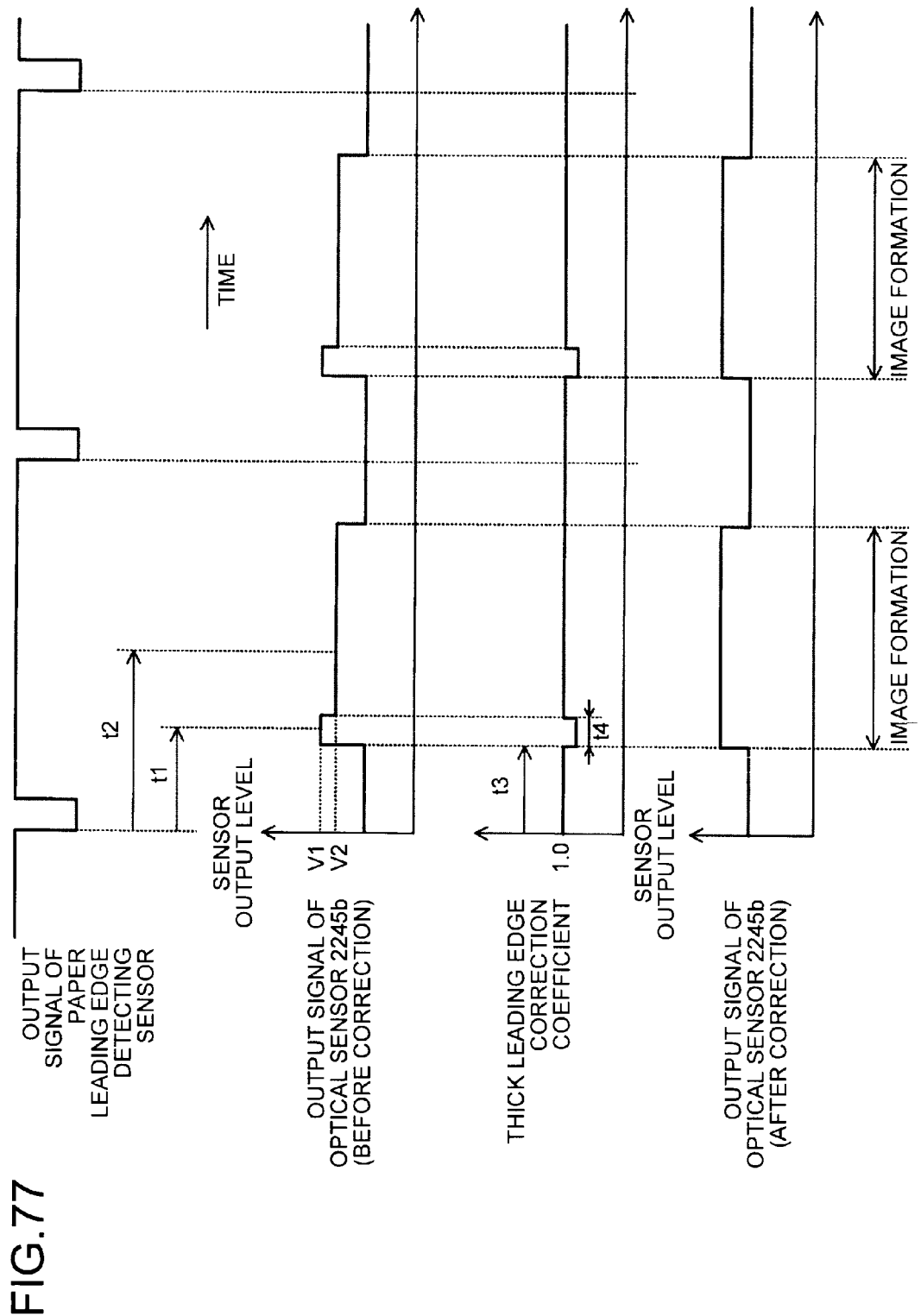
FIG. 77 is a diagram for explaining a thick leading edge correction coefficient and a correction time t4 according to the second embodiment (2).

When a time t1 elapses after falling edge timing of the output signal of the paper leading edge detecting sensor 2247, an sensor output level (referred to as "V1") is obtained (see FIG. 77).

In step S706, when a time t2 (t2>t1) elapses after falling edge timing of the output signal of the paper leading edge detecting sensor 2247, an sensor output level (referred to as "V2") is obtained (see FIG. 77).

In step S707, the light-emitting power corresponding to (V1−V2) is obtained with reference to the correlation between the sensor output level and the light-emitting power and then converted into a correction coefficient (referred to as "thick leading edge correction coefficient"). Here, 1.0 is set as a value representing a case in which correction is unnecessary.

In step S708, a correction time t4 is obtained based on the outer circumferential size of the developing roller and the printing speed (see FIG. 77).

In step S709, the thick leading edge correction coefficient and the correction time t4 are stored in the flash memory 3211, and the thick leading edge information acquiring process is finished.

At the time of performing image formation, when the falling edge of the output signal of the paper leading edge detection sensor 2247 is detected, the CPU 3210 corrects the driving signal by multiplying the thick leading edge correction coefficient and the driving signal of each light-emitting unit corresponding to the image information during the correction time t4 according to the writing start timing obtained from the output signal of a synchronization detection sensor (not shown). FIG. 77 illustrates a non-corrected sensor output level and a corrected sensor output level. As described above, it is possible to suppress the density variation in the sub scanning direction caused by contamination of the developing roller.

As described above, the color printer 2000A according to the second embodiment (2) includes the optical scanning device 2010, the four photosensitive elements 2030a, 2030b, 2030c, and 2030d, the four charging units 2032a, 2032b, 2032c, and 2032d, the four developing rollers 2033a, 2033b, 2033c, and 2033d, the transfer belt 2040, the density detector 2245, the paper leading edge detection sensor 2247, and the like.

The optical scanning device 2010 includes the four light sources 2200a, 2200b, 2200c, and 2200d, the four pre-deflector optical systems, the polygon mirror 2104, the four scanning optical systems, the scanning control device 3022, and the like.

The scanning control device 3022 obtains the thick leading edge correction coefficient for suppressing the density variation in the sub scanning direction caused by the contamination of the developing roller based on the output signal of the density detector 2245 and the output signal of the paper leading edge detecting sensor 2247 in each station at predetermined timing. Then, when image formation is performed, for each station, the scanning control device 3022 corrects the driving signal by multiplying the thick leading edge correction coefficient and the driving signal of each light-emitting unit corresponding to the image information during the correction time t4 calculated from the outer circumferential size of the developing roller and the printing speed according to the writing start timing.

In this case, it is possible to further reduce the density variation in which the leading edge of the output image becomes thick compared to the related art. As a result, a high-quality image can be formed.

The above embodiments have been described in connection with the case in which the number of density detectors 2245 is three, but the present invention is not limited thereto. In the second embodiment (1), the density detector 2245 may include a plurality of optical sensors arranged along the Y axis direction. In the second embodiment (2), the density detector 2245 may include one optical sensor.

In the above embodiments, at least part of processing performed by the scanning control device 3022 may be performed by the printer control device 2090. Further, at least part of processing performed by the printer control device 2090 may be performed by the scanning control device 3022.

The above embodiments have been described in connection with the case in which the density detector 2245 detects the toner pattern on the transfer belt 2040, but the present invention is not limited thereto. The density detector 2245 may detect the toner pattern on the surface of the photosensitive element. The surface of the photosensitive element is close to a regularly reflecting body similarly to the transfer belt 2040.

In the above embodiments, the toner pattern may be transferred onto the recording sheet, and the toner pattern on the recording sheet may be detected by the density detector 2245.

The above embodiments have been described in connection with the case in which the optical scanning device is integrally configured, but the present invention is not limited thereto. For example, the optical scanning device may be disposed for each image forming station, and the optical scanning device may be disposed for every two image forming stations.

Further, the above embodiments have been described in connection with the case in which the four photosensitive elements are disposed, but the present invention is not limited thereto. For example, five or six photosensitive elements may be disposed.

Further, the above embodiments have been described in connection with the case in which the color printer 2000 is used as the image forming apparatus, but the present invention is not limited thereto.

For example, there may be used an image forming apparatus that directly irradiates laser light to a medium (for example, a paper sheet) that produces color by the laser light.

Further, there may be used as an image forming apparatus using a silver halide film as an image carrier. In this case, a latent image can be formed on the silver halide film by optical scanning, and the late image can be visualized by the same processing as the developing process in a typical silver halide photography process. Then, the image can be transferred onto a printing paper sheet by the same processing as the printing process in the typical silver halide photography process. This image forming apparatus can be implemented as an optical plate making device or an optical drawing device for drawing a CT scan image or the like.

Further, an image forming apparatus other than the printer such as a copying machine, a facsimile, or a multi-function peripheral (MFP) in which these devices are integrated may be used as the image forming apparatus.

According to the present invention, there is an effect capable of forming a high-quality image since a density variation in the sub scanning direction caused by eccentricity or a shape error of the photosensitive element is suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image based on image information, comprising:
   a photosensitive element;
   an optical scanning device that includes a light source, and scans a surface of the photosensitive element in a main scanning direction with light emitted from the light source to form a latent image on the surface of the photosensitive element;
   a developing unit that develops the latent image;
   a photosensitive element period detecting sensor that detects a rotation period of the photosensitive element;
   a density sensor that detects a density variation of an image, which is developed by the developing unit, in a sub scanning direction orthogonal to the main scanning direction; and a processing device that corrects a driving signal of the light source according to the image information, based on an output signal of the density sensor and an output signal of the photosensitive element period detecting sensor, so as to suppress the density variation in the sub scanning direction.

2. The image forming apparatus according to claim 1, wherein the processing device obtains a period pattern representing the density variation in the sub scanning direction, based on an output signal of at least one of a plurality of the density sensors and an output signal of the photosensitive element period detecting sensor.

3. The image forming apparatus according to claim 2, wherein a period of the period pattern is the same as the rotation period of the photosensitive element.

4. The image forming apparatus according to claim 3, wherein the processing device stores data, corresponding to one period of a pattern obtained by shifting a phase of the period pattern by a ½ period, into a memory as a reference pattern.

5. The image forming apparatus according to claim 4, wherein the processing device adjusts a phase of the reference pattern based on writing start timing of the image information.

6. The image forming apparatus according to claim 5, wherein the processing device corrects the driving signal of the light source according to the image information using the reference pattern having the adjusted phase.

7. The image forming apparatus according to claim 1, wherein the density variation in the sub scanning direction includes a density variation caused by at least one of eccentricity and a shape error of the photosensitive element.

8. The image forming apparatus according to claim 7, wherein the developing roller includes a developing roller facing the photosensitive element, and the density variation in the sub scanning direction includes a density variation caused by at least one of eccentricity and a shape error of the developing roller.

9. The image forming apparatus according to claim 8, wherein the processing device
obtains a period pattern representing the density variation caused by the developing roller based on the output signal of the density sensor and a rotation period of the developing roller, and
corrects the driving signal of the light source.

10. The image forming apparatus according to claim 9, wherein the developing unit includes a roller period detecting sensor that detects the rotation period of the developing roller, and
the processing device obtains the rotation period of the developing roller based on an output signal of the roller period detecting sensor.

11. The image forming apparatus according to claim 9, wherein the photosensitive element and the developing roller are set to have a predetermined relation between each rotation periods thereof, and
the processing device obtains the rotation period of the developing roller based on the output signal of the photosensitive element period detecting sensor and the predetermined relation.

12. The image forming apparatus according to claim 1, further comprising a leading edge detecting sensor that detects a leading edge of a medium, onto which the image developed by the developing unit is to be transferred, before transfer,
wherein the processing device corrects the driving signal of the light source according to the image information based on an output signal of the leading edge detecting sensor and an output signal of at least one of a plurality of the density sensors so as to suppress the density variation in the sub scanning direction at a leading portion of the image developed by the developing unit.

13. The image forming apparatus according to claim 12, wherein the processing device decides a length of a time for correcting the driving signal of the light source based on a size of the developing roller and a printing speed.

14. The image forming apparatus according to claim 1, wherein the light source includes a vertical cavity type surface-emitting laser.

15. An image forming apparatus that forms an image based on image information, comprising:
a photosensitive element;
an optical scanning device that includes a light source, scans a surface of the photosensitive element in a main scanning direction with light from the light source, and forms a latent image on the surface of the photosensitive element;
a developing unit that develops the latent image;
a photosensitive element period detecting sensor that detects a rotation period of the photosensitive element;
a plurality of density sensors that are arranged at different positions in the main scanning direction,
each density sensor detecting a density variation of an image, which is developed by the developing unit, in a sub scanning direction orthogonal to the main scanning direction; and
a processing device that corrects a driving signal of the light source according to the image information, based on output signals of the plurality of density sensors and an output signal of the photosensitive element period detecting sensor, so as to suppress the density variation in the sub scanning direction and a density variation in the main scanning direction.

16. The image forming apparatus according to claim 15, wherein the processing device obtains the density variation in the main scanning direction based on the positions of the plurality of density sensors in the main scanning direction and the output signals of the density sensors.

17. The image forming apparatus according to claim 16, wherein the processing device approximates the relation by a linear function or a high-dimensional function.

18. The image forming apparatus according to claim 16, wherein the processing device obtains the relation by linearly interpolating the output signals of the density sensors.

19. The image forming apparatus according to claim 15, wherein the light source includes a vertical cavity type surface-emitting laser.

* * * * *